US011360553B2

(12) United States Patent
Son et al.

(10) Patent No.: US 11,360,553 B2
(45) Date of Patent: Jun. 14, 2022

(54) SYSTEMS AND METHODS EMPLOYING PREDICTIVE OVERFILLING FOR VIRTUAL REALITY

(71) Applicant: PCMS Holdings, Inc., Wilmington, DE (US)

(72) Inventors: JuHyung Son, Uiwang-si (KR); Jin Sam Kwak, Uiwang-si (KR); Hyun Oh Oh, Seoul (KR); Sanghoon Kim, Chadds Ford, PA (US)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 17/048,978

(22) PCT Filed: Apr. 18, 2019

(86) PCT No.: PCT/US2019/028169
§ 371 (c)(1),
(2) Date: Oct. 19, 2020

(87) PCT Pub. No.: WO2019/204638
PCT Pub. Date: Oct. 24, 2019

(65) Prior Publication Data
US 2021/0240258 A1 Aug. 5, 2021

Related U.S. Application Data

(60) Provisional application No. 62/660,228, filed on Apr. 19, 2018.

(51) Int. Cl.
*G06T 3/40* (2006.01)
*G06F 3/01* (2006.01)
(Continued)

(52) U.S. Cl.
CPC ............. *G06F 3/012* (2013.01); *G06F 3/14* (2013.01); *G06T 3/40* (2013.01); *H04L 43/08* (2013.01); *G06T 2200/16* (2013.01)

(58) Field of Classification Search
CPC .................. G06F 3/012; G06T 3/40
See application file for complete search history.

(56) References Cited

U.S. PATENT DOCUMENTS 6,628,287 B1 * 9/2003 Duda ...................... A63F 13/57
348/E7.071
9,063,330 B2 6/2015 Lavalle
(Continued)

OTHER PUBLICATIONS

Lavelle, Steve "The Latent Power of Prediction", Oculus Developer Blog, Jul. 12, 2013, www.developer3.oculus.com/blog/the-latent-power-of-prediction. Accessed Oct. 5, 2021 (12 pages).
(Continued)

*Primary Examiner* — Phi Hoang
(74) *Attorney, Agent, or Firm* — Invention Mine

(57) ABSTRACT

An example disclosed method in accordance with some embodiments includes: receiving head tracking position information from a client device, the head tracking position information associated with a user at the client device; predicting a future head position of the user at a scan-out time for displaying a virtual reality (VR) video frame, wherein the VR video frame is displayed to the user via the client device; determining an overfill factor based on an expected error in the predicted future head position of the user; rendering an overfilled image based on the predicted future head position of the user and the overfill factor; and sending the VR video frame including the overfilled image to the client device for display to the user.

18 Claims, 38 Drawing Sheets

(51) Int. Cl.
   *G06F 3/14*      (2006.01)
   *H04L 43/08*     (2022.01)

(56) References Cited

U.S. PATENT DOCUMENTS

| | | | |
|---|---|---|---|
| 9,747,726 | B2 | 8/2017 | Williams |
| 9,779,540 | B2 | 10/2017 | Katz |
| 2015/0199876 | A1* | 7/2015 | Weber ............. G07F 17/3223 463/25 |
| 2016/0358299 | A1 | 12/2016 | Toth |
| 2016/0364904 | A1 | 12/2016 | Parker |
| 2017/0115488 | A1* | 4/2017 | Ambrus ............... G06F 3/012 |
| 2017/0302972 | A1* | 10/2017 | Zhang ............ H04N 21/41407 |
| 2018/0047332 | A1 | 2/2018 | Kuwahara |
| 2019/0164518 | A1* | 5/2019 | Dimitrov ............ G02B 27/017 |
| 2020/0014963 | A1* | 1/2020 | Gogoi ............... H04N 21/6583 |

OTHER PUBLICATIONS

Beeler, D. et al., "Asynchronous Spacewarp", Oculus Developer Blog, Nov. 10, 2016 www.developer.oculus.com/blog/asynchronous-spacewarp. Accessed Oct. 1, 2021 (7 pages).

Antonov, M. "Asynchronous Timewarp Examined", Oculus Developer Blog, Mar. 2, 2015, www.developer.oculus.com/blog/asynchronous-timewarp-examined. Accessed Oct. 1, 2021 (13 pages).

Lavelle, et al., "Head tracking for the oculus rift", Robotics and Automation (ICRA) 2014 IEEE InternationalConference on, pp. 187-194, May 2014. (8 pages).

Olano, et al., (1995). Combatting Rendering Latency . . . 19-24, 204. 10.1145/199404.199407 https://www.csee.umbc.edu/~olano/papers/latency/ (13 pages).

OSVR RenderManager (developed by Sensics), https://github.com/sensics/OSVR-RenderManager. Accessed Oct. 12, 2021 (6 pages).

Xie, L., et al., "360probdash: Improving QOE of 360 Video Streaming Using Tile-Based Http Adaptive Streaming". Proceedings of the 25th ACM International Conference on Multimedia, Oct. 2017, pp. 315-323 (9 pages).

He, J., et al., "Rubiks: Practical 360-Degree Streaming for Smartphones". Association for Computing Machinery, MobiSys '18, Jun. 10-15, 2018, (13 pages).

Invitation to Pay Additional Fees, and Where Applicable, Protest Fee, from the International Searching Authority for PCT/US2019/028169, dated Jun. 18, 2019, (10 pages).

International Search Report and Written Opinion of the International Searching Authority for PCT/US2019/028169 dated Aug. 22, 2019, (16 pages).

International Preliminary Reporton Patentability for PCT/US2019/028169 dated Oct. 20, 2020, (11 pages).

* cited by examiner

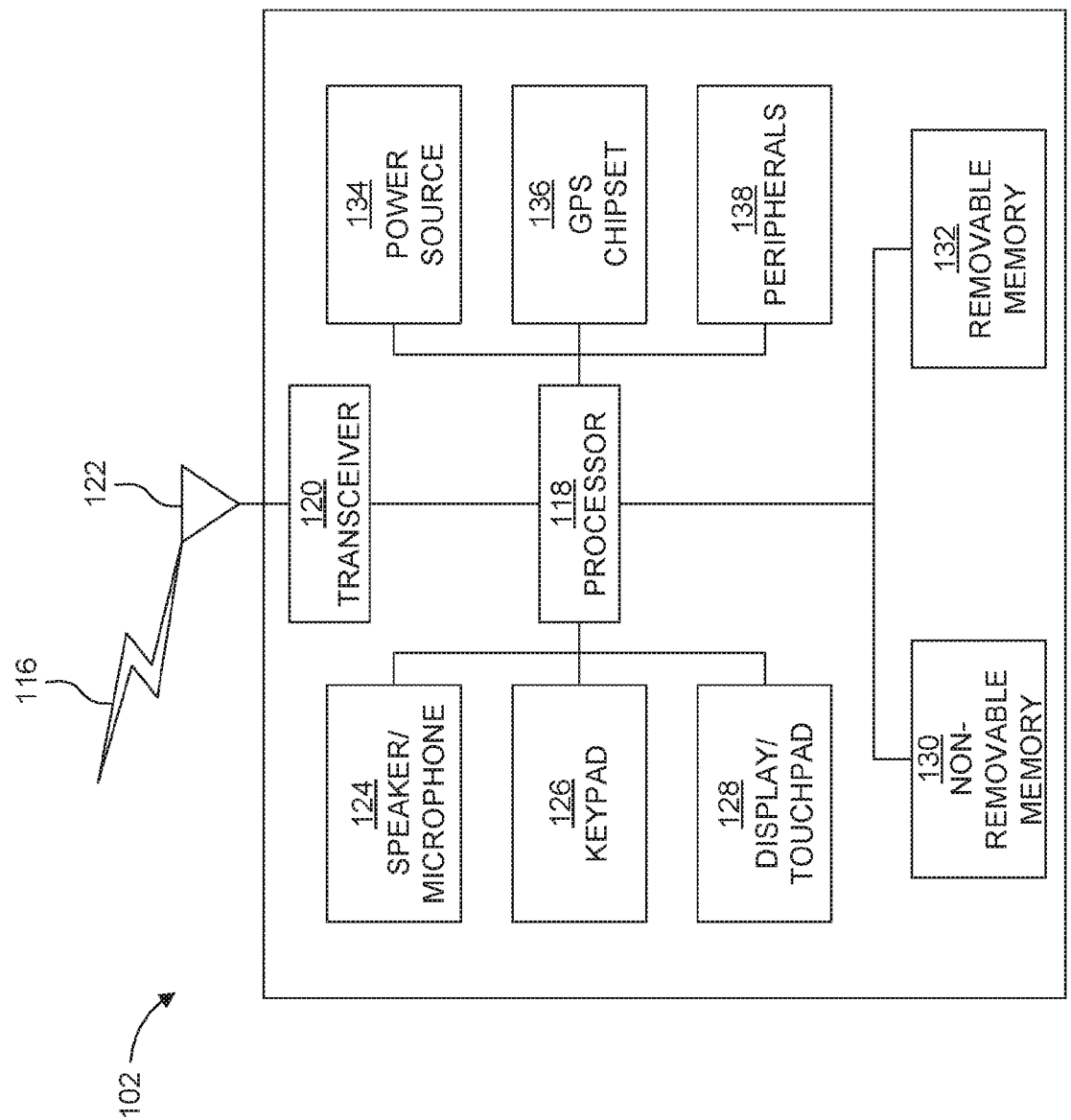

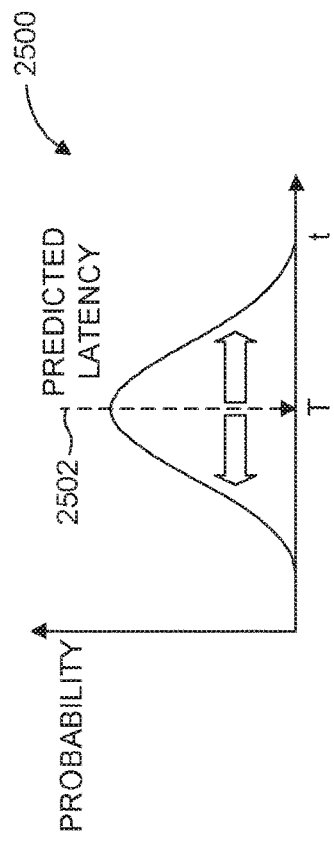
FIG. 25
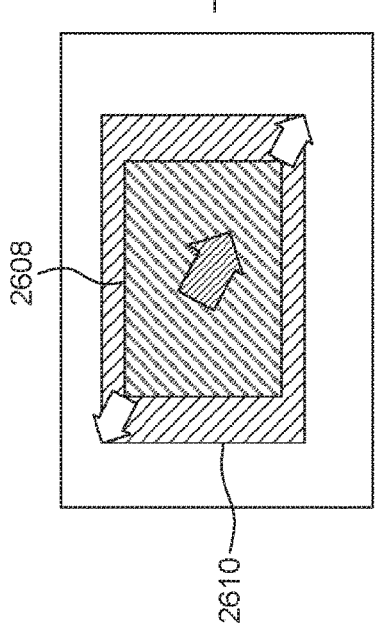
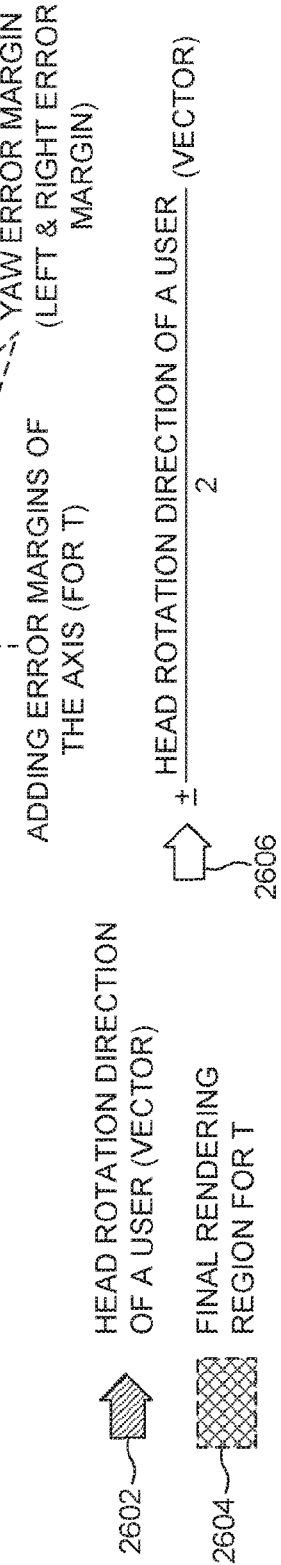
FIG. 26

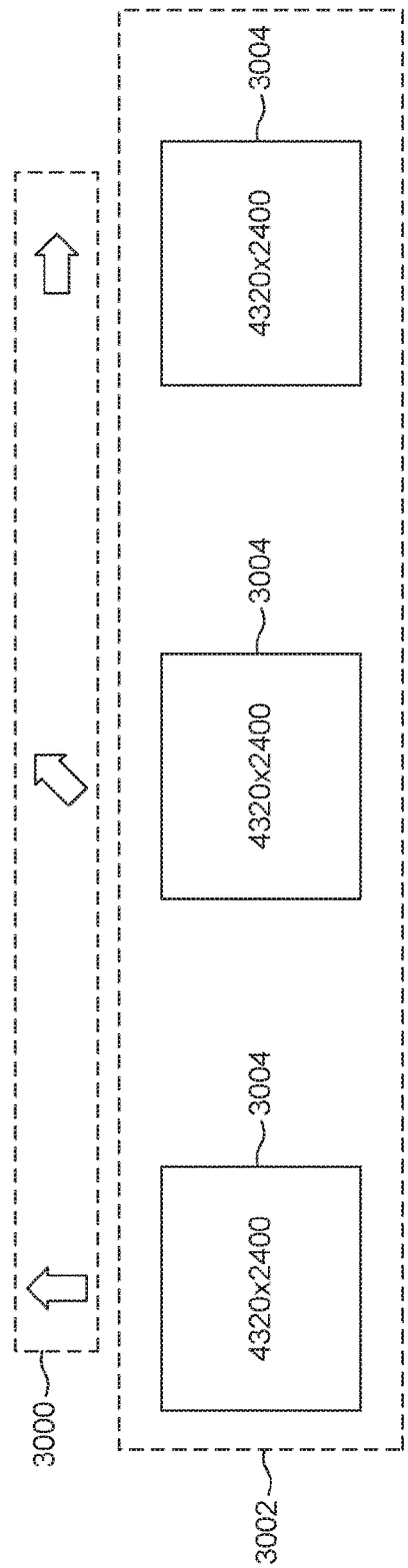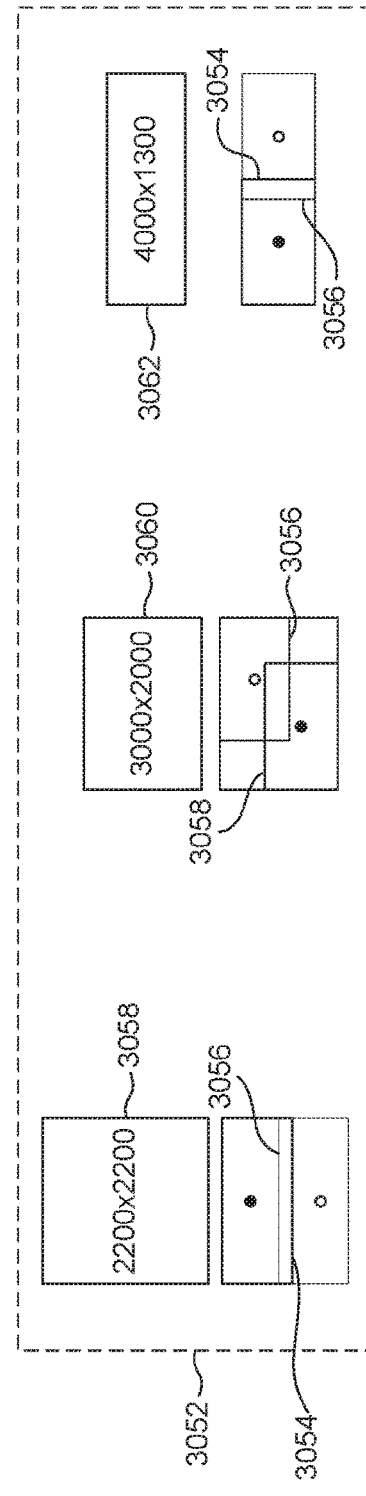

SYSTEMS AND METHODS EMPLOYING PREDICTIVE OVERFILLING FOR VIRTUAL REALITY

CROSS-REFERENCE SECTION

The present application is a national stage application under 35 U.S.C. § 371 of International Application No. PCT/US2019/028169, entitled "SYSTEMS AND METHODS EMPLOYING PREDICTIVE OVERFILLING FOR VIRTUAL REALITY," filed on Apr. 18, 2019, which claims benefit under 35 U.S.C. § 119(e) from U.S. Provisional Patent Application Ser. No. 62/660,228 filed Apr. 19, 2018, entitled "Systems and Methods Employing Predictive Overfilling for Virtual Reality," each of which is hereby incorporated by reference in its entirety.

BACKGROUND

In some virtual reality (VR) services, VR content may be processed in a processing entity located separately from a client device (e.g., an HMD), such as for example a cloud, a server farm, and a local desktop PC, and the VR content may be transferred to the client device, such as the HMD, to be displayed to a user. Because processing the VR content generally consumes a large amount of computing power, processing all of the VR content solely at the HMD may not be appropriate or feasible; the HMD may have limitations in computing power, battery life, heat budget, etc.

Further, latency is widely known as an obstacle, even in local VR services (where, e.g., a server and a client device are directly connected, such as via an HDMI cable). Latency typically increases or gets more severe in remote VR services due to additional processing (e.g., encoding and/or decoding) and/or network transfer latency. In general, latency may be measured as the interval from the time when a user moves to the time when the user sees an image of the correspondingly changed view, and latency measured as this interval is generally referred to as a motion-to-photon (MTP) latency. As the latency increases, an inconsistency between a generated VR video frame and the users field of view (FOV) at the time of display also increases. Especially in remote VR services, a large inconsistency may result from a large amount of additional delay of video compression and decompression and a network transfer. Large inconsistency may lead to significant motion sickness of a user, which may cause an uncomfortable user experience and/or may reduce user satisfaction (e.g., which may make the user quit the service).

SUMMARY

In accordance with some embodiments, a method performed at a server includes: receiving head tracking position information from a client device, the head tracking position information associated with a user at the client device; predicting a future head position of the user at a scan-out time for displaying a virtual reality (VR) video frame, wherein the VR video frame is displayed to the user via the client device; determining an overfill factor based on an expected error in the predicted future head position of the user; rendering an overfilled image based on the predicted future head position of the user and the overfill factor; and sending the VR video frame including the overfilled image to the client device for display to the user.

In some embodiments, the client device includes a head-mounted display (HMD). In some embodiments, the expected error in the predicted future head position of the user is based on observations of the head tracking position information received by the server. In some embodiments, the expected error in the predicted future head position of the user is based on observations of a network latency over time.

In some embodiments, the method further includes rendering at least one other VR video frame including another overfilled image, wherein a size of the at least one other VR video frame is different from a size of the VR video frame including the overfilled image. In this regard, in some embodiments, at least one of pixel dimensions or an aspect ratio is changed dynamically from one VR video frame to another VR video frame according to changes in a latency of a connection between the server and the client device. In some embodiments, at least one of pixel dimensions or an aspect ratio is changed dynamically from one VR video frame to another VR video frame according to changes in observed head motion (e.g. head rotation) of the user.

Predicting the future head position of the user at the scan-out time includes, in some embodiments, using at least in part the head tracking position information to predict the future head position of the user at the scan-out time. The head tracking position information is, in some embodiments, an IMU-based motion data. The method further includes, in some embodiments: in response to a receipt of the VR video frame including the overfilled image at the client device, receiving timing information from the client device, the timing information including at least a scan-out starting time of the VR video frame including the rendered overfilled image. Further, in some embodiments, the method includes determining a rendering-to-scan-out latency distribution.

Determining the rendering-to-scan-out latency distribution includes, in some embodiments, at least in part determining a difference between a rendering start time of the VR video frame and the scan-out starting time of the VR video frame to calculate a rendering-to-scan-out latency value of the VR video frame. In some embodiments, adding the rendering-to-scan-out latency value of the VR video frame to a table that is configured to hold a plurality of rendering-to-scan-out latency values associated with rendered VR video frames; and using the table in determining the rendering-to-scan-out latency distribution. In some embodiments, each time a new rendering-to-scan-out latency value is added to the latency table, an older rendering-to-scan-out latency value is deleted from the latency table.

Further, in some embodiments, using at least in part the head tracking position information to predict the future head position of the user at the scan-out time includes: predicting a first field of view (FOV) at a first time (T1), wherein the first predicted FOV is based on a predicted first fixation point; and predicting a second FOV at a second time (T2), wherein the second predicted FOV is based on a predicted second fixation point. Selecting T1 and T2 is based, in some embodiments, on the rendering-to-scan-out latency distribution. T1 provides, in some embodiments, a lower bound on an expected scan-out time of the VR video frame, and T2 provides an upper bound on an expected scan-out time of the VR video frame. Further, in some embodiments, T1 and T2 are selected such that a time interval between T1 and T2 contains a target probability of the latency distribution.

In some embodiments, the method further includes adding a first error margin associated with the predicted first fixation point to the first predicted FOV; and adding a second error margin associated with the predicted second fixation point to the second predicted FOV. The second error margin is in some embodiments, larger than the first error margin. Further, in some embodiments, each of the first and second error margins associated with the predicted first and second fixation points, respectively, are based on a prediction technique selected from the group consisting of constant-rate (velocity)-based prediction (CRP) and a constant-acceleration-based prediction (CAP). In some embodiments, the method further includes confirming values of the first and second error margins in real-time based on the head tracking position information received from the client device. The first prediction error margin and the second prediction error margin are, in some embodiments, based on errors between the received head tracking position information and predicted motion data.

Determining the overfill factor based on the expected error in the predicted head position of the user includes, in some embodiments, setting the overfill factor based at least in part on the first and second prediction error margins. The overfill factor includes, in some embodiments, a first overfill factor value for a horizontal axis and a second overfill factor value for a vertical axis, the first and second overfill factor values being different from each other. In some embodiments, the method further includes determining a combined FOV associated with the overfilled image based on the first predicted FOV and the second predicted FOV. Determining the combined FOV based on the first predicted FOV and the second predicted FOV comprises combining (i) a first adjusted predicted FOV, wherein the first adjusted predicted FOV is determined by adding the first error margin to the first predicted FOV and (ii) a second adjusted predicted FOV, wherein the second adjusted predicted FOV is determined by adding the second error margin to the second predicted FOV. In some embodiments, the combined FOV is determined by selecting a rectangular area that includes the first and second adjusted FOVs. In some embodiments, the combined FOV is determined by selecting a hexagonal shape that includes the first and second adjusted FOVs. Rendering the overfilled image includes, in some embodiments, applying the overfill factor with respect to a center point of the combined FOV.

The method further includes, according to some embodiments, determining a time T, wherein the time T represents a predicted scan-out time for the VR video frame including the overfilled image. The time T is predicted, in some embodiments, based on a rendering-to-scan-out latency distribution. In some embodiments, the time T corresponds to a median or average value of the rendering-to-scan-out latency distribution. According to some embodiments, the method further includes: determining an extended FOV of the user for the time T based on a direction and speed of a head rotation of the user; and aligning a center position of the extended FOV with a center position of the predicted FOV to produce a final extended FOV.

In accordance with some embodiments, a method performed at a server includes: determining that a loss in a field of view (FOV) in a virtual reality (VR) frame transmitted to a client device has occurred; and adaptively adjusting an overfill factor weight according to a determination the loss in the FOV has occurred. In some embodiments, the method further includes: in response to a determination that the loss in the FOV has occurred, increasing the overfill weight factor; and in response to a determination that the loss in the FOV has not occurred, reducing the overfill weight factor. A reduction in the overfill weight factor is performed, in some embodiments, upon determining that no loss in the FOV has occurred in a given number of VR video frames.

Further, in some embodiments, the method includes receiving feedback information from the client device when the loss in the FOV has occurred. The feedback information includes, in some embodiments, a FOV loss ratio. Further, in some embodiments, the method includes determining a first overfill factor value for a horizontal axis and a second overfill factor value for a vertical axis, wherein a determination of the first and second overfill factors comprises identifying a rotational speed of a user head at the client side for each of the horizontal and vertical axis, respectively, and multiplying the weight factor by the rotational speed. Yet further, in some embodiments, the method includes performing a ping exchange with the client device to determine a connection latency.

In accordance with some embodiments, a method performed by a virtual reality (VR) client device includes: receiving a first virtual reality (VR) video frame from a server; in response to a receipt of the first VR video frame, transmitting to the server timing information wherein the timing information includes at least a scan-out starting time of the received first VR video frame; sending to the server motion information of a user of the VR client device; receiving from the server a second VR video frame, wherein the second VR video frame contains an overfilled image, the overfilled image being based on (i) a predicted head position of the user at a scan-out time of the second VR video frame for display to the user and (ii) an overfill factor; and displaying a selected portion of the overfilled image to the user, wherein the portion is selected based on an actual head position of the user at the scan-out time of the second VR video frame, and wherein the predicted head position is based on the transmitted motion information of the user and the overfill factor is based on an expected error in the predicted head position of the user.

In some embodiments, the motion information includes an IMU-based motion data. In some embodiments, the client device includes a head-mounted display (HMD). Further, in some embodiments, a frame size of the received second VR video frame including the overfilled image is different from a frame size of the received first VR video frame.

According to some embodiments, an aspect ratio of the received second VR video frame including the overfilled image is different from an aspect ratio of the first received VR video frame. In some embodiments, at least one of pixel dimensions or an aspect ratio of the received second VR video frame including the overfilled image is different from that of the first received VR video frame due a change in a connection latency between the client device and the server. In some embodiments, at least one of pixel dimensions or an aspect ratio of the received second VR video frame including the overfilled image is different from that of the first received VR video frame due to a change in a head rotation of the user.

Further, in some embodiments, the method includes receiving an indication of at least one of the pixel dimensions or the aspect ratio from the server prior to the scan-out time. In some embodiments, each of the received first and second VR video frames includes a respective time stamp indicative of a frame render time at the server. Further, in some embodiments, the method includes timewarping at least one of the first or second VR video frames. Yet further, in some embodiments, the method includes tracking an actual head position of the user.

Other embodiments include a system, a server, and a VR client device configured (e.g., having a processor and a non-transitory computer-readable medium storing a plurality of instructions for execution by the processor) to perform the methods described herein. In some embodiments, the VR client device includes a head-mounted display (HMD).

BRIEF DESCRIPTION OF THE DRAWINGS

Like reference numerals in the figures indicate like elements, and:

FIG. 1B is a system diagram illustrating an example wireless transmit/receive unit (WTRU) that may be used within the communications system illustrated in FIG. 1A according to an embodiment;

FIG. 25 is a graph illustrating an example latency distribution, in accordance with some embodiments.

FIG. 26 is a diagram illustrating a number of FOVs, in accordance with some embodiments.

FIG. 30A is a diagram illustrating an example output VR frame in view of a user's head rotation direction of a user.

FIG. 30B is a diagram illustrating an effect of a user's head rotation direction on an output VR frame, in accordance with some embodiments.

DETAILED DESCRIPTION

Figure 1A:
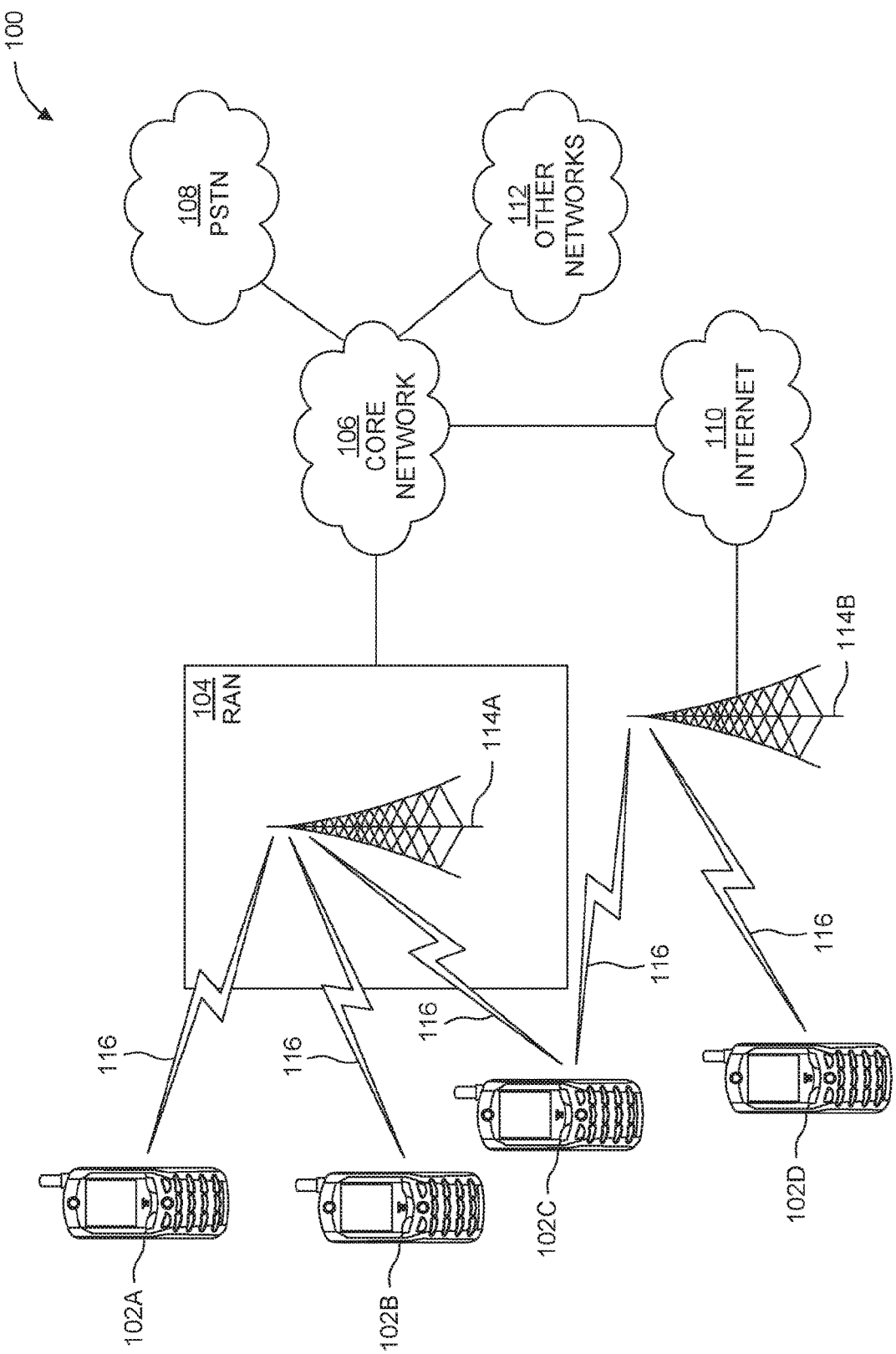
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
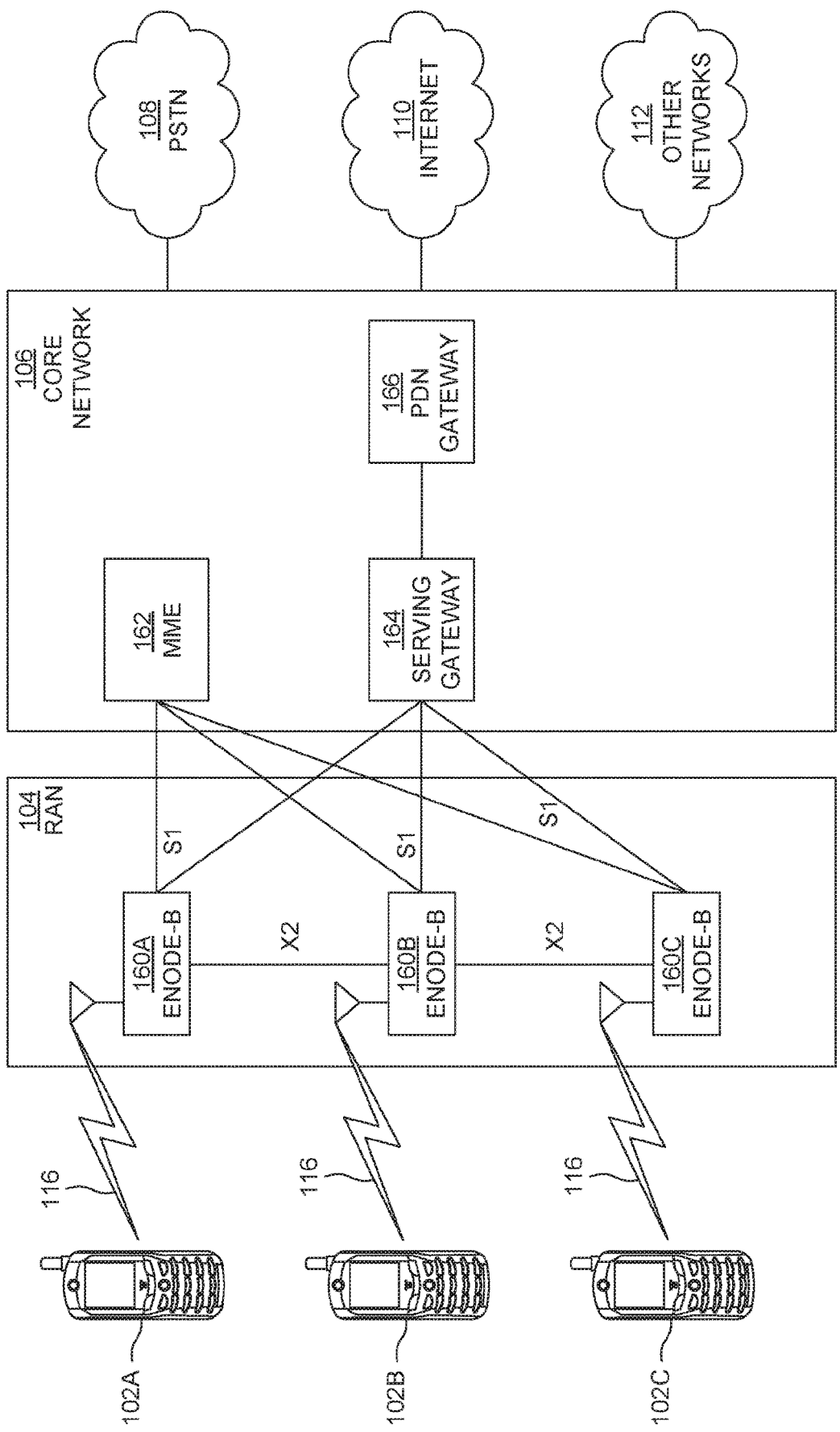
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

Figure 10:
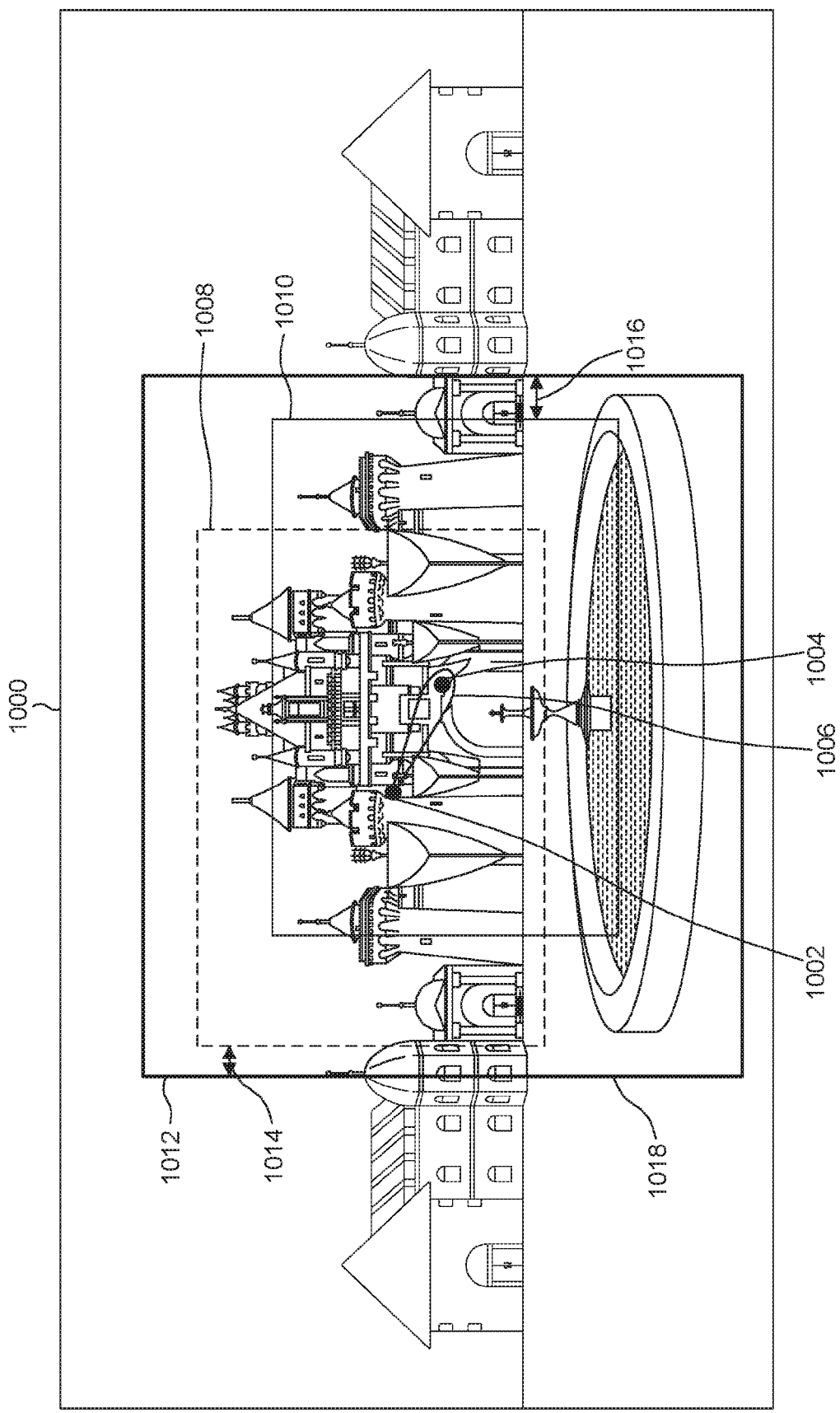
FIG. 10 shows an example virtual reality environment, in accordance with some embodiments.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
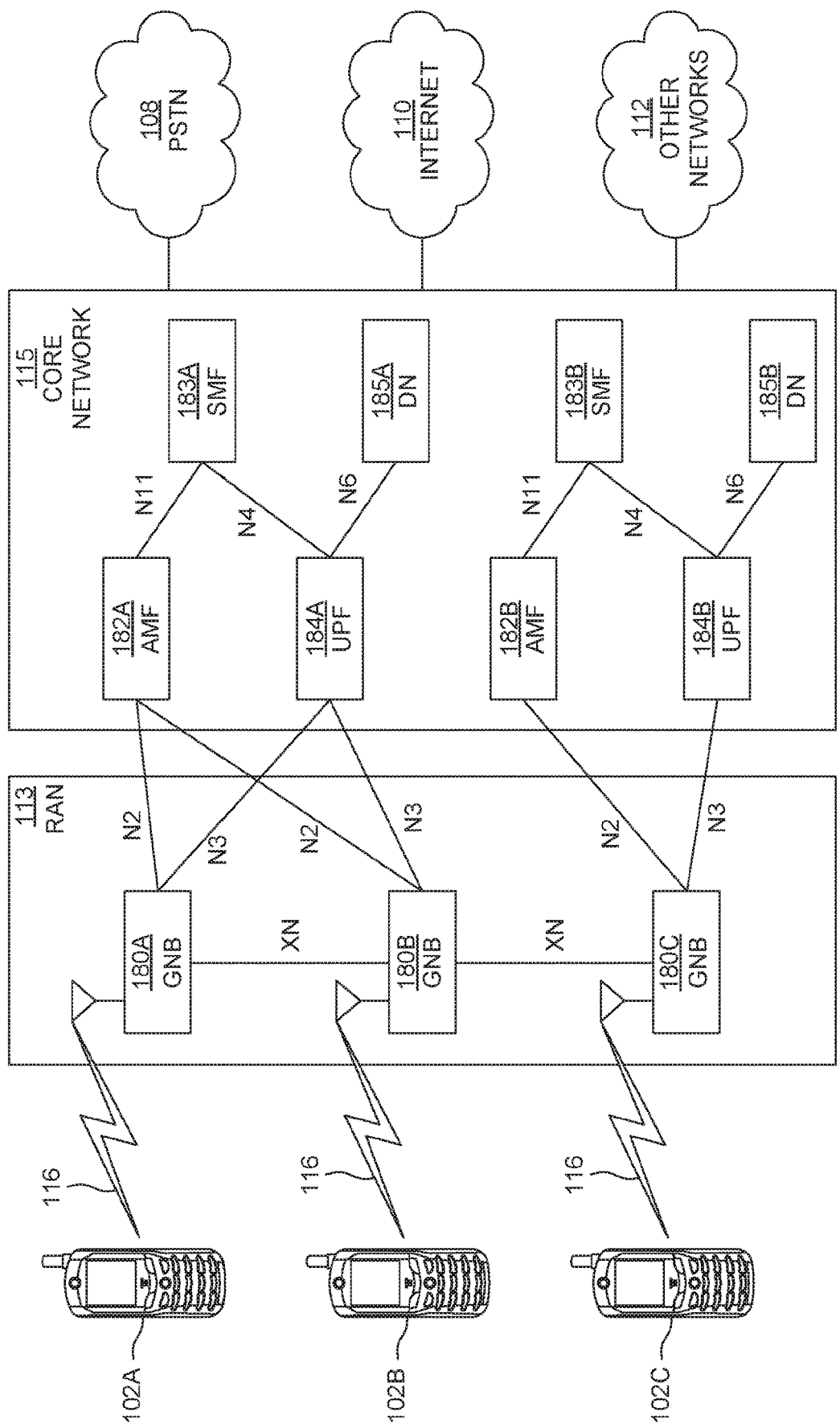
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 10, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
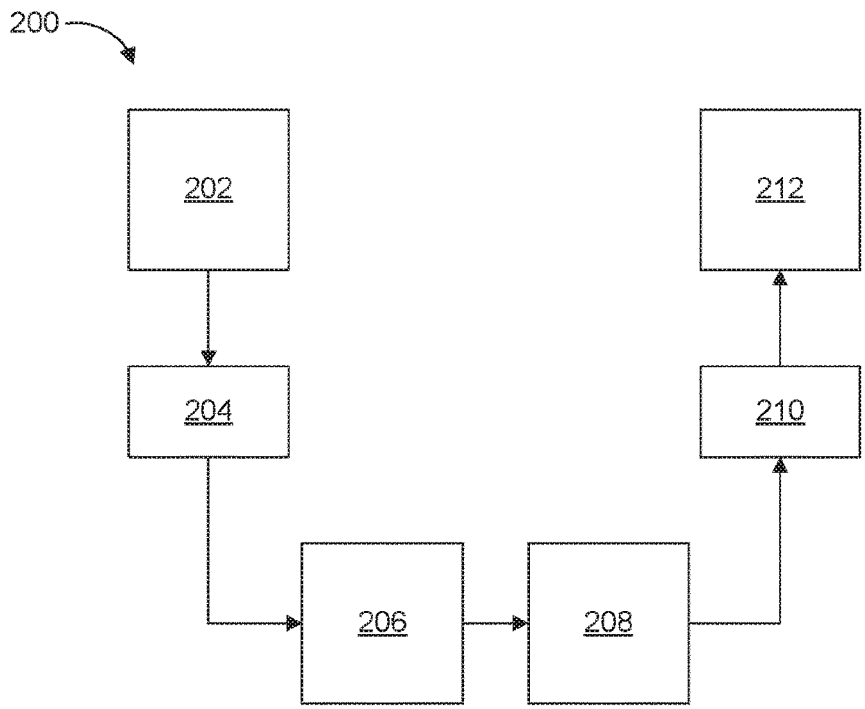
FIG. 2 is a flow diagram of an example procedure for local VR services.

FIG. 2 is a flow diagram of an example procedure for local VR services. FIG. 2 shows an example of latency of a local VR environment in which a user device has a wired connection to a local computer. At 202, information of a user's motion and/or head orientation (e.g., inertial measurement unit (IMU) sensor data) may be measured at the user device (also referred herein in places as a "client device"), and at 204, transmitted to the local computer (e.g., a desktop computer, e.g., via a USB connection). At 206, the local computer may then generate a new VR video frame based on the latest motion information and, at 208, may send the new VR video frame to the user device (e.g., typically over a HDMI cable). Because the motion of the user may keep changing during the procedure, the frame received by the user device and processed at 210 (including, e.g., pixel switching) may show a different field of view (FOV) from that of the user's actual FOV when, at the time 212, the frame including a new image is displayed to the user on the user device.

To reduce motion-to-photon (MTP) delay (e.g., an MTP latency), some VR systems or devices perform user head prediction methods. The current FOV is reported by a sensor, which provides a direction in which a user is currently looking. Then, a VR computer renders an image corresponding to where the user's head is expected to be positioned, rather than where the users head was positioned at the time of rendering. Some current VR systems predict the future head position based on constant-acceleration based prediction methods. However, a prediction error may become large at a time when the user's motion status is rapidly changed.

In remote or cloud-based VR service environments, or VR service environments where an HMD is wirelessly connected with a local server, latency is generally larger than latency in local VR service environments using wired connections (as, e.g., in FIG. 2). To illustrate, due to a long distance between a cloud server and an HMD, network delay may be added in both directions of transmission. Unlike in the example local VR environment, in which the HMD and the local computer may communicate via USB and/or HDMI, in remote VR service environments, network delay may be more problematic than other types of delay due to the variable characteristic of some network delay.

Figure 3:
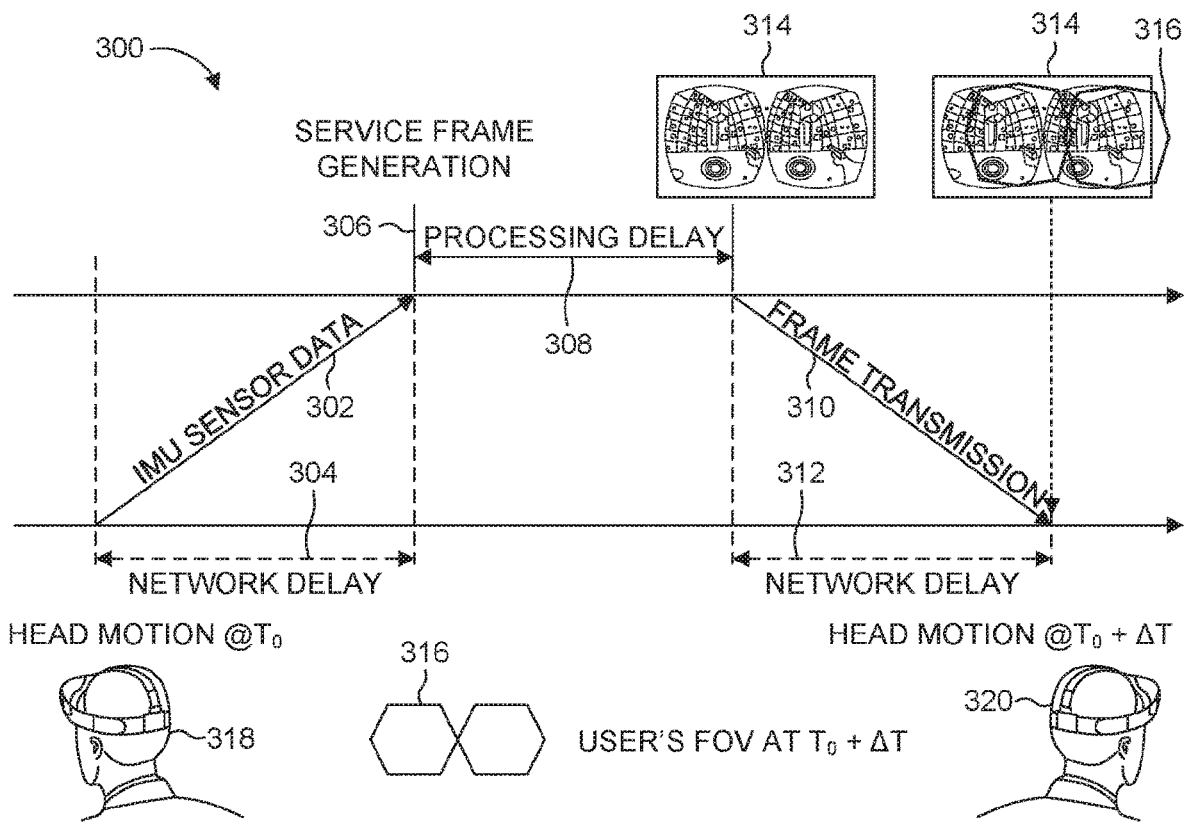
FIG. 3 illustrates an example procedure for remote or cloud-based VR services.

FIG. 3 illustrates an example procedure 300 for remote or cloud-based VR services. For example, FIG. 3 shows a users head position (denoted as "motion" in FIG. 3) at a time $T_0$ (318). Further, as shown in FIG. 3, a network delay 304 may occur during a transmission of IMU sensor data 302 (e.g., corresponding to data sampled at the time $T_0$) from an HMD (as a form of client device) to a server via a network. At 306, the server may generate a service frame. In some embodiments, the service frame (or, e.g., the service image) refers to VR content that a user device (e.g., the HMD, as in the present example) provides for display to the user. In some embodiments, the service frame generated by the user device may reflect the user's position and head direction (e.g., user's view). Frame generation may incur a processing delay 308, and FIG. 3 shows an image 314 that the user would see assuming that after the delay 308 the user's head remains at the same position. At 310, the sever transmits the frame to the client device via a network. This frame transmission incurs an additional network delay 312. As shown, when the rendered frame is received at the client device the user's head position (denoted as "motion" in FIG. 3) may change at a time $T_0+\Delta T$ (320). In some embodiments, $\Delta T$ represents an amount of time that includes a sum of the network delay 304, the processing delay 308, and the network delay 312. Hence, due to the user's head motion, an FOV 316 of the user at the time $T_0+\Delta T$ is different from what it was at the time $T_0$, and hence, the user is not able to see the entirety of the image 314 that was transmitted from the server.

Figure 4:
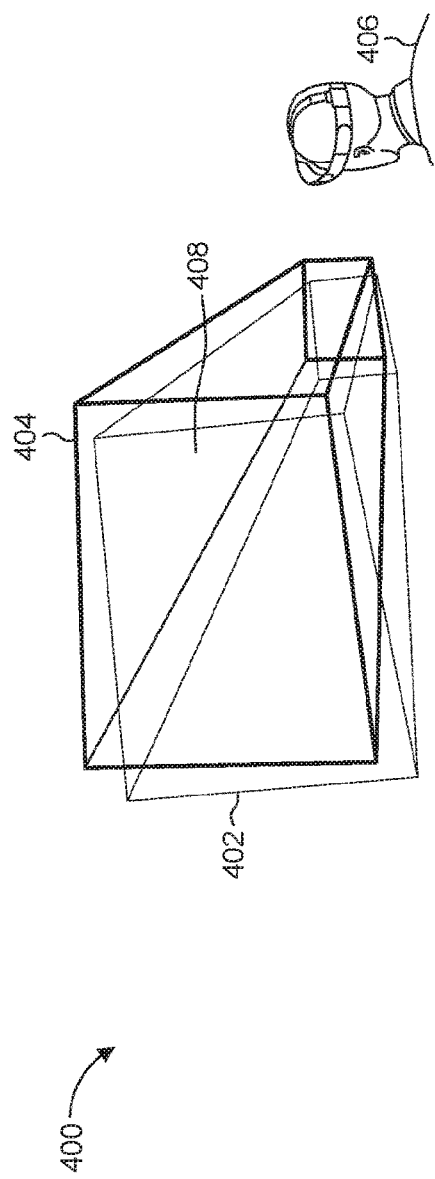
FIG. 4 is a diagram showing an example timewarping of a video frame, in accordance with some embodiments.

FIG. 4 is a diagram showing an example timewarping 400 of a video frame, in accordance with some embodiments. In general, timewarp is a technique to shift a VR video frame right before the frame is scanned out to a display. As shown by way of example in FIG. 4, timewarp takes into consideration a difference between an FOV 402 of a received frame and a current FOV 404 of a user 406 at or near the time of display to produce a shifted frame 408 (shifted by timewarp). In some cases, timewarp may reduce or prevent motion sickness (e.g., a VR sickness) that may result from an inconsistency between the two FOVs.

Figure 5:
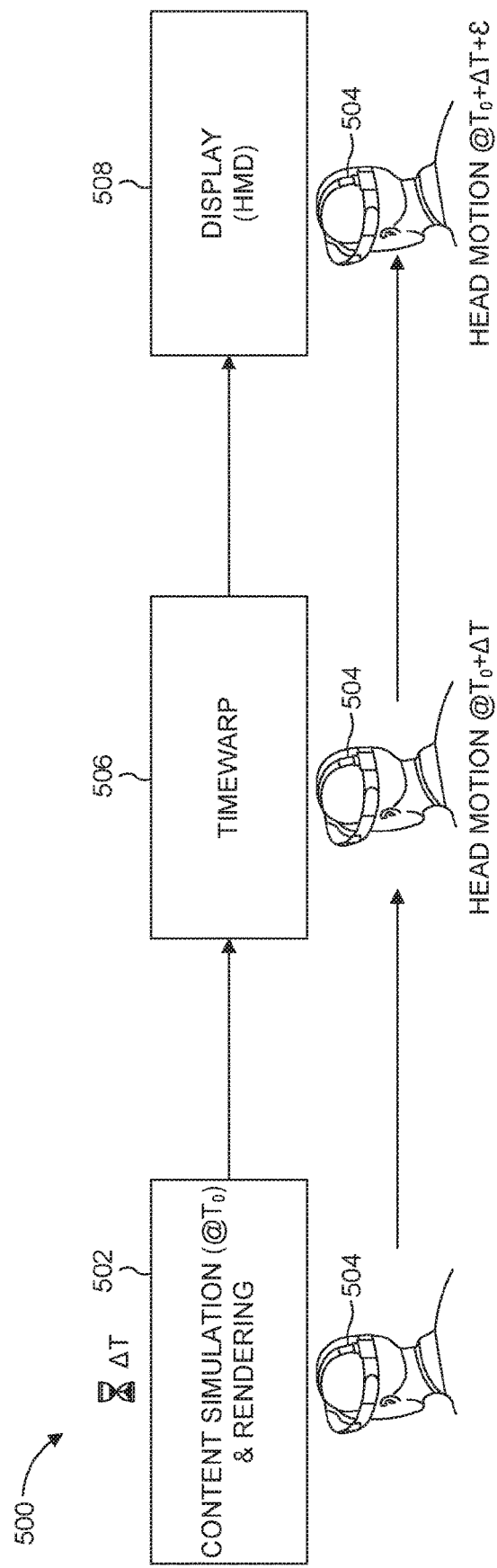
FIG. 5 is a flow diagram of an example server-side timewarp procedure, in accordance with some embodiments.

FIG. 5 is a flow diagram of an example server-side timewarp procedure 500, in accordance with some embodiments. In some embodiments, server-side timewarp may be used in a VR environment where an HMD and a server computer are, e.g., directly connected by an HDMI cable. As shown in FIG. 5, at 502, at a time $T_0$, the server may perform content simulation and rendering. At a time $T_0+\Delta T$, a user 504 wearing the HMD may move (e.g., the user may perform head motion at the time $T_0+\Delta T$, as shown in FIG. 5). Accordingly, at 506, the server may perform timewarping and may transmit a shifted frame to the HMD, for example, over an HDMI cable. The HMD may receive information through, e.g., the HDMI cable and, at 508, may display the received information at 508. The received information, which includes the shifted frame that was timewarped by the server according to a changed head angle of the user 504 during or after rendering of the frame but before the frame was timewarped. As shown in FIG. 5, the user 504 may move at a time $T_0+\Delta T+\varepsilon$, where $\varepsilon$ represents an MTP (motion-to-photon) latency corresponding to a server-side timewarp. In some embodiments, this movement may not be taken into account in the frame displayed at the HMD to the user, since latency of HDMI transmission may be relatively small, and no, e.g., detectable change in the user's FOV may occur.

Figure 6:
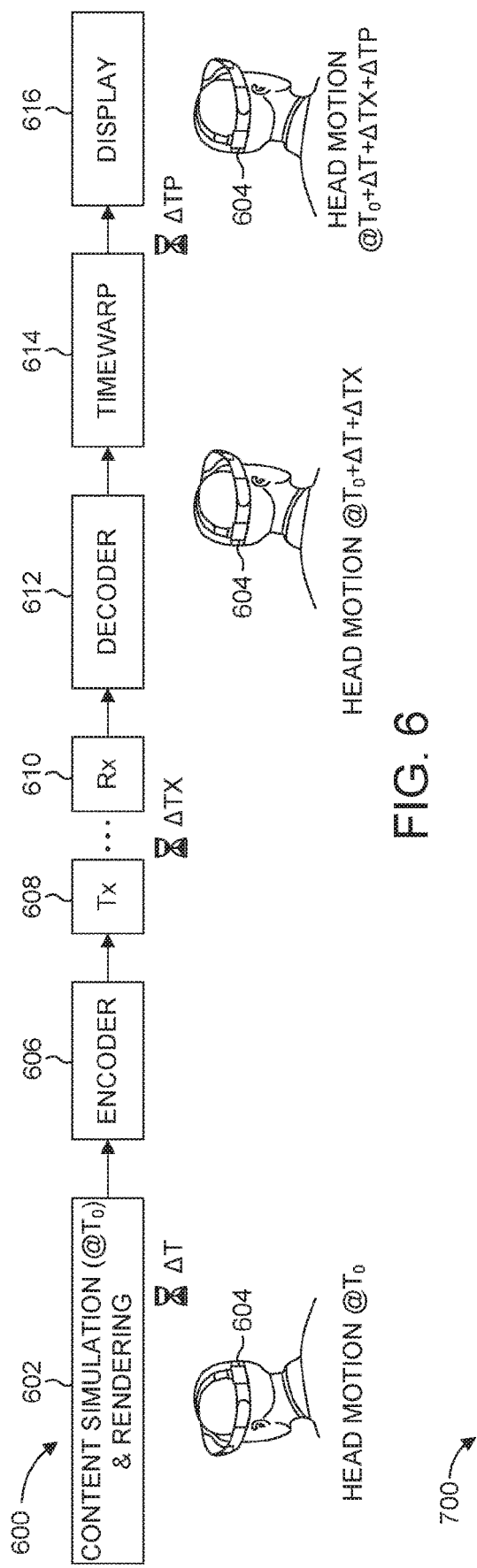
FIG. 6 is a flow diagram of an example client-side (e.g., an HMD-side) timewarp procedure, in accordance with some embodiments.

FIG. 6 is a flow diagram of an example client-side (e.g., HMD-side) timewarp procedure 600, in accordance with some embodiments. As described above, in some embodiments, a timewarp performed by a server generally does not reflect additional changes of a user's FOV that may occur during encode and transfer of a frame from the server. Server-side timewarp may thus cause a larger MTP latency than, e.g., a client-side timewarp, and hence, in some cases, may cause user motion sickness in a VR service environment which has a network delay. Thus, in some embodiments, the client-side timewarp may be more appropriate when the client and the server are connected wirelessly or, e.g., a cloud server is used for content rendering.

As shown in FIG. 6, at 602, at a time $T_0$, the server may perform content simulation and rendering. FIG. 6 shows a head position of a user 604 wearing an HMD at the time $T_0$. At 606, the server may encode the content and, at 608, may transmit (Tx) a (VR video) frame to the HMD over a communication medium, e.g., a wireless connection. The content processing at the server prior to the frame transmission may incur additional amount of time $\Delta T$, and an additional delay $\Delta TX$ during a transfer of the frame from the server to the client, as shown in FIG. 6. During time period from the time $T_0$ to a time $T_0+\Delta T+\Delta TX$, the user 604 wearing the HMD may move (e.g., the user 604 may perform head motion resulting in an altered head position at the time $T_0+\Delta T+\Delta TX$, as shown in FIG. 6). The HMD may receive (Rx) the frame at 610, and decode it at 612. At 614, the HMD may perform timewarp to produce a shifted frame for display to the user. The timewarp may take into account (e.g. may compensate for) the motion of the user during the time period from the time $T_0$ to the time $T_0+\Delta T+\Delta TX$, as measured at a client device (the HMD in this example). Prior to displaying of the shifted (e.g., timewarped) frame, at 616, however, the process of timewarping by the client may incur additional amount of time $\Delta TP$. As shown in FIG. 6, in some embodiments, the user 604 may move during this additional time $\Delta TP$, resulting in a further altered head position at a time $T_0+\Delta T+\Delta TX+\Delta TP$. In some embodiments, $\Delta TX+\Delta TP$ represents a component of MTP latency that remains after (or is not compensated by) a server-side timewarp. In some embodiments, $\Delta TP$ represents a component of MTP latency that remains after (or is not compensated by) a client-side timewarp. Hence, in some cases, a component of MTP latency associated with network latency (e.g. $\Delta TX$) may be compensated by performing client-side timewarp.

Figure 7:
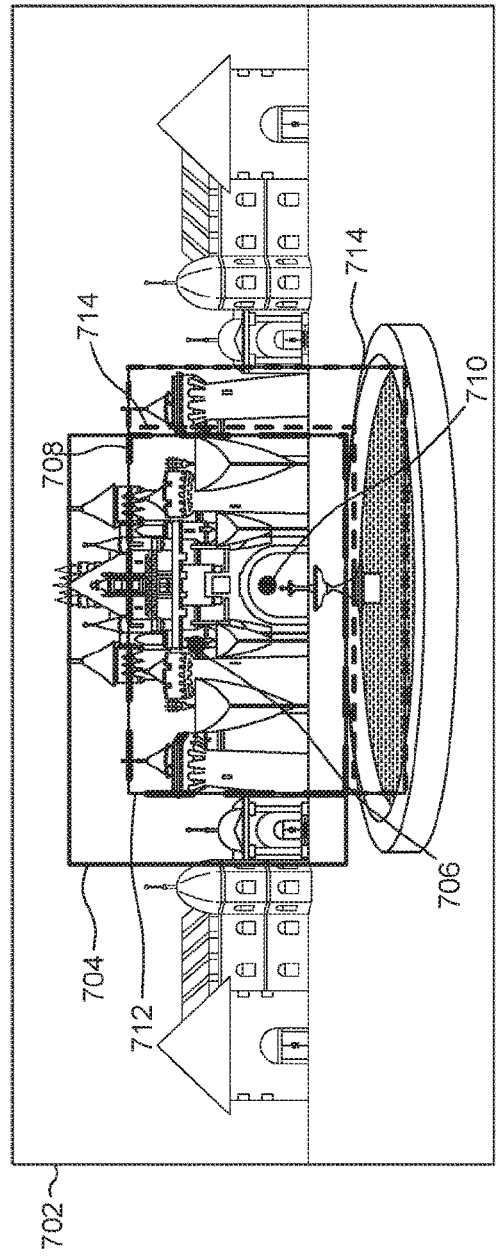
FIG. 7 shows an example of a scenario in which an FOV loss after timewarping occurs, in accordance with some embodiments.

FIG. 7 shows an example of a scenario 700 in which an FOV loss after timewarping occurs, in accordance with some embodiments. In the example of FIG. 7, a rendered image 704 (showing, e.g., a portion of a virtual world 702) may have substantially the same size as a display size of an HMD's display that displays the image. For example, in the scenario 700 in which a FOV loss 714 after timewarping occurs, the HMD may be configured to display an image (e.g., an image included in a frame) having a particular resolution, and the image is rendered (e.g., as the rendered image 704) to have the particular resolution. As described above in connection with FIG. 4, in timewarping, a frame may be shifted according to a user's motion that occurs at or after a time that the frame is rendered. As shown, by way of example in FIG. 7, if the image 704 has been rendered based on a fixation point 706 at a predicted scan-out time TP (or, in other words, predicted scan-out timing), but the rendered image 704 is scanned out at an actual time $T_A$ (or, in other words, actual scan-out timing) due to varying latency, the rendered image 704 is shifted by a timewarp before being scanned out so as to be aligned with a fixation point 710 at the time $T_A$. FIG. 7 shows a user's effective FOV 708 at the time $T_A$ and a user's FOV 712 at the time $T_A$. In some embodiments, a user's FOV (e.g., the user's FOV 712) refers to an image area that should be provided to the user at the time $T_A$, while a users effective FOV (e.g., the users effective FOV 708) refers to an image area that that a VR system can actually provide to the user. If the difference between the times TP and $T_A$ is relatively large and the user wearing the HMD makes a substantial motion during the time period, a degree of shift by timewarp may also be relatively large. Hence, in some embodiments, the shifted image cannot fill the display fully, and for example, a region of the display with no image appears black to the user. As shown in FIG. 7, the users effective FOV 708 includes only a portion of the FOV 712. This may lead to the user feeling FOV loss, such as the FOV loss 714 as in FIG. 7, and the user's immersiveness may thus deteriorate.

Figure 8:
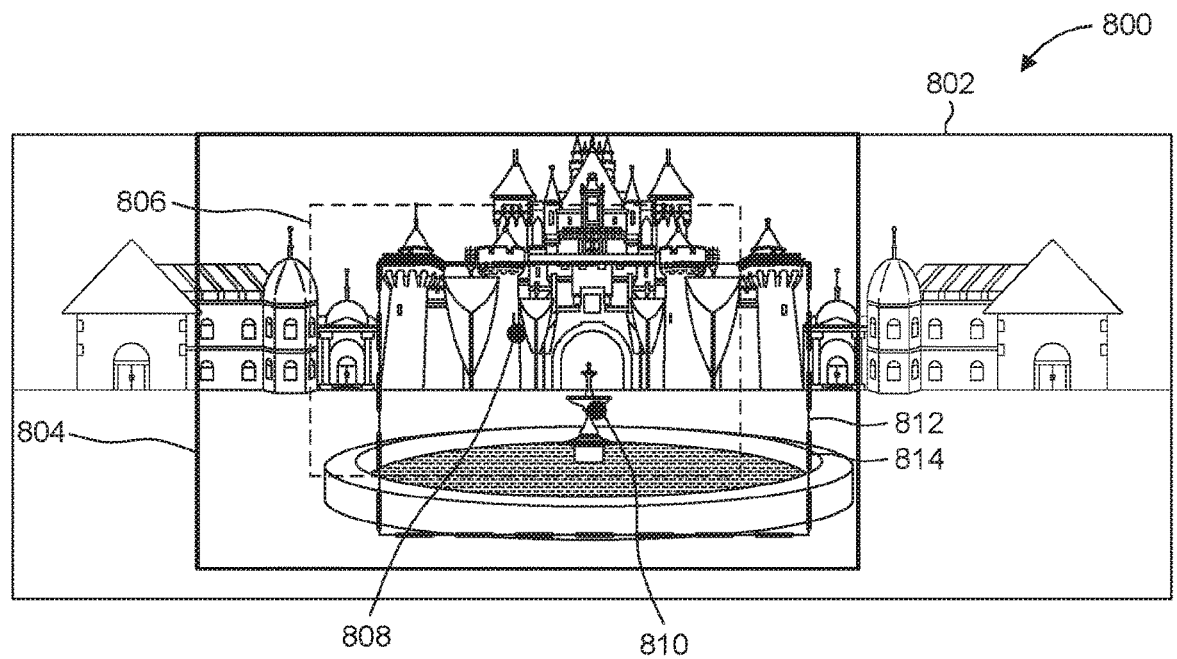
FIG. 8 illustrates an example overfilling procedure.

To minimize an FOV loss, typical VR rendering techniques may support overfilling by which an image is rendered larger than a display size. FIG. 8 illustrates an example of an example overfilling procedure. As shown in FIG. 8, a rendered image 804 (showing, e.g., a portion of a virtual world 802) may be rendered larger than a display size 806, with a margin added at the boundaries of the image 806 for all directions evenly. To determine the size of the margin, a scaling factor parameter may be defined. FIG. 8 illustrates a fixation point 808 at a predicted scan-out time IP (or, in other words, predicted scan-out timing), a fixation point 810 at an actual time $T_A$ (or, in other words, actual scan-out timing), a users effective FOV 812 at the time $T_A$ and a users FOV 814 at the time $T_A$. With the overfilling margin applied, it may be more probable that the users FOV 814 at the time of scan-out is also within the rendered image 804 with the overfilling (as shown in FIG. 8) than without the overfilling. Thus, the display may show the rendered image 804 essentially aligned to the fixation point 810 at time $T_A$ with no black boundaries.

An overfill factor normally refers to a factor that determines how many more pixels to render than an amount of pixels that a user will ultimately see through a service image in order to prevent an FOV loss after a timewarp. Some current VR systems generally use motion information of the user identified by the latest IMU data to render the image. Because the image is displayed at the time of the next service frame scan-out (e.g., VSync (Vertical Synchronization)), these current VR systems predict the user's later FOV based on the latest IMU data.

Figure 9:
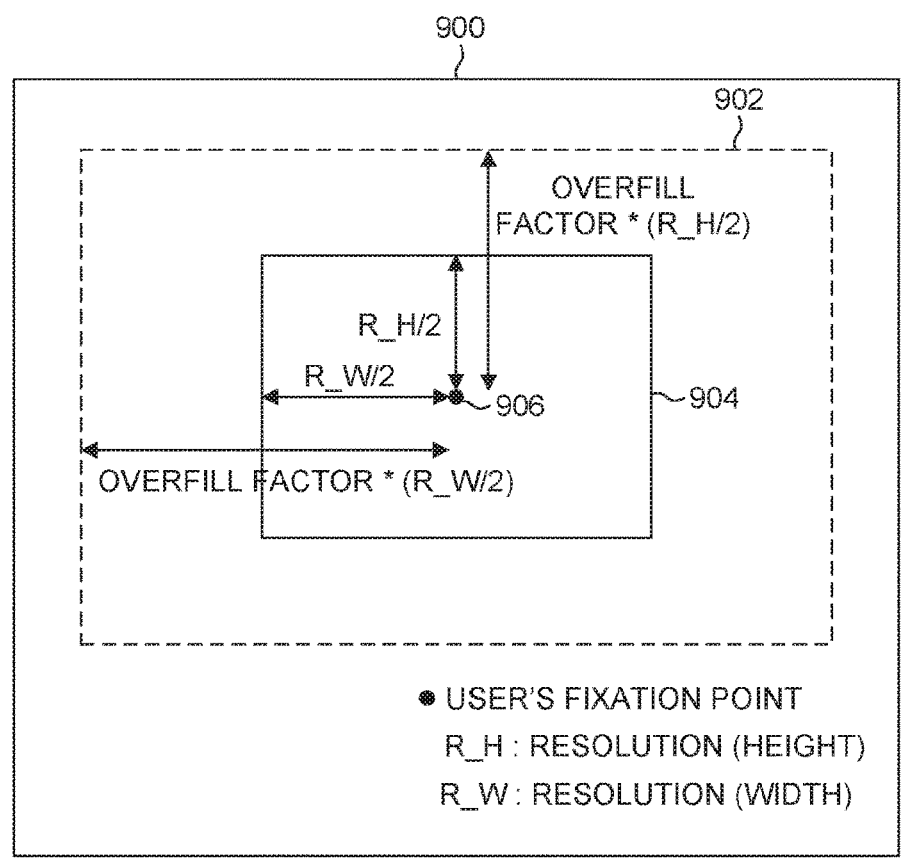
FIG. 9 shows an example overfilling rendering region.

Hence, in such systems, rendering is performed on the predicted orientation, and the rendering is performed for a rendering region that is as large as the overfill factor (which is the same for both axes) to prevent FOV loss problems after the timewarp. FIG. 9 shows an example of an overfilling rendering region. As shown in FIG. 9, a rendering region 902 (showing, e.g., a portion of a virtual world 900) includes a user's FOV 904 extended along both x and y axes with respect to a user's fixation point 906 by applying an overfill factor as shown in FIG. 9, where R_H represents a vertical resolution (along height direction) and R_W represents a horizontal resolution (along a width direction).

Overfilling may reduce or eliminate FOV loss after timewarping, but it may do so at the expense of increased computing load, for example, on the server. An example technique to estimate the computing load for rendering is to count a number of pixels of a resulting image. Thus, by this estimation technique, the computing load to be increased by overfilling is proportional to a margin area added during the overfill process. As the margin area increases, the probability that a user has a FOV loss may decrease, but at the expense of increased computing load. As an example, if a VR system uses an overfill factor of two (2) for a typical example overfilling procedure, the VR system will render four (4) times as many pixels (two (2) times in both the horizontal and vertical directions) than is to be provided to a user. In addition to the increased rendering load at the server, a network load for transferring the overfilled image from server to client is increased as well.

The price of a powerful processor that may be used to handle high FPS (frames per second) and resolution of current VR systems (which may increase for dual displays) may make it difficult for ordinary users to experience immersive VR applications. If a computing power is consumed in the process of overfilling, the performance expected of the equipment used in VR applications employing overfilling will be higher. On the other hand, if a VR system uses a small overfill factor in overfilling mechanism to reduce the computing power consumed by rendering, a FOV loss problem of timewarping may occur.

Further, typical overfilling generally assumes that a service frame will be provided to a user in accordance with a VSync signal, so it may be considered a strict time-based system. For cloud-based VR systems or other VR systems using a wireless connection with an HMD, a probability exists that the service frame will not be delivered until after the targeted VSync due to the nature of network latency. In such scenarios, existing overfill methods may not work well or may use a very large overfill factor.

In accordance with some embodiments, systems and methods described herein use dynamic overfill factors for each of horizontal and vertical image resolutions. In contrast, in typical overfilling methods as illustrated in FIG. 9, the same overfill factor is effectively used for both horizontal and vertical image resolutions. In some embodiments, the overfill factors are calculated from both measured rendering-to-display latency distributions and motion error margins at two representative timing points that cover, e.g., most latency distributions. In some embodiments, a predictive overfilling technique is employed in which a FOV loss is minimized or eliminated. With various techniques disclosed herein, according to some embodiments, an associated computing load may be reduced as compared to some typical overfilling techniques. In some embodiments, a predictive overfilling technique is employed that adapts to system latency rather than a target time.

As described above, shifting a rendered VR image in an attempt to align it with the latest fixation point right before scan-out results, in at least some cases, in a FOV loss, which may get worse as the latency from both VR image processing and network delivery increases. Over-rendering a VR image larger than a display size may help reduce the FOV loss, but often at the expense of increased processing load.

According to some embodiments, systems and methods described herein may adjust an over-rendering region based on a user's head movement information and rendering-to-scan-out latency measurements. Some example embodiments enlarge an area of rendering based on a predicted movement path of fixation points, thus minimizing an FOV loss problem with potentially reduced computing load. Some example embodiments pick a range of time within which a rendered image is likely to be scanned out despite varying latency. Then, the image may be rendered such that the resulting image covers FOVs at both ends of the timing range with the FOVs including individual prediction error margins to produce a potential FOV. Since the prediction errors for the two ends of the range will differ (for instance, an error typically increases as the anticipation time gets longer), the example embodiments apply different error margins to each FOV. Note that, in some embodiments, the anticipation time represents a difference between a current time point and a future time point at which prediction is performed. Performing prediction at a future time point may result in prediction error which typically increases when predicting at a time point further into the future. In some cases, the prediction error increases as the time point associated with the prediction gets further away from the time of capture of data on which the prediction is based.

Note that in various embodiments disclosed herein, an HMD and/or other client device associated with a user may be implemented as one or more WTRUs as described herein, in accordance with some embodiments.

FIG. 10 shows an example virtual reality environment 1000, in accordance with some embodiments. In the example of FIG. 10, a portion of the virtual reality environment 1000 is rendered with a predictive overfilling described herein, in accordance with some embodiments. In some embodiments, employing the predictive overfilling renders an overfilled image, such as an image 1012 (rendered image 1012), that may be overfilled in a directional manner (e.g., the overfilling is not uniformly applied in all directions). To illustrate, right before rendering the image, for example, a server may predict user's future fixation points at two time points, T1 and T2. FIG. 10 shows (i) a predicted fixation point 1002 at the time T1 and an associated predicted FOV 1008 at the time T1, and (ii) a predicted fixation point 1004 at the time T2 and an associated predicted FOV 1010 at the time T2. Further, a trajectory 1006 of the fixation points is shown in FIG. 10. In some embodiments, T1 provides a lower bound on an expected scan-out time, and T2 provides an upper bound on the expected scan-out time. In some embodiments, T1 and T2 are selected based on an assumption that the true (e.g., actual) scan-out time is likely to be within the range of [T1, T2]. Further, in some embodiments, T1 may be based on a corresponding predicted minimum scan-out latency, and T2 may be based on a corresponding predicted maximum scan-out latency. In some embodiments, a size of the rendered image 1012 is such that it fully covers both the predicted FOV 1008 at the fixation point at the time T1 and the predicted FOV 1010 at the fixation point at the time T2.

In some embodiments, as will be described in detail, a potential FOV (e.g., a combined FOV) 1018 may be formed based on the FOV 1008 at the time T1, the FOV 1010 at the time T2, an error margin 1014 for T1, and an error margin 1016 for T2. In this regard, in some embodiments, a midpoint (or a center/center point) for the potential FOV 1018 of the rendering region may be identified. As shown in FIG. 10, the potential FOV 1018 may include both the FOV 1008 for T1 and the FOV 1010 for T2. Individual overfill factors may be determined for each of horizontal and vertical axes, for example, by comparing (i) a number of pixels from the center point (of the potential FOV 1018) to the horizontal and vertical (width and height) boundaries of the potential FOV 1018 to (ii) a resolution of a service frame to be presented to a user.

Figure 11:
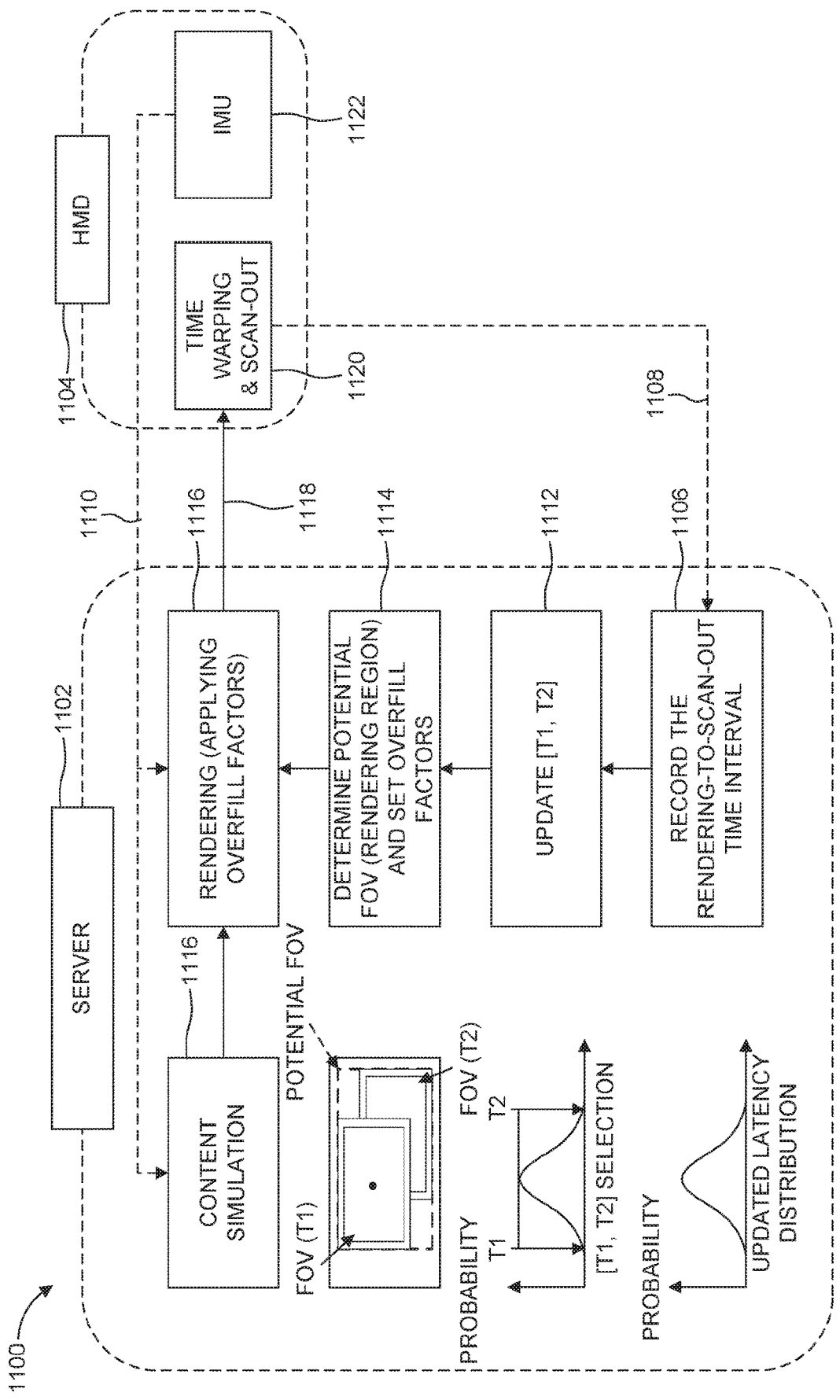
FIG. 11 is a flowchart of an example process for predictive overfilling, in accordance with some embodiments.

FIG. 11 is a flowchart of an example process 1100 for predictive overfilling, in accordance with some embodiments. The example process 1100 may be implemented by a remote computer, such as for example, a server 1102, and a user device, such as for example, an HMD 1104. An example method for obtaining times T1 and T2 (hereinafter referred to as "T1" and T2", for brevity) is shown in FIG. 11. At 1106, the server 1102 may keep track of a time it started to render a service frame and a time it takes for the service frame to be scanned out to the user. To do this tracking, in some embodiments, the server 1102 may, at 1108, receive scan-out timing information from, e.g., the HMD 1104. For example, the server 1102 may receive from the HMD 1104 feedback on the time of the scan-out of the service frame. In some embodiments, this feedback may be in addition to other feedback that the server may receive from the HMD 1104, such as, for example, user motion information (1110) including head tracking position information. In some embodiments, the user motion information may include IMU data collected by performing IMU processing 1122 at the HMD 1104. In some embodiments, at 1106, the server 1102 determines a latency distribution (also shown graphically in FIG. 11). The latency distribution may be based on the start rendering times (e.g., determined by the server 1102) and the scan-out times (e.g., received by the server 1102 from the HMD 1104) for frames rendered by the server 1102 and scanned-out by the HMD 1106. In some embodiments, the determined latency distribution will have a specific distribution due to the distribution of the time taken for rendering and a network latency.

Selection (e.g., an updated selection if selected before) of T1 and T2, at 1112 (also shown graphically in FIG. 11), may be based on the start time of rendering the video frame at the server, and the determined latency distribution. For example, T1 and T2 may be selected such that the probability that the scan out time of the video frame at the client will occur between times T1 and T2 may be above a threshold. T1 may be the start time of rendering at the server plus a lower bound on the rendering-to-scan-out latency, and T2 may be the start time of rendering at the server plus an upper bound on the rendering-to-scan-out latency. This is illustrated graphically in FIG. 11. Selection of T1 and T2 may be used to vary the degree to which predictive overfilling is applied. In other words, the overfilling performance may be adjusted by adjusting an interval between T1 and T2. For example, in some embodiments, as the time interval between T1 and T2 becomes longer, the overfilling performance increases (e.g. the probability of FOV loss decreases), but the overhead of processing and data increases because overfill factors are increased. At 1114, a potential FOV is determined based on respective predicted FOVs at T1 and T2 (also shown graphically in FIG. 11), and respective overfill factors are determined (e.g., set), as will be described in more detail later. On average, the error of a predicted fixation point of T2 will be larger than the error of a predicted fixation point of T1. Accordingly, in some embodiments, corresponding error margins are applied for the predicted FOVs of T1 and T2 (e.g., where a larger margin may be applied to T2). At 1116, the server 1102 may simulate content and render a VR video frame including an overfilled image based on (i) a predicted future head position of the user (determined, e.g., based on user motion information (1110) received from the HMD 1104 to predict a potential FOV) and the determined overfill factors based on an expected error in the predicted future head position of the user. As a result, in some embodiments, the rendering region (with overfill factors applied) is a region containing a prediction error margin for each predicted fixation point and the distance between the expected fixation points for T1 and T2. More specifically, when determining the rendering region, in some embodiments, a VR system (e.g., the server 1102 in this case) includes an FOV for all time points between T1 and T2, which is resolved by determining a rendering area that contains both FOVs for T1 and T2.

At 1118, the rendered VR video frame may be transmitted to the HMD 1104 as a part of a VR video stream. At the HMD 1104, at 1120, the HMD 1120 may, in some embodiments, perform timewarping on the received frame, and subsequently scan out the frame to the user.

Example embodiments of the present disclosure may reduce the size of an image rendered with typical overfilling, thus also reducing a computing load, while also still reducing or eliminating a FOV loss problem. Example embodiments may adjust overfill factors according to a user's head motion characteristic. For example, in some embodiments, because the overfill factors may increase only for the direction of the user's head rotation (e.g., the overfill factor for the vertical direction is close to 1 when the user rotates the head horizontally and maintains the head in the same or close to the same vertical position), content generation and/or transmission aspects may be more efficient.

In some scenarios, a cause of a large amount of latency in VR is the time to render a high-resolution image. For example, in some embodiments, for a computer used as a server, with everything else remaining constant, reducing a computing load to render an image will result in reduced rendering time, thus reducing the VR latency. In addition, in some embodiments, since the process of determining T1 and T2 takes into account the latency of the VR system, the process works adaptively to address a FOV loss problem even when a network latency is changing.

Further, example embodiments employing predictive overfilling, as disclosed herein, use less processing power than some omnidirectional overfilling techniques. In this regard, in some embodiments, the proposed methods using [T1, T2] only render a potential FOV, which may in some embodiments be a region merged from predicted FOVs at T1 and T2.

Figure 12:
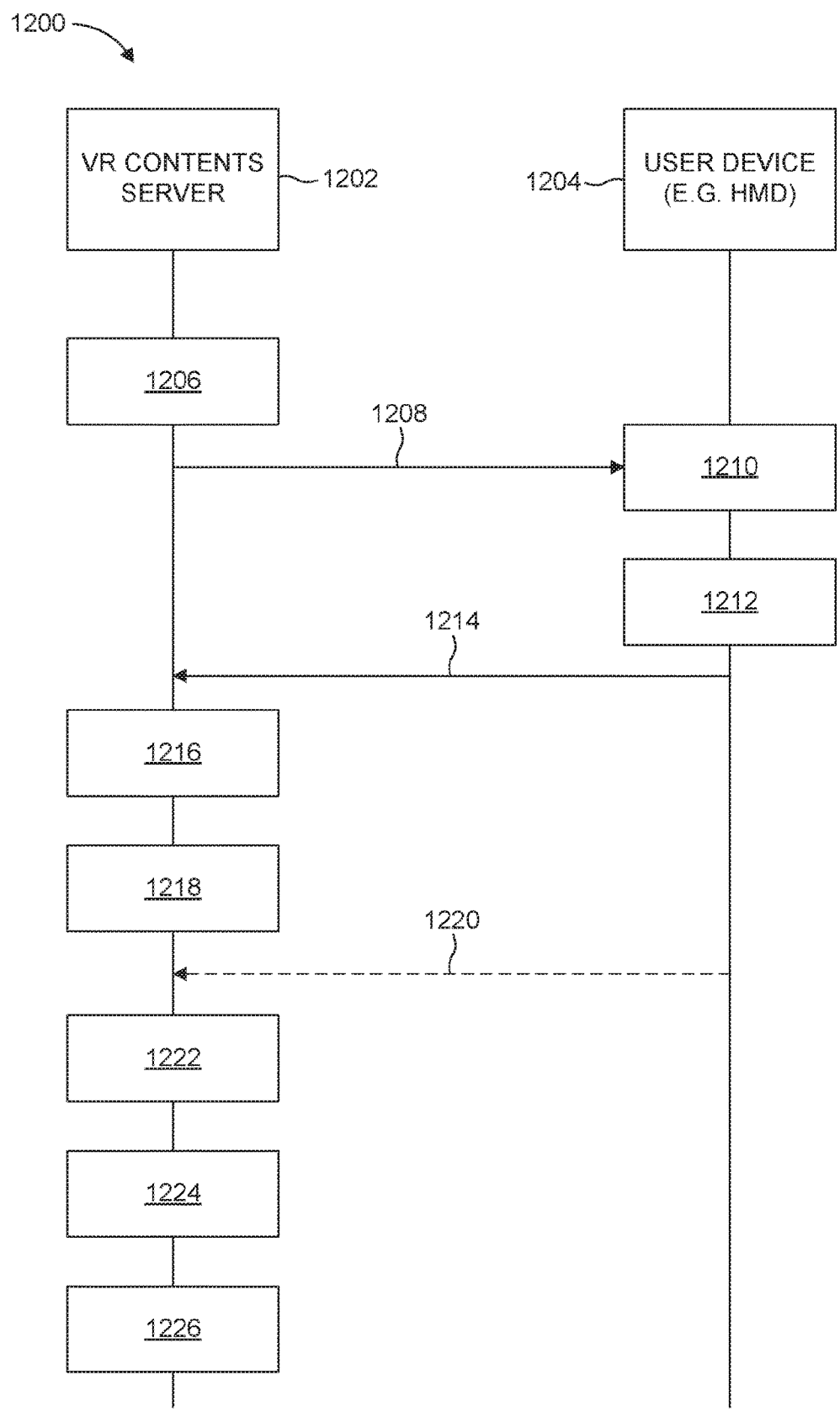
FIG. 12 is a flowchart of an example process, in accordance with some embodiments.

FIG. 12 is a messaging diagram of an example process 1200, in accordance with some embodiments. As shown, the example process is carried out between a VR contents server 1202 and a user (client) device 1204 (e.g., an HMD or another user device), and may be carried out iteratively (e.g., on a frame-by frame basis, only periodically, such as every given number of frames, etc.). In some embodiments FIG. 12 may begin, at 1206, with rendering of a new service frame (e.g., a new overfilled frame) by the VR contents server 1202. In some embodiments, once an overfilling factor is set, the example process described more fully below may repeat. For example, the example process may be executed repeatedly while VR content is being streamed. In some embodiments, the process may be continuously repeating so that at any given point in time, multiple steps of the process are being performed at the same time. Other options may be possible as well.

Referring back to 1206, the VR contents server 1202 may record a starting time ($T_R$) of the rendering of the new service frame. The generated (rendered) service frame (e.g., in the form of service packets) may be transmitted, at 1208, to the user device 1204. Transmitting the rendered frame, for example, from the VR contents server 1202 to the user device 1204 may include a network delay (e.g., packetized or packet delay).

In some embodiments, at 1210, the user device 1204 may perform time warping on the received frame from the VR content server 1202 and, at 1212 scan out the service frame. The user device 1204 may also determine timing information to be provided as feedback to the server 1202. In this regard, in some embodiments, the user device 1204 may record a scan-out starting time ($T_S$) of the received frame. Then, at 1214, the user device 1204 may send the scan-out starting time, $T_S$, to the VR contents server 1202, for example, via timing information feedback processing.

Figure 13:
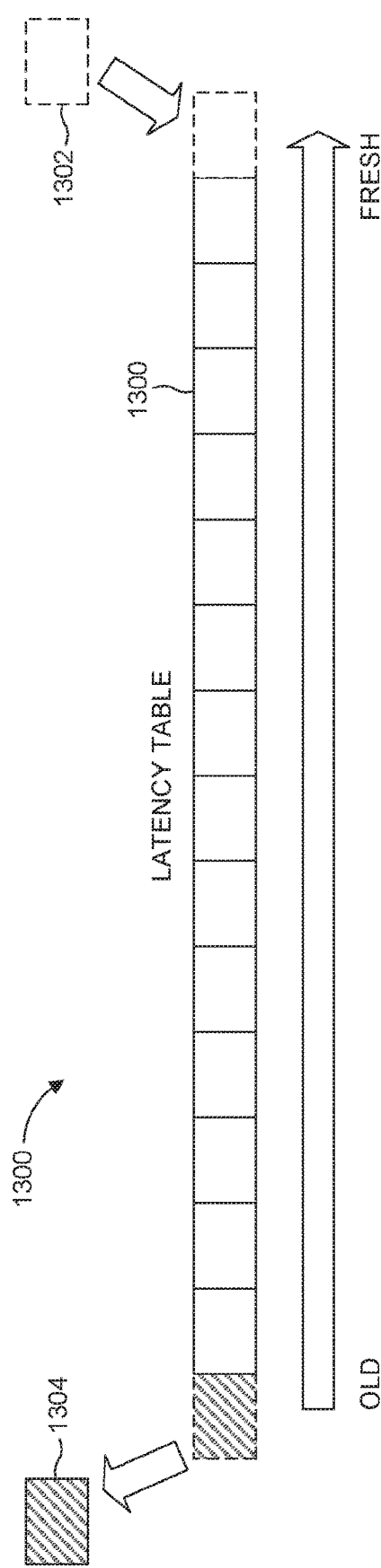
FIG. 13 shows an example latency table management process, in accordance with some embodiments.

In some embodiments, at 1216, a rendering-to-scan-out latency distribution is determined or refreshed. The rendering-to-scan-out latency of a frame may be, for example, measured by subtracting the recorded $T_R$ from the received $T_S$ (hence rendering-to scan-out latency=$T_S-T_R$). In some embodiments, $T_S$ and $T_R$ are synchronized or either one or both are adjusted in accordance with a time offset. (This may take into account clock time differences between the server and client, for example). The latency measured for a frame may be added into a table. FIG. 13 shows an example latency table management process, in accordance with some embodiments.

Figure 14:
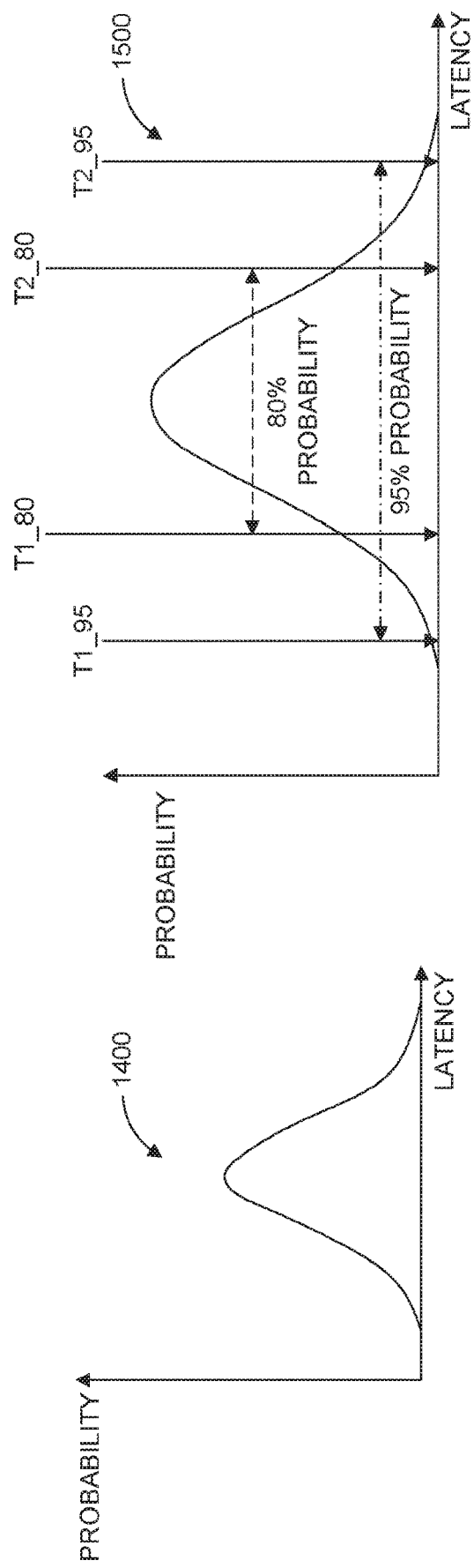
FIG. 14 is a graph illustrating an example latency distribution probability, in accordance with some embodiments.

Latency may be measured for some or all of the frames. As shown in FIG. 13, a size of a table 1300 may be maintained, for example, by replacing an older latency data 1304 with a fresher data sample, such as a new latency data 1302. For example, as shown in FIG. 13, as the new latency data 1302 becomes available, the older latency data 1304 may be deleted from the table 1300 and the new latency 1302 data may be added to the table 1300. A distribution of latency values stored in the latency table 1300 may be expressed graphically. FIG. 14 is a graph illustrating an example latency distribution probability 1400, in accordance with some embodiments.

Figure 15:
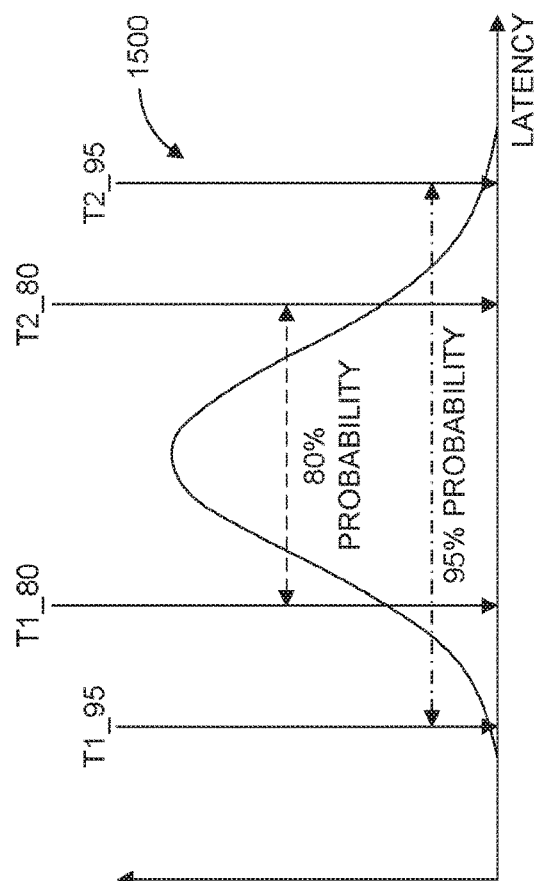
FIG. 15 is a graph illustrating an example latency distribution probability including example time intervals, in accordance with some embodiments.

In some embodiments, at 1218, a time interval [T1, T2] is selected. T1 and T2, for example, may be the results of estimating the rendering-to scan-out latency of a VR system. In some embodiments, T1 and T2 are selected based on the recorded latency distribution. FIG. 15 is a graph illustrating an example latency distribution probability including example time intervals, in accordance with some embodiments. As shown in FIG. 15, various time intervals may have corresponding probabilities (e.g., 80% probability and 95% probability, as shown). In some embodiments, the time interval between T1 and T2 may be selected to contain a target probability of the latency distribution. If [T1, T2] is selected as, for example, T1_95 and T2_95 as shown in FIG. 15, the probability that the service frame will be scanned out to the user within the time interval T1 to T2 will be 95%. If 80% of the probability distribution is included, [T1, T2] will be a smaller interval (than for 95%) like T1_80 and T2_80. In some embodiments, a certain percent X of samples in the latency table 1300 exist between T1 and T2. The percent X may be determined by the stability of predictive overfilling technique disclosed herein, in accordance with some embodiments. Note that the interval selection shown graphically in FIG. 15 effectively chooses a lower and upper bound on the predicted rendering-to-scan-out latency values, and these may then be converted to times T1 and T2 (which are lower and upper bounds on a predicted scan-out time for a current VR video frame) by adding the servers rendering start time for the current VR video frame to the determined latency bounds.

A reason for determining the time interval [T1, T2] according to the probability between these two times, rather than setting this interval to some arbitrary 'wide enough' value, may be that the overhead (e.g., from processing and data amount) of overfilling increases according to the size of that time interval. To illustrate, as the time interval between T1 and T2 increases, predictive overfilling has to render a wider range of a virtual world. This phenomenon is covered in more details below.

In some embodiments, if the system's rendering-to-scan-out latency is stable (e.g., a narrow distribution of the latency), the interval between T1 and T2 will be kept relatively shorter than unstable system (with, e.g., substantially same performance). In this way, even if T1 and T2 (as selected using the probability approach) are relatively close together, there is a high probability that the actual latency will fall in the narrow time interval between them.

In some embodiments, at 1222, an FOV is predicted. In some embodiments, an FOV is predicted for T1 and an FOV is predicted for T2 utilizing, e.g., the latest motion information provided by the user device 1204 at 1220. The method of predicting the user's FOV may, in some embodiments, employ current IMU data-based prediction methods. If it is assumed that the user's motion is maintained, a location of the user's fixation point at future times (e.g. at time T1 and at time T2) may be predicted from a fixation point (e.g., head orientation) associated with the latest IMU feedback, such as the latest user motion information provided by the user device 1204. In some embodiments, the user's FOV is a frame-sized space centered on the fixation point.

Figure 16:
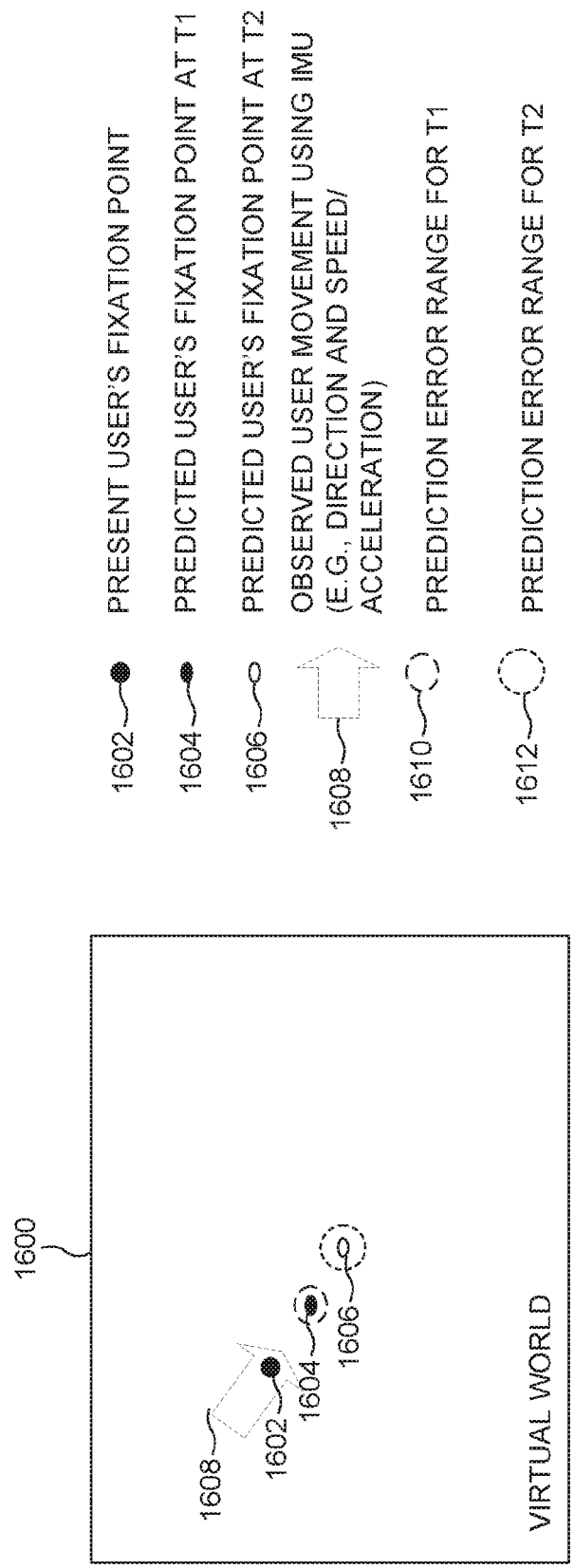
FIG. 16 is a diagram illustrating example predicted fixation points, in accordance with some embodiments.

FIG. 16 is a diagram illustrating example predicted fixation points, in accordance with some embodiments. FIG. 16 shows fixation points within a virtual world portion 1600. A present or current user's fixation point 1602, a predicted user's fixation point 1604 at a time T1, and a predicted user's fixation point 1606 at a time T2 are shown in FIG. 16. The present user's fixation point 1602 is shown in an arrow 1608 (with a dotted outline) that is representative of an observed user movement. In some embodiments, the user movement is observed, for example, using an IMU of an HMD worn by a user. The observed user movement may include data indicative of a direction and a speed, velocity, and/or acceleration of the user. The predicted user's fixation point 1604 at T1 may have a corresponding prediction error range 1610, and the predicted user's fixation point 1606 at T2 may have a corresponding prediction error range 1612, both of which are shown in FIG. 16. In some embodiments, each prediction error range may be determined based on a type of prediction technique used.

In some embodiments, at 1224, a potential FOV (e.g., a rendering region) is determined. The potential FOV may be determined (e.g., as a combined FOV) based on predictive overfilling, for example, by combining the two separate predicted FOVs (in this case, the FOV for T1 and the FOV for T2). The fixation points predicted for T1 and T2 may have errors, however, that may be due to the error of the used prediction method itself. Therefore, in some embodiments, a respective error margin for each predicted FOV may be used (e.g., added to each respective predicted FOV) in determining the potential FOV (e.g., the rendering region). In this regard, in some embodiments, the potential FOV is determined by combining (also referred to herein as "merging") (i) a first adjusted predicted FOV for T1, where the first adjusted FOV is determined by adding a first error margin to the predicted FOV for T1 and (ii) a second adjusted predicted FOV, where the second adjusted FOV is determined by adding a second error margin added to the predicted FOV for T2. The first and second error margins may be different to reflect different expected errors associated with predicting the FOV's at T1 and T2. For example, the second error margin may be larger than the first error margin to reflect a larger expected error when predicting an FOV at a time further into the future. Further, as noted above, combining two predicted FOVs for two respective time points may, in some embodiments, include forming an FOV for all time points between T1 and T2, which is resolved by determining a rendering area that contains both FOVs for T1 and T2. Example merging of two predicted FOVs will be described in more detail later.

Figure 17B:
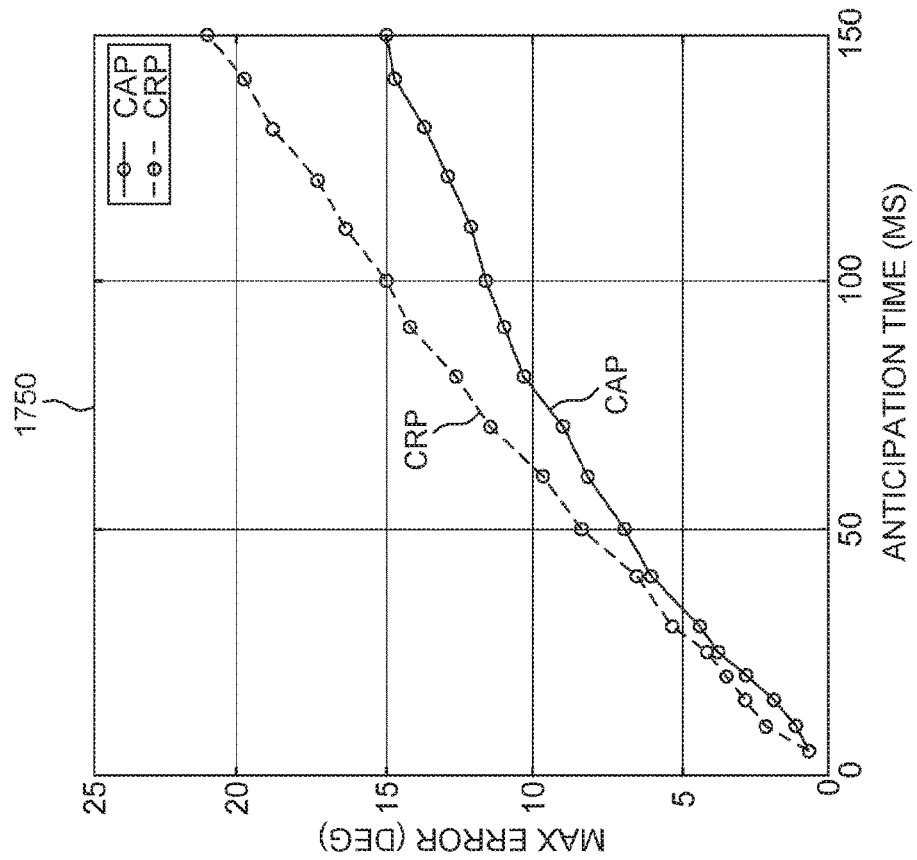
FIGS. 17A and 17B are two graphs of experimental results using two prediction techniques, in accordance with some embodiments.
Figure 17A:
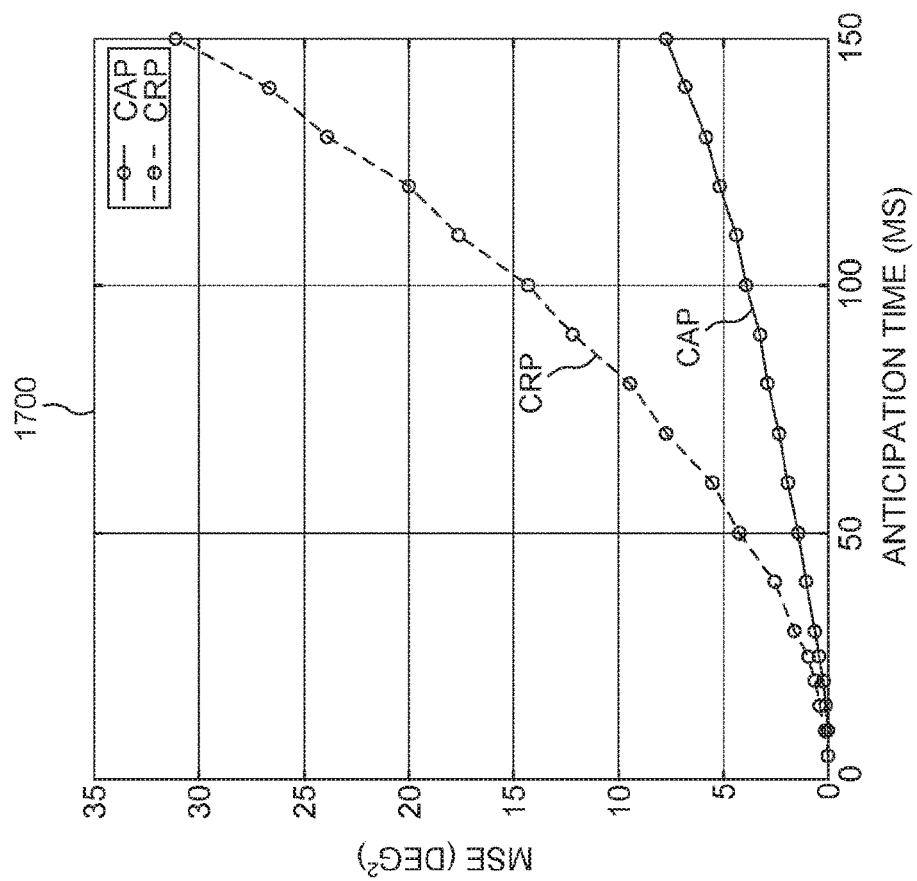

Experiments were conducted using two prediction techniques that are currently used in some VR systems: (1) constant-rate (velocity)-based prediction (CRP); and (2) constant-acceleration-based prediction (CAP). FIGS. 17A and 17B are two graphs 1700 and 1750 of experimental results using two prediction techniques, in accordance with some embodiments. More specifically, FIGS. 17A and 17B illustrate graphically experimental results of a prediction error over time for CRP and CAP prediction techniques. Experiments were conducted by performing head rotation in the yaw direction with an IMU sensor attached to a head of a user and by comparing measured velocities and accelerations with predicted values (using the CAP and CRP prediction techniques). The graph of FIG. 17A illustrates an MSE (in deg²) of orientation versus anticipation time (in milliseconds (ms)), and the graph of FIG. 17B illustrates a maximum orientation error (in deg) versus the anticipation time.

The VR contents (streaming) server 1202 may obtain the error graphs for one or more individual VR users in real time. In some embodiments, the server 1202 may do so as follows: (1) the server receives VR HMD's internal IMU motion data at a certain time; (2) the server calculates future IMU motion values by using CAP and/or CRP prediction methods; (3) the server later receives actual IMU motion data and records errors between the predicted motion data and the actual motion data, and the mean and/or max error graphs are updated in real time.

becomes longer. In some embodiments, a rendering area is determined to include a lower error margin for relatively closer predicted scan out times (e.g. a lower error margin to be added for an FOV corresponding to a lower bound T1) and a larger error margin for predicted scan out times which are relatively further away in time (e.g. a larger error margin to be added for an FOV corresponding to an upper bound T2). In some embodiments, the errors of the prediction method are empirically identified during the service as described above, so it is feasible to apply Yaw and Pitch prediction errors that reflect personal characteristics of the user's head movement.

Figure 18:
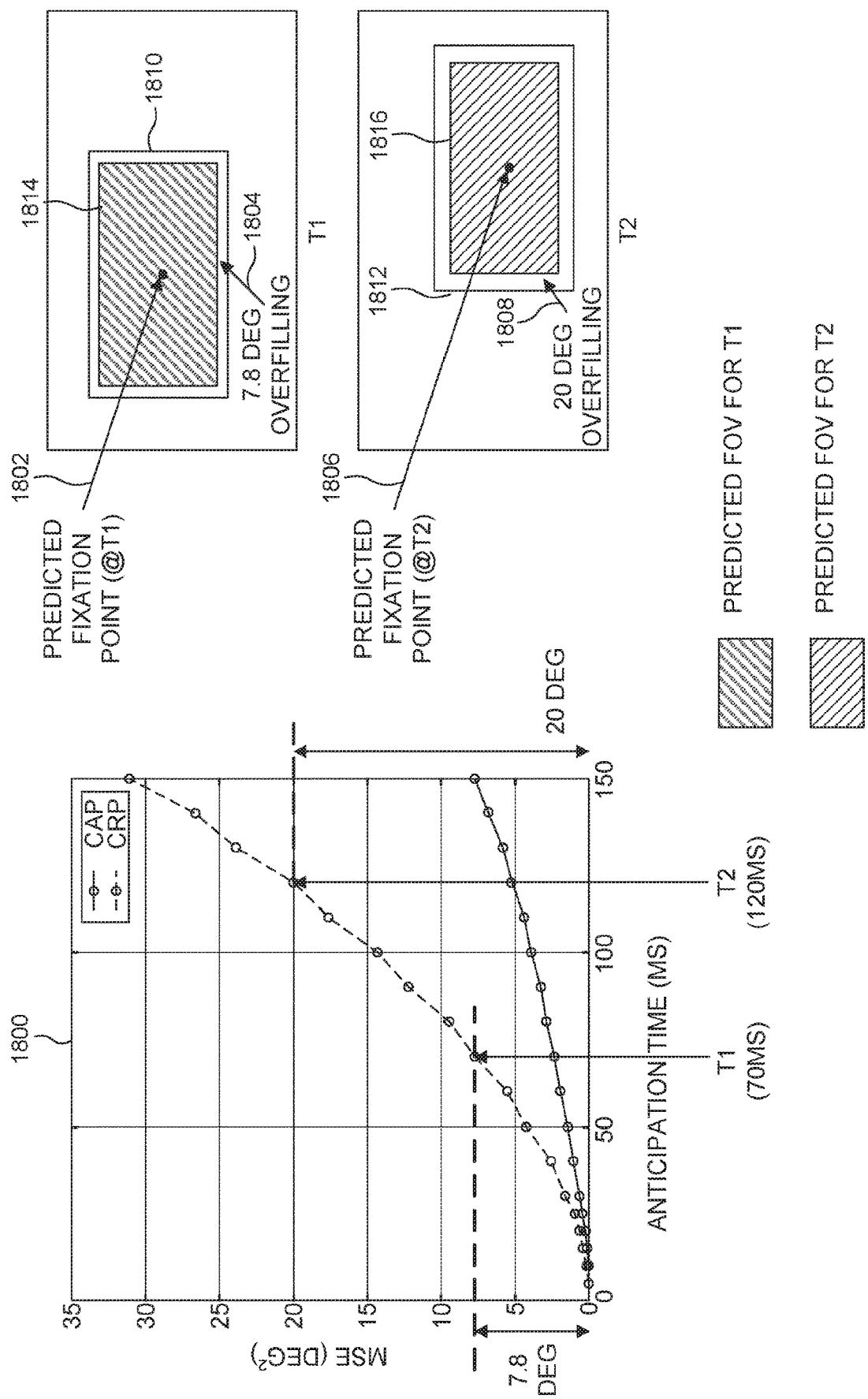
FIG. 18 illustrates the graph of FIG. 17A, together with example predicted FOVs, in accordance with some embodiments.

FIG. 18 illustrates the graph of FIG. 17A, together with example predicted FOVs, in accordance with some embodi-

TABLE 1

Real Time Prediction Error Checking Example

| Time (ms) | t | t + 1 ms | t + 2 ms | t + 3 ms | t + 4 ms | t + 5 ms | t + 6 ms |
|---|---|---|---|---|---|---|---|
| Identified value (from IMU) | 99.97 0.04 deg changed | 100.00 0.03 deg changed | 100.03 0.03 deg changed | 100.07 0.04 deg changed | 100.12 0.05 deg changed | 100.17 0.05 deg changed | 100.20 0.03 deg changed |
| Predicted (t) | 99.97 (0.04 deg/ms) | 100.01 (99.97 + 0.04) | 100.05 (99.97 + 0.08) | 100.09 (99.97 + 0.12) | 100.13 (99.97 + 0.16) | 100.17 (99.97 + 0.20) | 100.21 (99.97 + 0.24) |
| Predicted (t + 1 ms) | — | 100.00 (0.03 deg/ms) | 100.03 (100.00 + 0.03) | 100.06 (100.00 + 0.06) | 100.09 (100.00 + 0.09) | 100.12 (100.00 + 0.12) | 100.15 (100.00 + 0.15) |
| Predicted (t + 2 ms) | — | — | 100.03 (0.03 deg/ms) | 100.06 (100.03 + 0.03) | 100.09 (100.03 + 0.06) | 100.12 (100.03 + 0.09) | 100.15 (100.03 + 0.12) |
| Predicted (t + 3 ms) | — | — | — | 100.07 (0.04 deg/ms) | 100.11 (100.07 + 0.04) | 100.15 (100.07 + 0.08) | 100.19 (100.07 + 0.12) |
| Predicted (t + 4 ms) | — | — | — | — | 100.12 (0.05 deg/ms) | 100.17 (100.12 + 0.05) | 100.22 (100.12 + 0.10) |
| Predicted (t + 5 ms) | — | — | — | — | — | 100.17 (0.05 deg/ms) | 100.22 (100.17 + 0.05) |
| Prediction error (1 ms) | — | 0.01 | 0.00 | 0.01 | 0.01 | 0.00 | 0.02 |
| Prediction error (2 ms) | — | — | 0.02 | 0.01 | 0.03 | 0.02 | 0.02 |
| Prediction error (3 ms) | — | — | — | 0.02 | 0.03 | 0.05 | 0.01 |
| Prediction error (4 ms) | — | — | — | — | 0.01 | 0.05 | 0.05 |
| Prediction error (5 ms) | — | — | — | — | — | 0.00 | 0.05 |
| Prediction error (6 ms) | — | — | — | — | — | — | 0.01 |

As shown in Table 1 above, a technique for identifying the real time prediction error may use the identified IMU values to predict future head orientation.

The CRP technique, which is used in the example in Table 1, predicted the user's head orientation (predicted (t)) based on the current orientation (99.97 deg) assuming that the user's head rotation speed (0.04 deg/ms) will be maintained. After that, the system compares the received IMU feedback data with predicted values in real time to confirm the prediction errors of the prediction method according to anticipation time. The information about the prediction error obtained (e.g., continuously in real time) is accumulated (e.g. averaged with recent 100 values) or processed in a different manner to update the error table.

In some embodiments, the updated error table allows the system to update continually to calibrate the values to use on the error margins (for overfilling) during VR contents playback. In the above example, prediction and error evaluation were presented from 1 to 6 ms. In some embodiments, the system evaluates the error for the latency target interval (e.g., the error evaluation may be done for each of the Yaw & Pitch axes).

As shown in the above experiment results, the prediction error tends to increase as the target time for prediction ments. More specifically, FIG. 18 shows two example time values for T1 and T2 derived from the graph (where T1=70 ms and T2=120 ms) and corresponding predicted FOVs 1810 and 1812 for two fixation points at T1 and T2, i.e., a predicted fixation point 1802 at T1 and a predicted fixation point 1806 at T2. Further, FIG. 18 shows the predicted FOVs 1814 and 1816 having respective error margins 1804 and 1808 added thereto to produce a first adjusted FOV 1810 and a second adjusted FOV 1812. Namely, the error margin 1804 in the form of 7.8 degrees of overfilling is added to the predicted FOV 1814, and the error margin 1808 in the form of 20 degrees of overfilling is added to the predicted FOV 1816. The respective overfilling amounts associated with T1 and T2 are determined from the graph of the MSE, as shown in FIG. 18.

Figure 19:
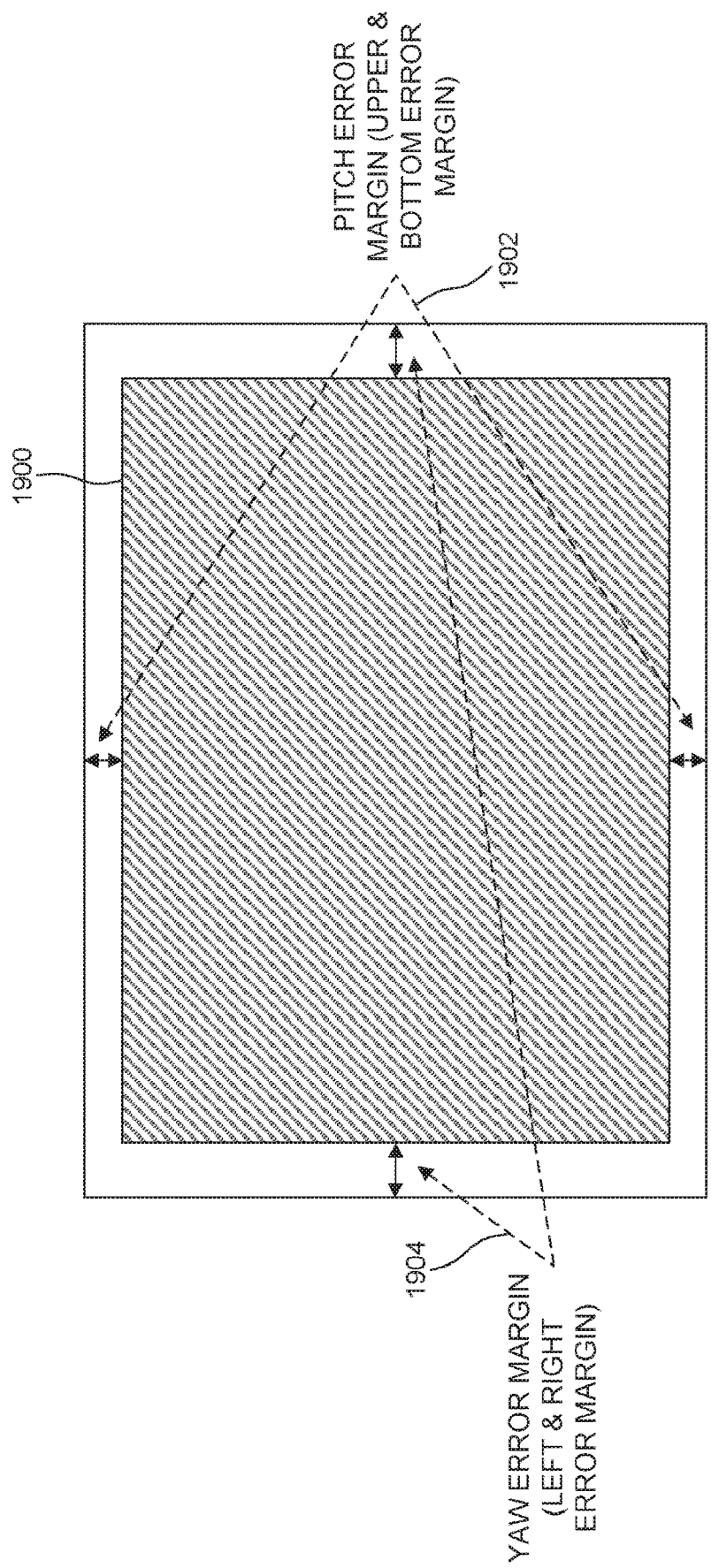
FIG. 19 shows an example error margin configuration, in accordance with some embodiments.

FIG. 19 shows an example error margin configuration, in accordance with some embodiments. As shown in FIG. 19, pitch error margins 1902 (e.g., upper and bottom error margins, as in FIG. 19) and yaw error margins 1904 (e.g., left and right error margins, as in FIG. 19) are added to an FOV 1900. As shown in FIG. 19, the error margins are different from each other.

Figure 20:
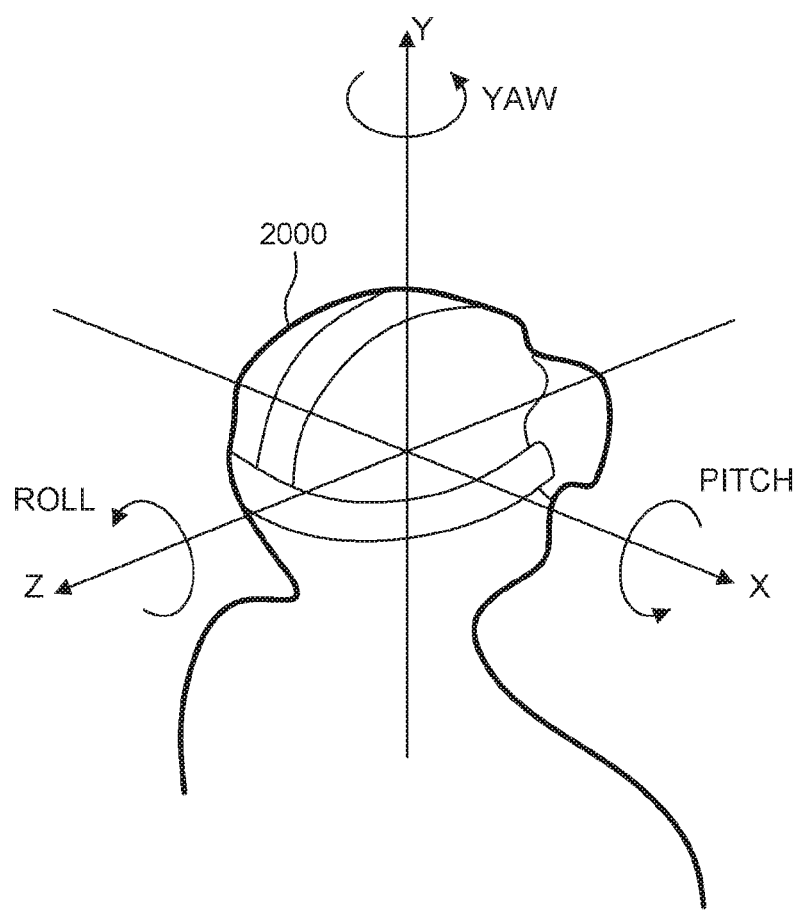
FIG. 20 is a perspective view of a VR HMD, in accordance with some embodiments.

FIG. 20 is a perspective view of a VR HMD 2000, in accordance with some embodiments. FIG. 20 shows indications of pitch, yaw, and roll movements in a coordinate system. In some embodiments, VR HMD hardware may contain a number of micro-electrical-mechanical (MEMS) or other sensors, such as a gyroscope, accelerometer, and magnetometer. Further, in some embodiments, the HMD 2000 may include a sensor to track a headset position. Information from each of these sensors may be combined through a sensor fusion process to determine a motion of a user's head in the real world and synchronize the users view in real-time. In some embodiments, as illustrated in FIG. 20, the coordinate system uses the following conventions: the x-axis is positive to the right; the y-axis is positive going up; and the z-axis is positive heading backwards.

In some embodiments, rotation is maintained as a unit quaternion, but also may be reported in pitch-yaw-roll form. Positive rotation is counter-clockwise (CCW, direction of the rotation arrows in FIG. 20) when looking in the negative direction of each axis. Pitch is rotation around the x-axis, with positive values when looking up. Yaw is rotation around the y-axis, with positive values when turning left. Roll is rotation around the z-axis, with positive values when tilting to the left in the X-Y plane.

In some embodiments, two or more FOVs may be merged to determine a potential FOV (e.g., a combined FOV), which, in some embodiments, corresponds to a rendering region. FIG. 21A illustrates an example rendering region 2102, in accordance with some embodiments. In some embodiments, the rendering region 2102 in FIG. 21A corresponds to a potential FOV, in accordance with an example predictive overfilling technique described herein. As shown in FIG. 21 A, the potential FOV results from combining (i) an FOV 2104 centered around a predicted fixation point 2108 at a time T1 and having a first respective error margin added thereto to produce a first adjusted FOV and (ii) an FOV 2106 centered around a predicted fixation point 2110 at a time T2 having a second respective error margin added thereto to produce a second adjusted FOV). In this regard, for example, a rectangular area may be selected that contains both of those FOVs to produce the rendering region 2102, as shown in FIG. 21A.

Figure 21C:
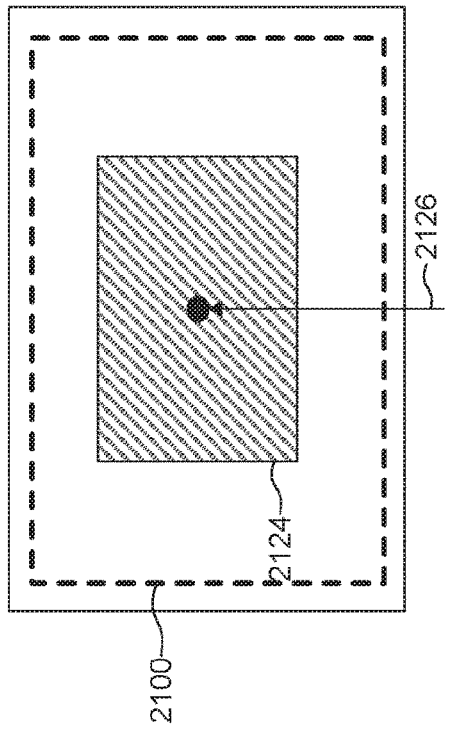
FIG. 21C illustrates a rendering region using an example overfilling.
Figure 21A:
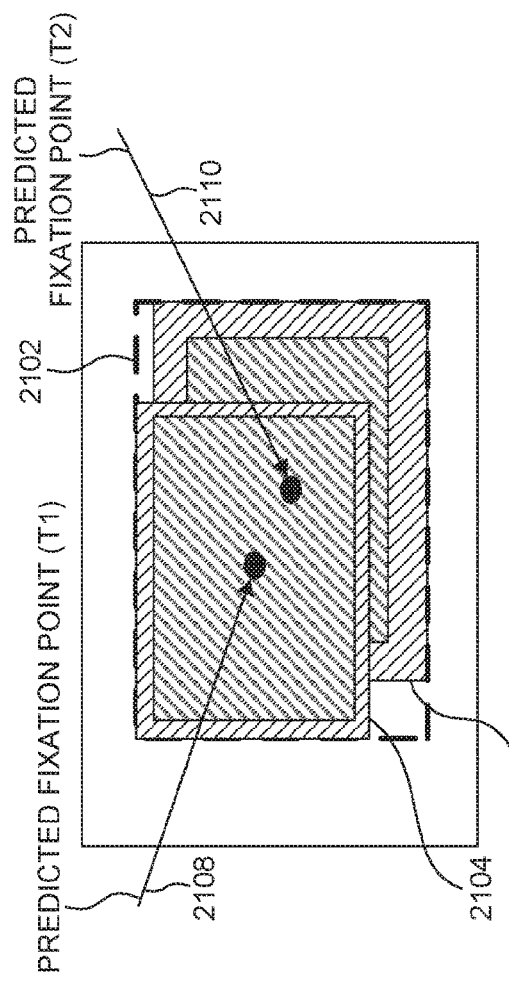
FIG. 21A illustrates an example rendering region, in accordance with some embodiments.
Figure 21B:
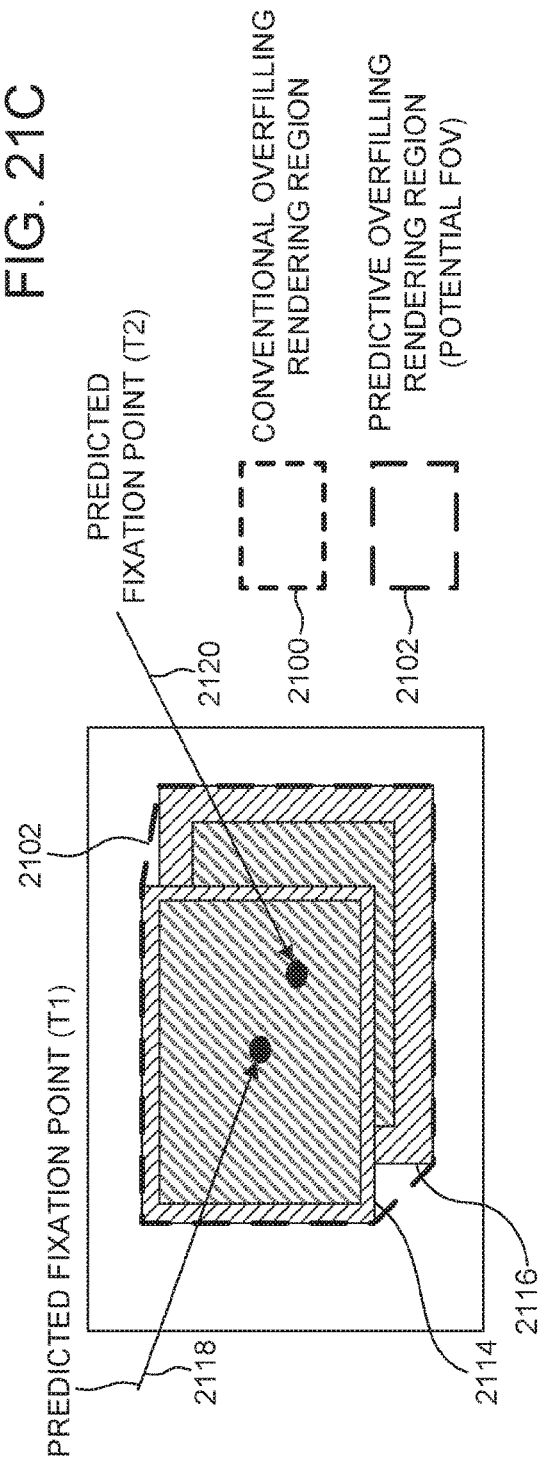
FIG. 21B illustrates another example rendering region, in accordance with some embodiments.

FIG. 21B illustrates another example of the rendering region 2102, in accordance with some embodiments. Similar to FIG. 21B, in some embodiments, the rendering region 2102 in FIG. 21B corresponds to a potential FOV, in accordance with the example predictive overfilling technique described herein. As shown in FIG. 21 B, the potential FOV results from combining (i) an FOV 2114 centered around a predicted fixation point 2118 at a time T1 and having a first respective error margin added thereto to produce a first adjusted FOV) and (ii) an FOV 2116 centered around a predicted fixation point 2120 at a time T2 having a second respective error margin added thereto to produce a second adjusted FOV. However, unlike in FIG. 21A, both of those FOVs may be combined in a hexagonal manner. Namely, in this example, a hexagonal area/shape may be selected as a more economical area that contains both FOVs. In some embodiments, a more economical area refers to a smaller rendering region that still captures both FOVs. In general, the larger the rendering region used to capture both FOVs, the greater the overhead (e.g., an overhead associated with processing and transmitting) of a VR system. Hence, it is more economical to make the rendering region smaller from the perspective of the VR system.

In contrast, FIG. 21C illustrates a rendering region 2100 using an example (e.g., typical) overfilling. The rendering region in FIG. 21C includes an FOV 2124 centered around a fixation point 2126 at a given time T. Further, as shown in FIG. 21C, an overfilling is applied evenly to the FOV 2124 in all directions (e.g. by using same overfill factor for each axis), without taking into consideration a user's future head position. This is unlike embodiments of the present disclosure, which, among other factors, consider the user's predicted future head position for dynamic or adaptive overfilling determination.

Figure 22:
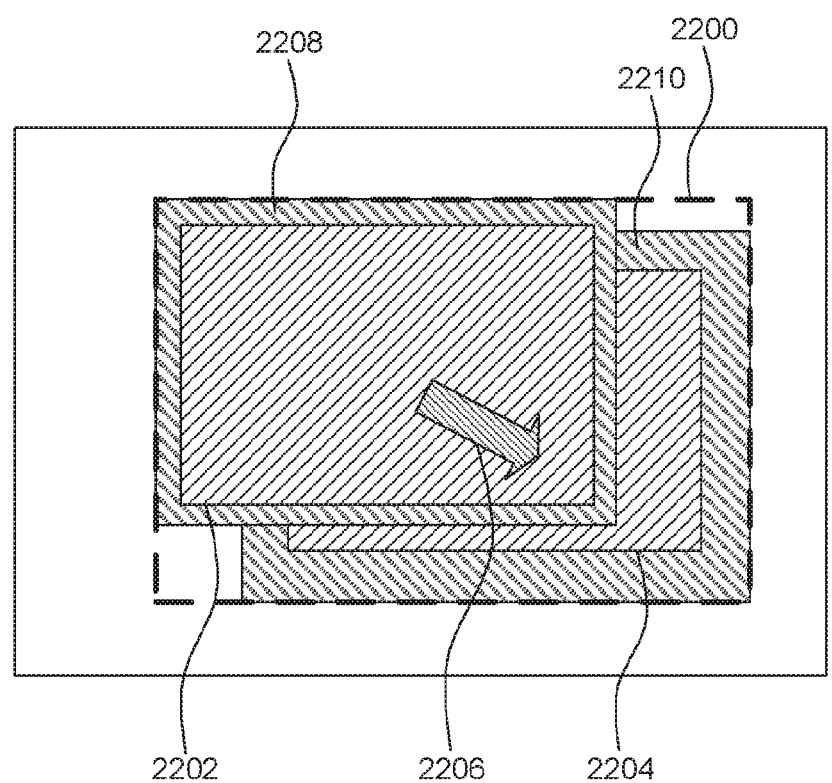
FIG. 22 is a diagram illustrating a potential FOV formation in more detail, in accordance with some embodiments.

FIG. 22 is a diagram illustrating a potential FOV formation in more detail, in accordance with some embodiments. As shown in FIG. 22, potential FOV 2200 results from merging (i) a predicted FOV 2202 at a time T1 with a first respective error margin 2208 for T1 added thereto (a first adjusted FOV) and (ii) a predicted FOV 2204 at a time T2 with a second respective error margin 2210 for T2 added thereto (a second adjusted FOV). Further, FIG. 22 shows an arrow 2206 indicating a head rotation direction of a user to show a shift of the second predicted FOV (2204) along that direction. In the example of FIG. 22, the two predicted FOVs (and their corresponding error margins) are combined in a rectangular manner, as explained above, where a rectangular area may be selected that contains both of those FOVs to produce the rendering region 2102, as shown in FIG. 21A.

Referring back to FIG. 12, in some embodiments, at 1226, an overfill factor setting is determined. In some embodiments, different overfill factors are determined for each of horizontal and vertical axis. In general, in some embodiments, the overfill factor for each axis may be determined by comparing a number of pixels present in the potential FOV and a resolution to be provided to the user device 1204. In some embodiments, the ratio of each axis of the potential FOV determined above differs from the ratio of each axis of a resolution of, e.g., an HMD. Different overfill factors (that may also be referred herein as "overfill factor values") may be applied for each axis because, in some embodiments as described above, the potential FOV is determined considering or based on a user's head rotation direction.

To calculate an overfill factor for the horizontal axis, in some embodiments, the following example Equation 1 is used:

Overfill factor=[(max($HEM_{T1}$,$HEM_{T2}$-abs($V$×($T2$-$T1$)×sin $x$))+$HEM_{T2}$+abs($V$×($T2$-$T1$)×sin $x$)+$MVA_{horizontal}$)]/$MVA_{horizontal}$   Eq. 1

To calculate an overfill factor for the vertical axis, in some embodiments, the following example Equation 2 is used.

Overfill factor=[(max($VEM_{T1}$,$VEM_{T2}$-abs($V$×($T2$-$T1$)× cos $x$))+$VEM_{T2}$+abs($V$×($T2$-$T1$)× cos $x$)+$MVA_{vertical}$)]/$MVA_{vertical}$   Eq. 2

In the Equation1, the variables $HEM_{T1}$ and $HEM_{T2}$ each represent respectively an error margin for the time T1 and the time T2 of yaw (horizontal) axis. The variable V represents a users head rotation velocity (e.g., in degrees/sec). The variable x represents a users head rotation direction (e.g., 12 o'clock direction is zero). Further, the variable $MVA_{horizontal}$ represents a monocular horizontal viewing angle of a service frame.

In the Equation2, the variables $VEM_{T1}$, $VEM_{T2}$ each represent respectively an error margin for the time T1 and time T2 of pitch (vertical) axis. The variable V represents a user's head rotation velocity (e.g., in degrees/sec). The variable x represents a users head rotation direction (e.g., 12 o'clock direction is zero). Further, the $MVA_{vertical}$ variable is a monocular vertical viewing angle of a service frame.

In some embodiments, the above max functions expressed by the Equations 1 and 2 would return $EM_{T2}$-abs($V$×($T2$-$T1$)×sin $x$) when the time difference between T1 and T2 is relatively small (and hence, e.g., no significant changes exist between an FOV of T1 and an FOV of T2) as, for instance, shown in the example of FIGS. 21A-21B.

Figure 23:
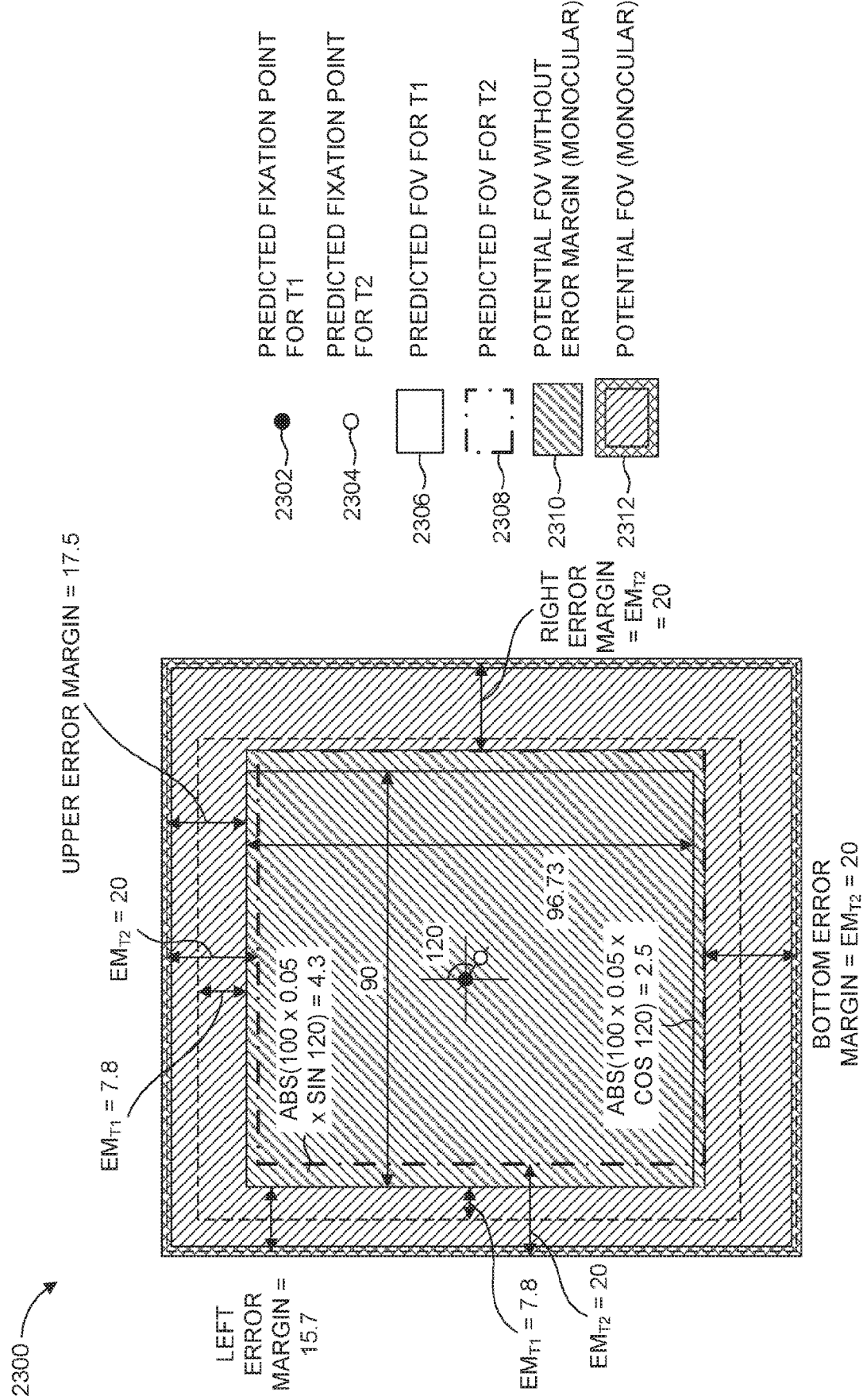
FIG. 23 is a pictorial representation of a usage of values from an example calculation of an overfill factor, in accordance with some embodiments.

The following is an example calculation of an overfill factor (or a first overfill factor value) for the horizontal axis and an overfill factor (or a second overfill factor value) for the vertical axis. In the present example, prediction errors for both axes are substantially the same. FIG. 23 is a pictorial representation of a usage of values from an example calculation of an overfill factor, in accordance with some embodiments. More specifically, FIG. 23 illustrates pictorially the values included in the example calculation of the overfill factors using the Equations 1 and 2. Note that all values shown in FIG. 23 are assumed to be in degrees.

User's head rotation speed=100 deg/sec
Users head rotation direction=30 degrees downward right (x=120 deg)
Horizontal & Vertical prediction error for T1 (e.g., T1=70 ms, as above example)=7.8 deg
Horizontal & Vertical prediction error for T2 (e.g., T2=120 ms, as above example)=20 deg
Monocular horizontal viewing angle of the HMD (e.g., from HMD specs)=90 deg
Monocular vertical viewing angle of the HMD (e.g., from HMD specs)=96.73 deg $$\text{Overfill factor(horizontal)} = [(\max(7.8, 20 - \text{abs}(100 \times (0.05) \times \sin(120))) + 20 + \text{abs}(100 \times (0.05) \times \sin(120)) + 90] / 90$$

$$\text{Overfill factor(horizontal)} = (15.7 + 20 + 4.3 + 90) / 90 \approx 1.44$$

$$\text{Overfill factor(vertical)} = (\max(7.8, 20 - \text{abs}(100 \times (0.05) \times \cos(120))) + 20 + \text{abs}(100 \times (0.05) \times \cos(120)) + 96.73 / 96.73$$

$$\text{Overfill factor(vertical)} = (17.5 + 20 + 2.5 + 96.73) / 96.73 \approx 1.41$$

FIG. 23 shows a predicted fixation point 2302 for T1, a predicted fixation point 2304 for T2, a predicted FOV 2306 for T1, a predicted FOV 2308 for T2, a potential FOV without error margins 2310, and a potential FOV with error margins added 2312. The potential FOV 2312 is determined based on the predicted FOVs 2306 and 2308, with respective error margins associated therewith. As shown in FIG. 23, in some embodiments, the elements 2310 and 2312 are monocular.

In some embodiments, the overfill factors as determined above (for each axis) are used for rendering along with the center of the potential FOV (the point where the center of each axis intersects), as in the example of FIG. 23.

Figure 24:
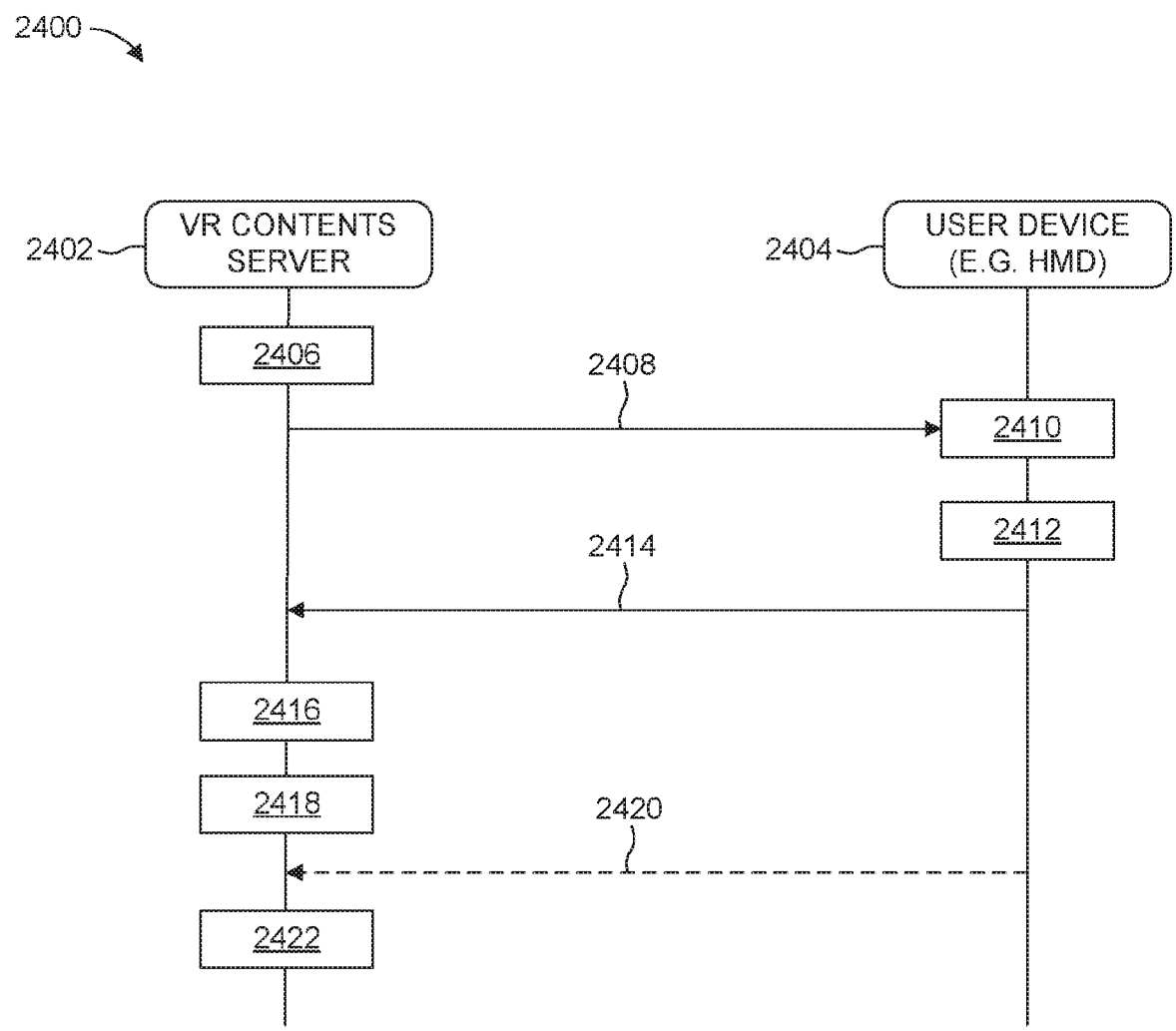
FIG. 24 is a flowchart of an example process for predictive overfilling, in accordance with some embodiments.

In some embodiments, a technique of predictive overfilling proposed herein may effectively reduce a loss of processing power normally required by omnidirectional overfilling. FIG. 24 is a messaging diagram illustrating another example process 2400 for predictive overfilling, in accordance with some embodiments. The example process 2400 may be carried out between a VR contents server 2402 and a user (client) device 2404 (e.g., an HMD). The example process shown in FIG. 24 utilizes a predicted scan-out time T and renders, e.g., only a region that was extended accordingly based on a head rotation direction of a user from a predicted FOV, instead of performing a typical omnidirectional overfilling.

In some embodiments, steps 2406-2416 of the example process of FIG. 24 may be substantially the same as the steps 1206-1216 of the example process described above in connection with FIG. 12. As described above in connection with FIG. 12, and applicable with respect to the description of FIG. 24, the example process may be executed repeatedly while VR is being serviced. In some embodiments, the process may be continuously repeating so that at any given point in time, multiple steps of the process are being performed at the same time.

In some embodiments, at 2418, a time T representing a predicted scan-out time is determined. In some embodiments, rendering-to-scan-out latency of a VR system may be predicted with reference to the recorded past latency distribution. In some embodiments, the system may set the predicted scan-out time T to correspond to a center point of the latency distribution (e.g., the latency distribution is divided 50:50, or generally into two halves, at T). Therefore, the VR contents server 2402, for example, may choose the median or average value of one or more latency distributions as the representative rendering to scan-out latency value, and may add the rendering start time for a particular VR video frame to convert this representative latency value to a time value T, which represents the predicted scan out time for the VR video frame. In some embodiments, the variation characteristics of latency is not considered. Therefore, the example process 2400 may be more suitable for a given VR system where the latency distribution is stable around the representative latency value (e.g. around the T value).

FIG. 25 is a graph illustrating an example latency distribution 2500, in accordance with some embodiments. As shown in FIG. 25, a representative rendering-to-scan-out latency 2502 may be predicted corresponding to approximately a center point of the latency distribution graph in FIG. 25 (showing probability vs. time). A predicted scan-out time T may be computed by adding a rendering start time for a VR video frame (e.g. a server side rendering start time) to the representative latency value, such that the time T corresponds to the scan-out time associated with the representative latency 2502.

In some embodiments, at 2422, an overfill factor setting is determined. In general, in some embodiments, overfill factors are determined considering users head rotation velocity that may be, e.g., determined from user motion information fed back to the server 2402 from the user device 2404 at 2420 (as shown in FIG. 24).

FIG. 26 is a diagram illustrating a number of FOVs, in accordance with some embodiments. Namely, FIG. 26 shows a predicted FOV 2608 for a time T, an extended FOV 2610 for the time T, and a final rendering region 2604 for the time T, in accordance with some embodiments. In some embodiments, a rendering region including a predicted FOV 2608 of an HMD (and/or of a user) at the time T is extended, considering a direction and speed of the user's head rotation (denoted by arrow 2602 as "a head rotation direction of a user," in FIG. 26), e.g., in the form of a vector. In some embodiments, the degree of expansion is determined by taking into account a computing power of a system or the variance of the latency distribution recorded (as shown, e.g., in FIG. 25). A first step in expanding the FOV may be to extend the predicted FOV 2608 based on the direction and speed of the user's head/HMD, as shown on the left side of FIG. 26. FIG. 26 shows how the expansion may be carried out using a value 2606 ("+/−Head rotation direction of a user/2") expressed, e.g., in the form of a vector. Then, a center position of the extended FOV 2610 may be aligned with (e.g., calibrated to) a center position of the predicted FOV 2608 for the time T. Horizontal and vertical direction error margins of the FOV may be added to the extended FOV 2610 to determine a final extended FOV for the time T, which is shown in FIG. 26 as the final rendering region 2604 for the time T. FIG. 26 (see right side) illustrates how pitch error margins 2612 (e.g., upper and bottom error margins, as in FIG. 26) and yaw error margins 2614 (e.g., left and right error margins, as in FIG. 26) are added. As shown in FIG. 26, the error margins 2612 and 2614 are different from each other.

Figure 27:
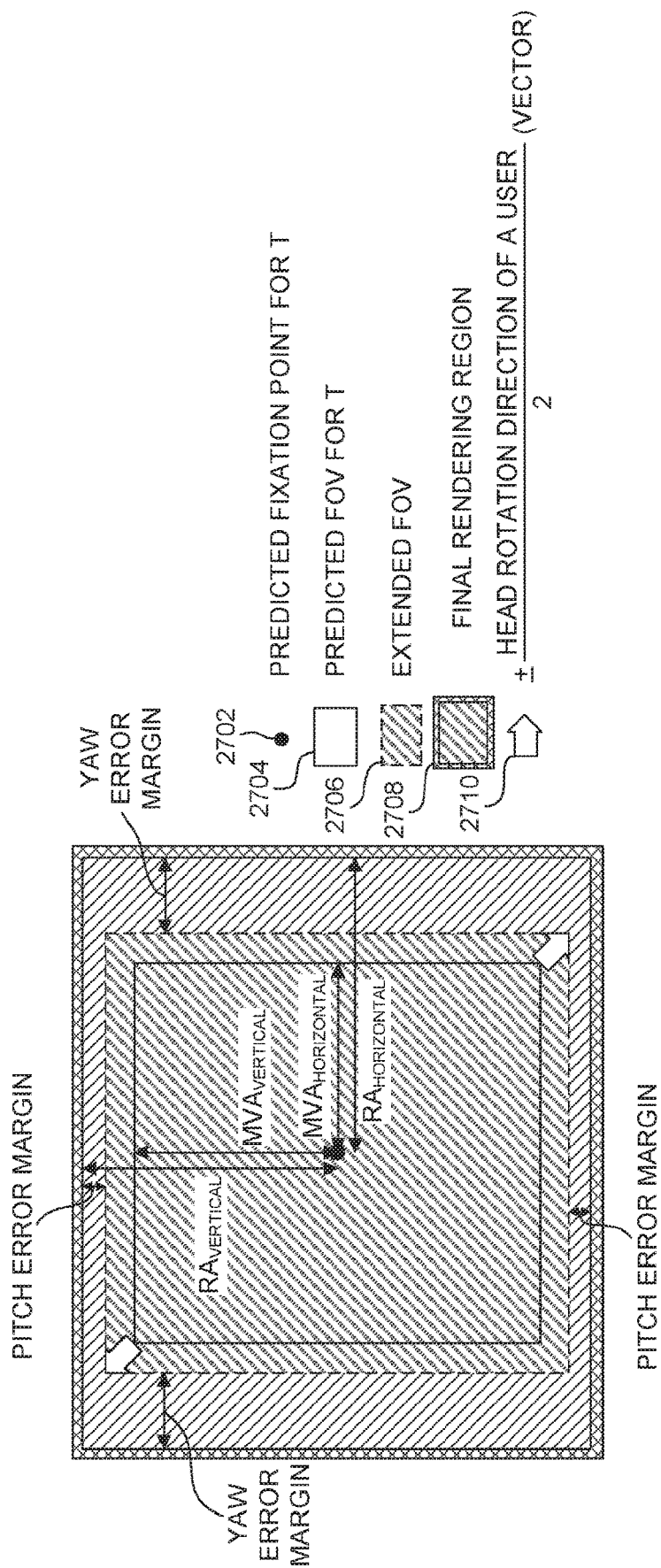
FIG. 27 is a diagram illustrating pictorially an overfill factor determination, in accordance with some embodiments.

FIG. 27 is a diagram illustrating pictorially an overfill factor determination, in accordance with some embodiments. FIG. 27 shows a predicted fixation point 2702 for T, a predicted FOV 2704 for T, and a rendering region 2708. Further, as shown in FIG. 27, an arrow 2710 represents a value of "+/− Head rotation direction of a user/2" expressed, e.g., in the form of a vector. As shown in FIG. 27, in some embodiments, the rendering region 2708 is monocular. Further, in some embodiments, the overfill factor may be calculated according to the following equation:

$$\text{Overfill Factor}(X) = RA_x / MVA_x \qquad \text{Eq. 3}$$

where $RA_x$ represents a rendering angle and an $MVA_x$ represents a monocular viewing angle. Note that the Equation 3 applies to calculating an overfill factor for each of horizontal and vertical directions (or horizontal and vertical axes), with X representing either a horizontal direction or a vertical direction.

Figure 28:
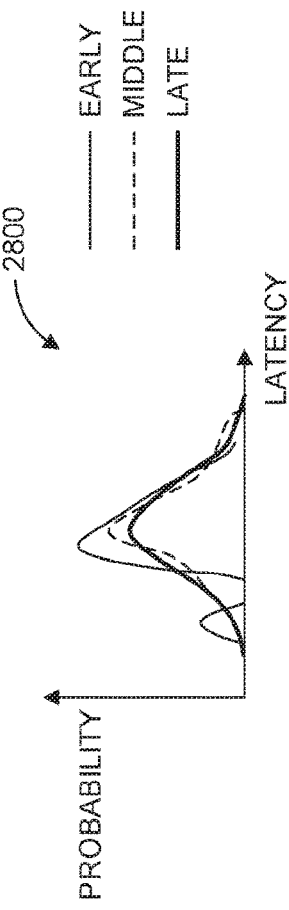
FIG. 28 shows how latency distribution may change during various stages of a VR service, in accordance with some embodiments.

In some embodiments, a rendering to scan-out latency distribution is formed using, e.g., feedback from a client device. The rendering to scan-out latency distribution may be, for example, unstable shortly or immediately after the start of a service between a server and the client device. For a system that is stable, as the service continues, a stable distribution may form. FIG. 28 is a graph illustrating an example latency distribution 2800. FIG. 28 shows how latency distribution (e.g., a recorded latency distribution) may change during various stages of a VR service, in accordance with some embodiments. By way of example, FIG. 28 shows a latency distribution at an early stage, a latency distribution at a middle stage, and a latency distribution at a late stage.

As discussed in connection with various embodiments above, latency values may be recorded in a latency table. In some embodiments, the more data that is accumulated in the latency table, the more stable the probability distribution may be or may become. In some embodiments, the problem, however, is that if the system uses a large latency table, it may not be able to adapt quickly enough when the service environment changes. For example, if processing of a VR contents server is slow due to heat generation or a transmission delay occurs in the system including a network delay, the larger latency table will have a different probability distribution from characteristics of the changed system. Accordingly, in some embodiments, a VR system may need to keep an appropriate number of samples in the latency table to observe and to react to changes in the latency (e.g., network latency).

As described above, in some embodiments, times T1 and T2 may be selected by considering an overfilling stability and a tradeoff of rendering overhead. Further, in some embodiments, the interval between the selected times T1 and T2 is a factor in determining an overfill factor (e.g., when a user is in motion).

According to some embodiments, one or more options may exist for adjusting the overfilling stability that may be used to select T1, T2, such as, e.g., by additionally considering a computing power margin of a processor.

As described above, predicting a user's behavior (or fixation point) may have different errors depending on, for example, the technique (e.g., used for the predicting) and/or the target time interval. The prediction error(s) may be applied as margin(s) to determine a rendering region.

As described above, example prediction errors have been determined through experiments. Some embodiments determine prediction errors and check the prediction errors in real time during service. For example, utilizing IMU data, which may be fed back at, e.g., regular intervals (e.g., every 1 ms), a VR contents server may evaluate one or more errors of the prediction method(s) it is using.

In some embodiments, a VR contents server sets the error updating interval and predicts the user's fixation point path according to the timeline, from the minimum rendering-to-scan-out latency to the maximum rendering-to-scan-out latency (which are recorded data in a latency table). After that, in some embodiments, for example in every 1 ms (1000 Hz feedback), the actual fixation point of the user identified from the feedback IMU data and the predicted fixation point are compared to check the error of the prediction method over time.

Various embodiments proposed herein may be, in some cases, applied more effectively depending on the rendering method of the graphics card. Generally, when using a device that only supports rectangular shape rendering, a rectangular model (e.g., described above in connection with FIG. 21A) is used. When supporting various types of rendering, a more efficient potential FOV (such as that obtained via a hexagonal method (e.g., described above in connection with FIG. 21B)) may be utilized. In this case, two or more overfill factors may be set and utilized.

Further, various embodiments described herein, make a size of an output frame flexible according to a system latency characteristic (e.g., stability) and/or a user's head rotation velocity.

Figure 29A:
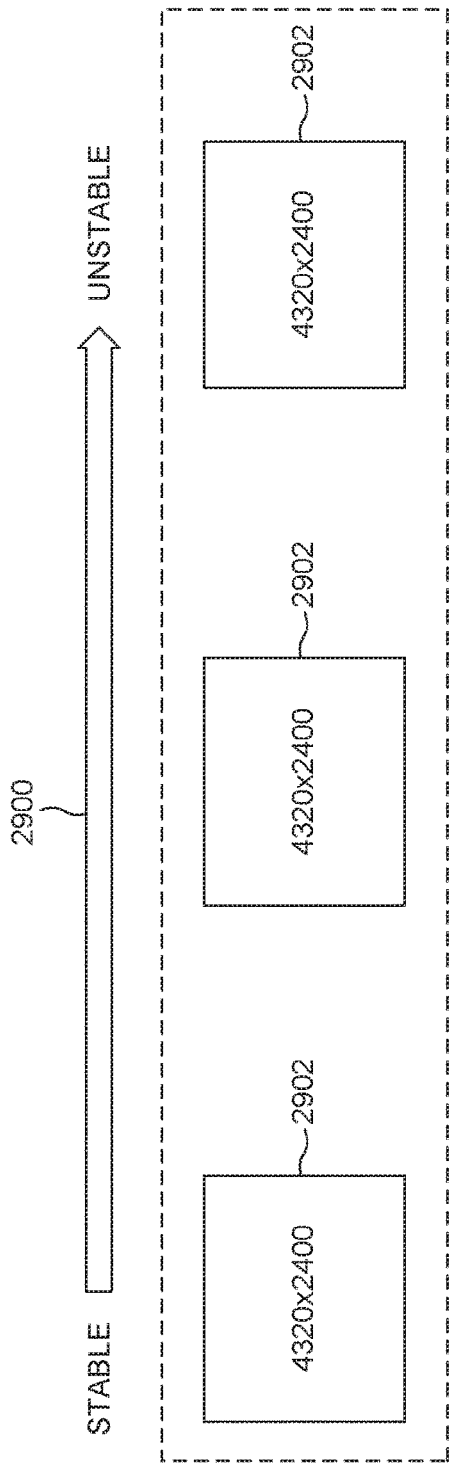
FIG. 29A is a diagram illustrating an example output VR frame in view of changing system latency.

FIG. 29A is a diagram illustrating example output VR frames in view of changing system latency. As illustrated, as a system latency 2900 changes (e.g., goes from a stable state to an unstable state), a frame size (and hence also a shape) of an output VR frame 2902 that includes an example typical overfilling (e.g., an overfill factor of two (2), as shown in FIG. 29A) remains the same (e.g., has a resolution of 4320×2400, as shown). In some embodiments, the resolution may refer to pixel dimensions (a number of pixels in a horizontal direction (width)×a number of pixels in a vertical direction (height)).

Figure 29B:
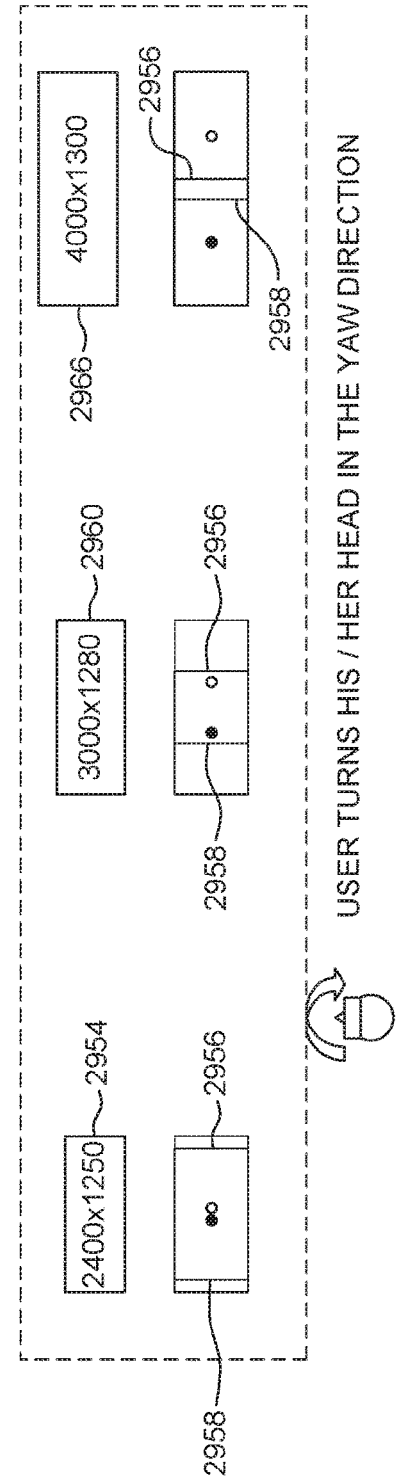
FIG. 29B is a diagram illustrating an effect of system latency on an output VR frame, in accordance with some embodiments.

In contrast, FIG. 29B is a diagram illustrating an effect of system latency on a size of an output VR frame, in accordance with some embodiments. The example of FIG. 29B assumes that a client device used by user (e.g., an HMD) has a resolution ratio of 2160×1200. As illustrated, a size (e.g., a resolution and/or aspect ratio) of output frame changes as a system latency changes (e.g., increases) (e.g., goes from a stable state to an unstable state). More specifically, a frame size (and hence also a shape) of an output VR frame 2954 that includes a predictive overfilling may have a resolution of 2400×1250 (and hence a corresponding aspect ratio) during a stable system latency period. As the system latency increases, the following output VR fames 2960 and 2966 each will have a different size as the system latency increases and a user turns his/her head in the yaw direction (as shown). For example, as shown, the frame 2960 may have a resolution of 3000×1280 (and hence a corresponding aspect ratio) while the frame 2966 may then have a different resolution of 4000×1300 (and hence a corresponding aspect ratio). Further, FIG. 29B shows how each of the frames 2954, 2960, and 2966 may be configured using a combination of a predicted FOV 2956 for T1 and a predicted FOV 2958 for T2 (where the FOVs 2956 and 2958 may include respective error margins). According to some embodiments, a difference in an output VR frame according to a rotational speed of a user's head may have similar effects as a latency stability of a (VR) system. For instance, in some embodiments, the user's head movement may result in additional changes on the output VR frame.

FIG. 30A is a diagram illustrating an example VR frame based on a head rotation direction of a user. As illustrated, as a user's head rotation direction 3000 changes, a frame size (and hence also a shape) of an output VR frame 3002 that includes a typical overfilling (e.g., an overfill factor of two (2), as shown in FIG. 30A) remains the same (e.g., has a resolution of 4320×2400, as shown).

In contrast, FIG. 30B is a diagram illustrating an effect of a user's head rotation direction on a size of an output VR frame, in accordance with some embodiments. The example of FIG. 30B assumes that a client device used by user (e.g., an HMD) has a resolution ratio of 2160×1200. As illustrated, a size (e.g., a resolution and/or aspect ratio) of an output VR frame changes as the user's head rotation direction changes. More specifically, a frame size (and hence also a shape) of an output VR frame 3058 that includes a predictive overfilling may have a resolution of 2200×2200 (and hence a corresponding aspect ratio). As the head rotation direction changes, the following output VR fames 3060 and 3062 each will have a different size as the head rotation changes further. For example, as shown, the frame 3060 may have a resolution of 3000×2000 (and hence a corresponding aspect ratio) while the frame 3062 may then have a different resolution of 4000×1300 (and hence a corresponding aspect ratio). Further, FIG. 30B shows how each of the frames 3058, 3060, and 3062 may be configured using a combination of a predicted FOV 3054 for T1 and a predicted FOV 3056 for T2.

Some variations to various example methods and systems described above, in accordance with some embodiments, will now be described.

In some embodiments, additional parameters may be signaled from a VR content server to a client device besides the parameters and content described above. For example, in some embodiments, the client device may receive an indication of at least one of pixel dimensions or an aspect ratio of a VR video frame (e.g. an overfilled, rendered VR video frame) from the server prior to a scan-out time. In some embodiments, each VR video frame received from the server may include a rendering time stamp indicative of a frame render time at the server. In some embodiments, each VR video frame received from the server may include additional time stamps such as a decoding time stamp indicative of a time the frame should be decoded at the client, and/or a playback time stamp indicative of a time the frame should be scanned out at the client device.

In some embodiments, the server may, e.g., indirectly signal information indicative of an adaptively changing overfill region. More specifically, the client device can learn a frame size of a received VR video frame during a decoding process of the (encoded) frame. The received frame would contain frame information (e.g., resolution, aspect ratio, etc.), which normally would be needed for the decoding process. Therefore, in some embodiments, the client device may calculate an overfill factor used for the received frame by comparing the size of the received frame with the size of a service frame generated at the client device. In some embodiments, the server may provide parameters which indicate a predicted fixation point T or a set of fixation points {T1, T2} which were used to generate the rendered overfilled image. In some embodiments, the server may provide parameters which indicate the error margins or the regions of overfill within the rendered overfilled image. In some embodiments, the server may provide parameters which indicate how the rendered overfilled image is aligned to a coordinate system used by the client for rendering the VR content to the user. The coordinate system may be a spherical coordinate system, for example.

In some embodiments, without observing a latency of a VR system, each of overfill factors applied respectively to each axis may be adjusted according to a user's head rotation speed and direction, for example, by multiplying an overfilling weight factor and the head rotation speed for each axis direction.

In this case, in some embodiments, the system may not have to adapt to system latency, but it can still achieve a reduction in rendering overhead due to the overfill factors applied differently for each axis. In some embodiments, the proposed solution makes use of information on an approximate rendering to scan-out latency of the system, so it can use, for example, a ping exchange or use preconfigured values.

Figure 31:
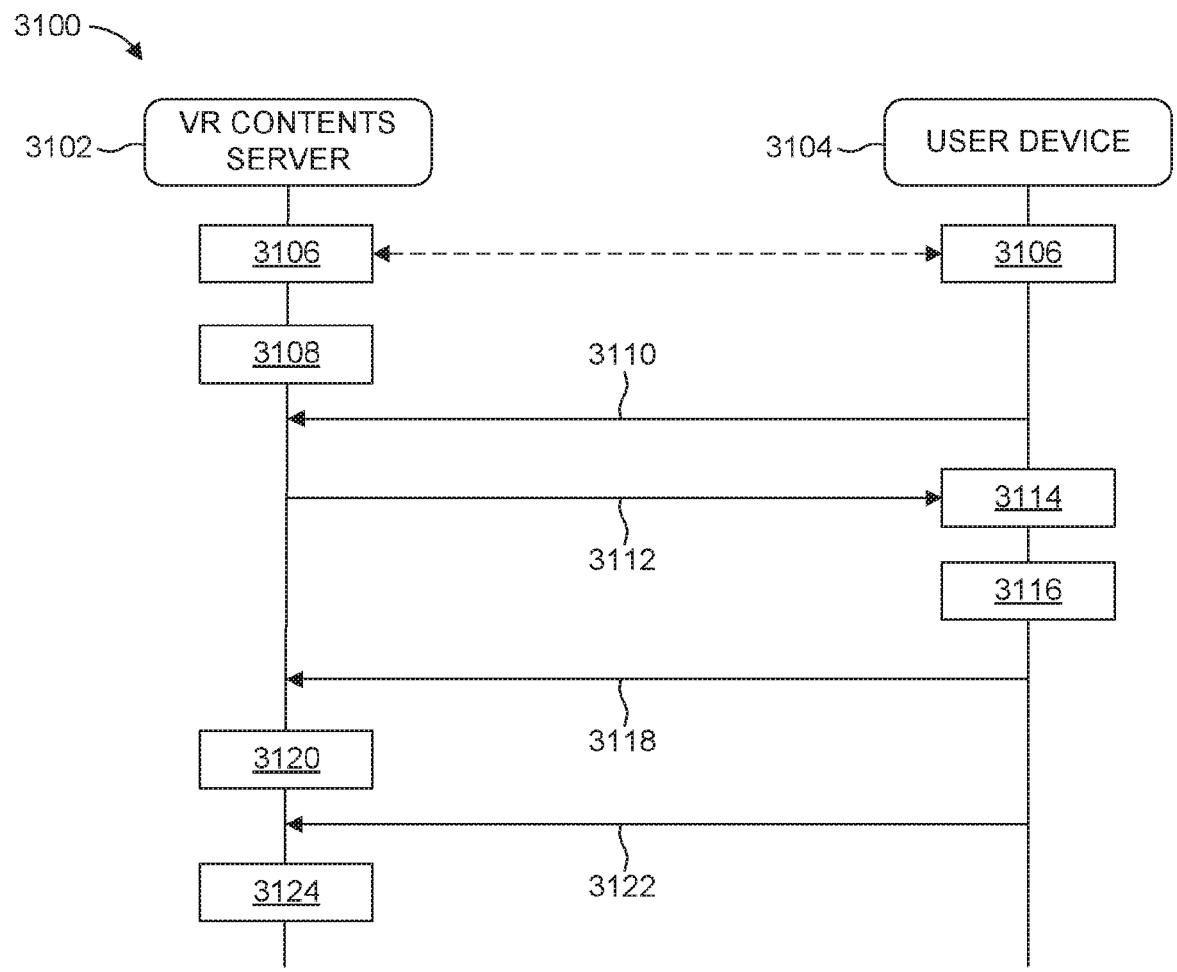
FIG. 31 is a messaging diagram illustrating an example process, in accordance with some embodiments.

FIG. 31 is a messaging diagram illustrating an example process 3100, in accordance with some embodiments. The example process may be carried out between a VR contents server 3102 and a user device (e.g., an HMD) 3104. In some embodiments, the example process may be carried out iteratively, such as, e.g., every given number of frames, on a frame-by-frame basis, etc.

As shown, in some embodiments, at 3106, a ping exchange (e.g., a connection latency test) is carried out between the server 3102 and the user device 3104. In some embodiments, a VR system may measure the connection latency between the VR contents server 3102 and the user device 3104, for example, before starting a service routine. In some embodiments, the VR system may use the latency information determined through the ping exchange and/or may use preset values according to a contents server-user device connection type. In some embodiments, if an overfilling weight factor becomes excessively high (e.g., with respect to a given threshold) while contents is being served, another ping exchange may be performed to update the latency information. The reason for re-measuring latency when the overfilling weight factor is high may be that the too high overfilling weight factor indicates a relatively large difference between an expected latency and an actual latency.

In some embodiments, at 3108, the VR contents server 3102 may render a VR video frame, such an overfilled frame. In this regard, in some embodiments, the VR contents server 3102 determines a target time point, for example, by summing the connection latency and the time it takes to render a frame. The VR content server 3102 then, for example, may predict a user's fixation point for the target time point. The VR content server 3102 may then apply an overfill factor for each axis to render the frame. The VR content server 3102 may render an area around the predicted fixation point, taking into account the overfill factor set for each axis. Then, the rendered frame may be placed in a frame buffer In some embodiments, at 3110, the user device 3104 may send to the VR content server 3102 user motion data (e.g., IMU-based data). At 3112, the rendered frame (e.g., service packets) may be sent to the user device 3104. At 3114, the user device 3104 may time warp the received frame to generate a service frame and, at 3116, scan-out the service frame. As noted above, in accordance with some embodiments, the service frame generally refers to a frame formatted or processed properly for display to a user via the user device 3104. In this regard, the frame received from the server 3102 by the user device 3104 may include an overfilled image, which is larger than a scan-out resolution. Hence, the user device 3104 would select and extract data from appropriate portions of the received frame to generate the service frame. In addition, the user device 3104 may apply timewarping to the received frame. Further, in some embodiments, the user device 3104 may determine and feedback FOV loss information. Namely, in some embodiments, the user device 3104 generates a service frame by performing time warping according to a user's current FOV. Then, an area where FOV loss occurred in the created service frame (after time warping) is measured and, at 3118, sent to the VR contents server 3104. This feedback information may be, in some embodiments, in the form of a FOV loss ratio (as shown in FIG. 32) and/or another form of overfilling accuracy information.

Figure 32:
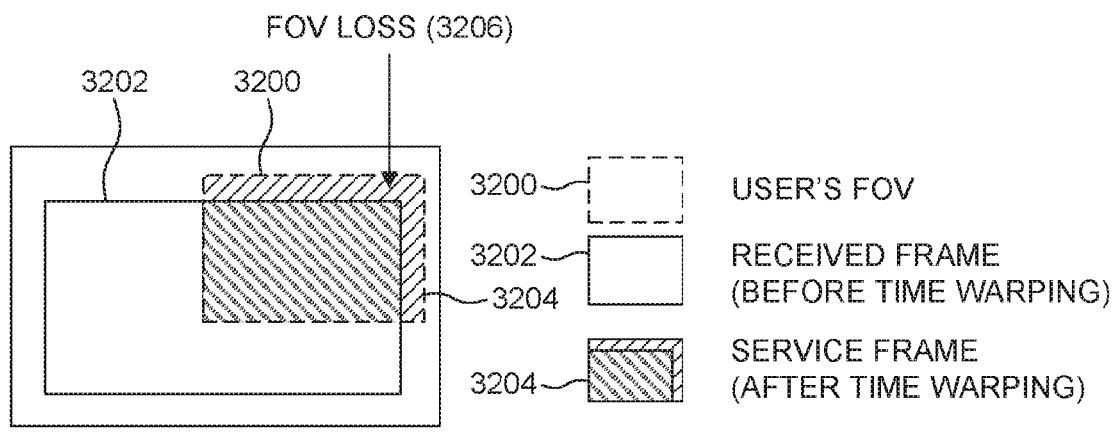
FIG. 32 is a diagram illustrating an example FOV loss region, in accordance with some embodiments

Namely, FIG. 32 is a diagram illustrating an example FOV loss region, in accordance with some embodiments. More specifically, FIG. 32 shows a user's FOV 3200, a received frame 3202, and a service frame 3204. As described above, in some embodiments, the received frame 3202 refers to a frame received at a user device before the user device performs time warping of that frame according to the user's current FOV 3200. On the other hand, the service frame 3204 refers to a frame generated after the time warping. Further, FIG. 32 illustrates pictorially an FOV loss 3206 that occurs in the service frame 3204 (e.g., an FOV loss of 25%). Hence, if an area corresponding to the user's current FOV 3200 is not included in the received frame 3202 (e.g., when an applied overfill factor is relatively small), the service frame 3204 generated using timewarp may not satisfy an original frame size and will have data only in some areas. In some embodiments, an FOV loss represents a percentage of an area of the service frame 3204 (generated by the user device using the received frame 3202) that contains no data. In some embodiments, the area of FOV loss appears as a black space when displayed through the user device to a user.

In some embodiments, at 3120, the VR contents server 3102 adjusts an overfilling weight factor. In some embodiments, the VR contents server 3102 adjusts the overfilling weight factor, for example, according to the received FOV loss information (e.g., according to a FOV loss ratio). In some embodiments, the content server may increase the overfilling weight factor when it detects, via, e.g., feedback data, that the FOV loss has occurred in the service frame, and may reduce the overfilling weight factor when it detects no FOV loss, for example, in a certain number of displayed frames (e.g., a certain number of consecutively displayed frames at the user device 3104). Through this process, in some embodiments, the overfilling weight factor may be empirically controlled and may have a stable weight factor in a stable latency environment. Note that, in some embodiments, if the weight factor increases beyond a threshold due to repeated FOV loss, the VR contents server 3102 may re-measure the connection latency by performing the ping exchange again (see 3106), and may initialize the weight factor.

In some embodiments, in the absence of FOV loss, e.g., for a certain number of frames (e.g., a certain number of consecutively displayed frames, as mentioned above), the overfilling weight factor may be set to, e.g., 0.9 (or some other value between 0 and 1) so that a new overfill factor is 0.9 of the previous overfill factor, and hence reduced. The overfilling weight factor may be, for example, decreased and/or further decreased from a set value (e.g., 0.9) to another value (e.g., 0.8) accordingly.

In some embodiments, the following example Equation 4 is used to determine a new overfill factor.

$$\text{New overfill factor} = \text{Previous overfill factor} \times (100 + \partial \text{ (FOV loss ratio)})/100 \qquad \text{Eq. 4}$$

In Equation 4, the variable ∂ refers to the adjusting or adjustment strength parameter. In some embodiments, Equation 4 provides a method of increasing the overfill factor in the event of FOV loss. According to this embodiment, the overfill factor is increased whenever the FOV loss ratio is positive. A new overfill factor is generated that is greater than or the same as the previous overfill factor because the condition for modifying the overfill factor using the equation is only when the FOV loss occurs. A FOV loss indicates that the current overfill factor is not sufficient for the current network delay and/or VR user's dynamics. In some embodiments, if the increased overfill factor eventually exceeds a certain threshold, the new overfill factor may be effectively reset according to a measured network latency. As noted above, if an overfilling weight factor becomes excessively high (e.g., with respect to a given threshold) while content is being served, another latency test (e.g., a ping exchange) may be performed to update latency information, and the overfill factor may be initialized to a new value according to the result of the newly performed latency test. In some embodiments, if FOV loss is detected in a service frame, for example, for a large ∂, a new overfill factor, e.g., determined from Eq. 4, is larger than a previous overfill factor (e.g., an overfill factor determined for a frame that immediately precedes the frame for which the new overfill factor is determined). In some embodiments, using a large ∂ allows for dynamic adjustment, e.g., by the system, of the overfill factor, for example, to quickly respond to FOV loss. In some embodiments, the ∂ may be selectively adjusted, e.g., on a frame-by-frame basis.

If the overfill weight factor and/or the overfill factor increases beyond a threshold value due to repeated FOV loss, the content server may re-measure the connection latency, for example, by performing the ping exchange again, and/or may initialize the overfill weight factor.

In an alternative embodiment, the overfill factor may be adjusted relative to an FOV loss ratio threshold. In some embodiments, Eq. 5 may be used. According to Eq. 5, if the FOV loss ratio is above the value "thresh", the new overfill factor will be greater than the previous overfill factor. According to Eq. 5, if the FOV loss ratio is below the threshold, the new overfill factor will be less than the previous overfill factor, thereby providing a decay of the overfill factor when no FOV loss occurs. For example, in some embodiments, Eq. 5 may be, e.g., used to periodically reduce the overfill factor based at least in part on the thresh term, even when the FOV loss ratio is zero (0). This may, for example, allow for continual attempts to minimize overfilling rendering overhead.

$$\text{New overfill factor} = \text{Previous overfill factor}(100 + \partial \text{ (FOV loss ratio} - \text{thresh}))/100 \qquad \text{Eq. 5}$$

In some embodiments, at 3124, an overfill factor is set. Prior to that, at 3122, an updated user motion may be received at the VR contents server 3102. In some embodiments, a rotational speed of the user's head for each axis may be identified. In some embodiments, the VR contents server 3102 determines the overfill factor for each axis by multiplying the weight factor by the head rotation speed. In other words, if the user rotates the head relatively quickly, e.g., in the horizontal direction, an overfill factor for the horizontal direction will be relatively larger than an overfill factor for the vertical direction. By simultaneously or concurrently considering the overfilling weight factor and the head rotation speed of the user, some embodiments may prevent an FOV loss even if the actual scan-out timing does not exactly match the target scan-out timing (such as, e.g., due to varying network delay).

Figure 33:
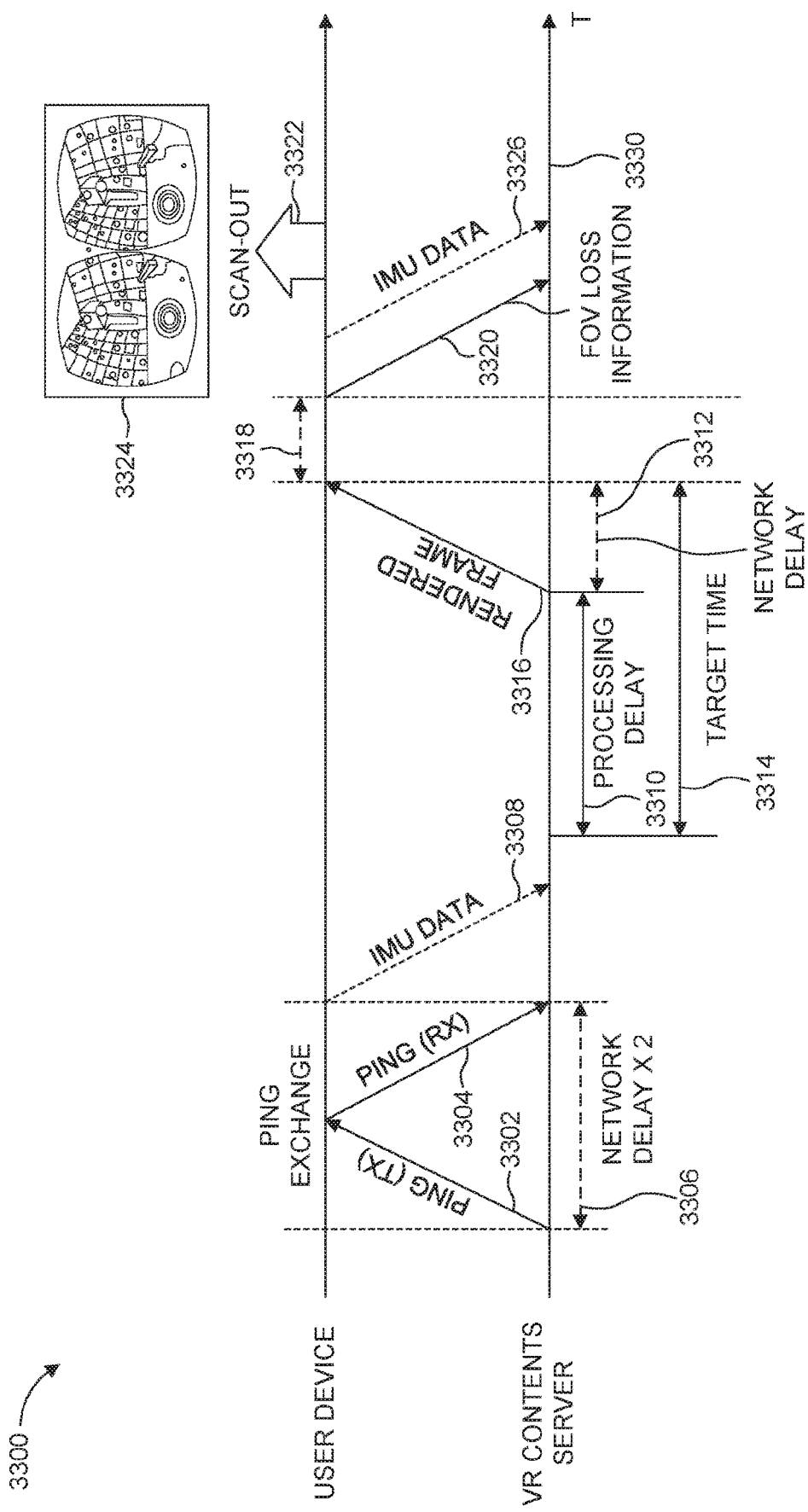
FIG. 33 illustrates an example procedure related to the process of FIG. 32, in accordance with some embodiments

FIG. 33 illustrates an example procedure 3300 related to the process of FIG. 32, in accordance with some embodiments. FIG. 33 shows an example of how the process of FIG. 32 could be carried out in operation, in some embodiments. At 3302 and 3304, a user device and a VR contents server may engage in a ping exchange (as described in more detail before) to measure latency. Because of the ping signaling being carried in both transmit (Tx) and receive (Rx) directions a network delay 3306 is doubled (or times 2, as in FIG. 33). At 3308, the user device may provide IMU data to the server. The server may render a VR video frame (e.g., a first overfilled frame) according to a target time 3314.

As described earlier, the target time 3314 may include a processing delay 3310 (e.g., the time it takes to render a frame) and a network delay 3312 of a connection between the server and the user device (e.g., half of the delay 3306). In some embodiments, the target time 3314 may include additional time for other predictable delays such as decoding and processing of the service frame at the user device (e.g., client device). The target time 3314 may include any delays which are expected to occur between rendering at the server and scan out at the client (e.g. any delays which would be included in a rendering to scan out latency). At 3316, the rendered frame is transmitted to the user device to meet, e.g., substantially the target time point. At 3318, the user device may execute a time warping process on the frame received from the server to generate a service frame. At 3322, the user device scans out the service frame 3324 for display to a user. Further, as described earlier, the user device may detect if any FOV loss has occurred. The example of FIG. 33 assumes that such loss has occurred, and at 3320, the user device sends FOV loss information to the server. Further, at 3326, the user device may also provide to the server the latest IMU data. On the server side, at 3330, the server adjusts an overfilling weight factor according to the FOV loss information, and sets overfill factors for each axis accordingly. As such, in some embodiments, the adjusted overfilling weight factor may be used for one or more subsequent frames (e.g., the next frame) rendered by the server.

An example of a use case in accordance with, e.g., embodiments described hereinabove, will now be described.

In some embodiments, a VR system described herein applies overfilling and timewarping considering that a user's motion will change while a VR service is provided. Predictive overfilling, in accordance with some embodiments, may reduce overhead and may be applied to systems with varying latencies.

Figure 34:
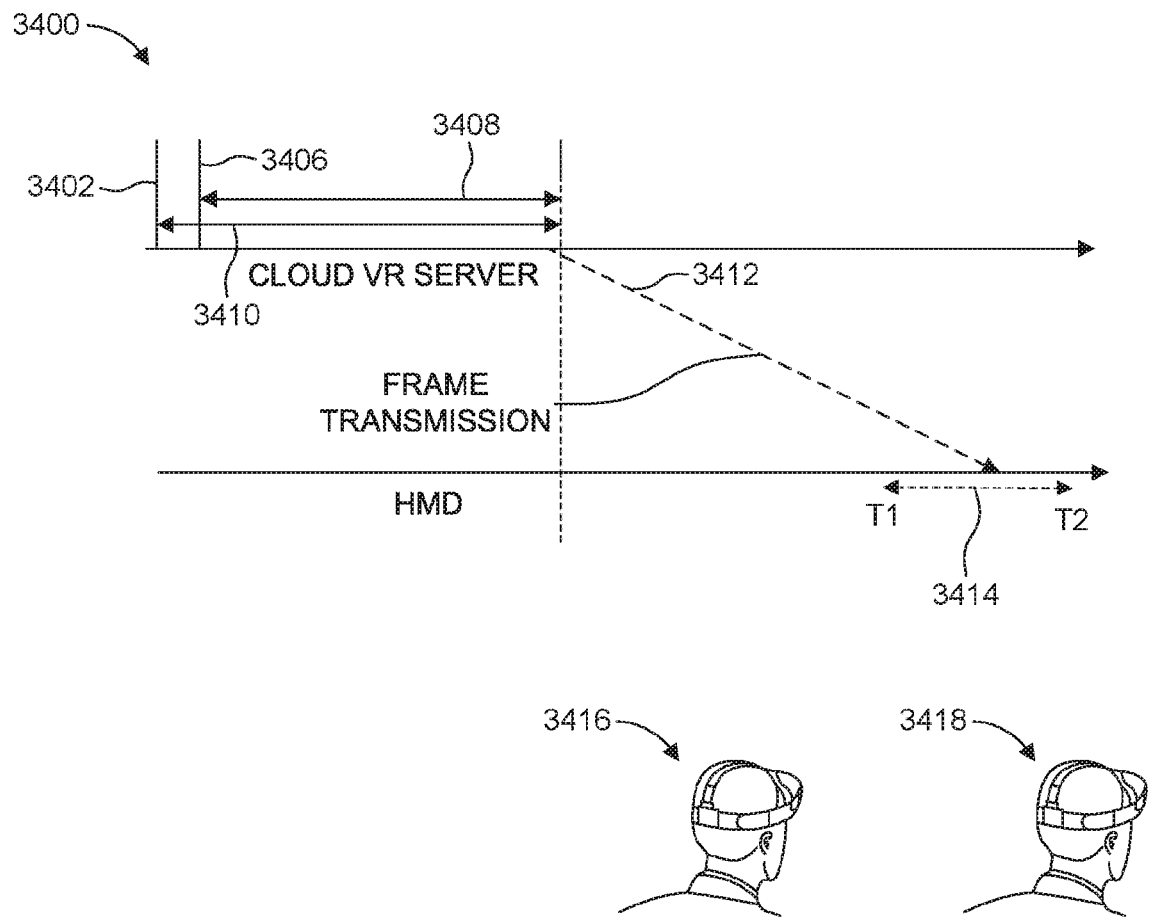
FIG. 34 illustrates a diagram showing an example of varying rendering-to-scan-out latency, in accordance with some embodiments.

FIG. 34 illustrates a diagram 3400 illustrating an example of varying rendering-to-scan-out latency, in accordance with some embodiments. The example of FIG. 34 may apply in a scenario of a remote VR service between a cloud VR server and an HMD. As shown, at 3402, the server may start rendering a service frame. A delay 3410 from the start of from rendering to the time of an actual transmission may include a varying processing delay 3408. At 3412, the rendered frame may be transmitted. Because of, e.g., varying network delay, the transmitted frame may be expected to arrive at the HMD such that a scan-out time of the frame would occur somewhere between T1 and T2 (e.g., a time interval 3414), where, in some embodiments, T1 and T2 provide lower and upper bounds on an expected scan-out time, respectively. Further, FIG. 34 shows users head motion 3416 at the time T1 and at the time T2, when the users head motion (denoted by 3418) may change.

An example procedure for calculating a time interval [T1, T2] to determine a rendering area of predictive overfilling for user's FOV will now be described.

As described in connection with FIG. 12, to select two predicted fixation points corresponding to T1 and T2 for predictive rendering, a latency at which a corresponding service frame is actually provided from a server to a user device may be obtained or determined. In order to know the rendering to scan-out latency of a system, in some embodiments, the server records a rendering starting time information of some frames or of each frame and compares the rendering start time information to the actual service time (e.g. the scan-out time) of the corresponding frame, which may be identified by feedback data from the user device (e.g., the HMD). The recorded rendering starting times and the respective associated service times (or scan-out times) may be used to build a rendering-to-scan-out latency distribution, as described herein.

Figure 35:
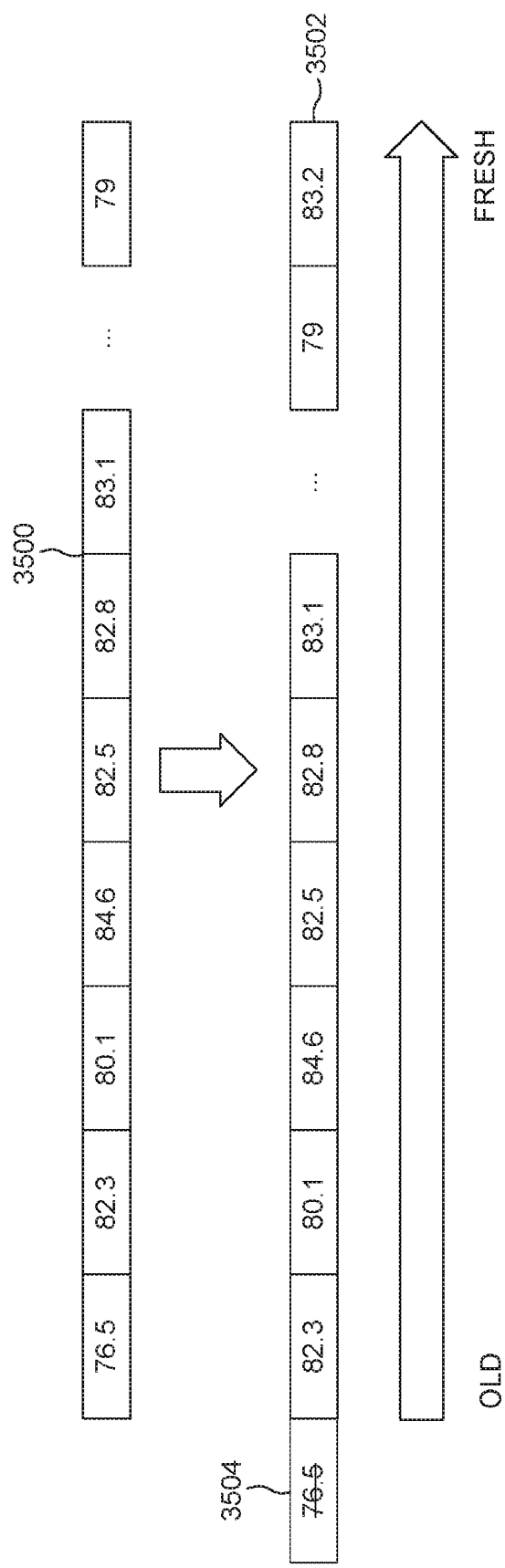
FIG. 35 is a diagram illustrating an example latency table update, in accordance with some embodiments.

Because the rendering to scan-out latency may vary over time (e.g., due to processor temperature, complexity of a scene to be rendered, an amount of overfilling, and/or network latency variations), latency distribution tables may be managed by exchanging an "old" data entry with a "new" data entry. FIG. 35 is a diagram illustrating an example latency table update, in accordance with some embodiments. As shown in FIG. 35, in some embodiments, if the most-recently measured rendering to scan-out latency data 3502 is measured (e.g., 83.2 ms), the oldest data 3504 (e.g., 76.5 ms) of a table 3500 will be deleted, while the corresponding most-recent data 3502 is added to the table 3500 to update it. Since the data in the table 3500 only covers latency for a certain number of frames (e.g., 100 measurements), the predictive overfilling according to some embodiments disclosed herein can adaptively set appropriate rendering fixation points as the system environment changes.

Figure 36:
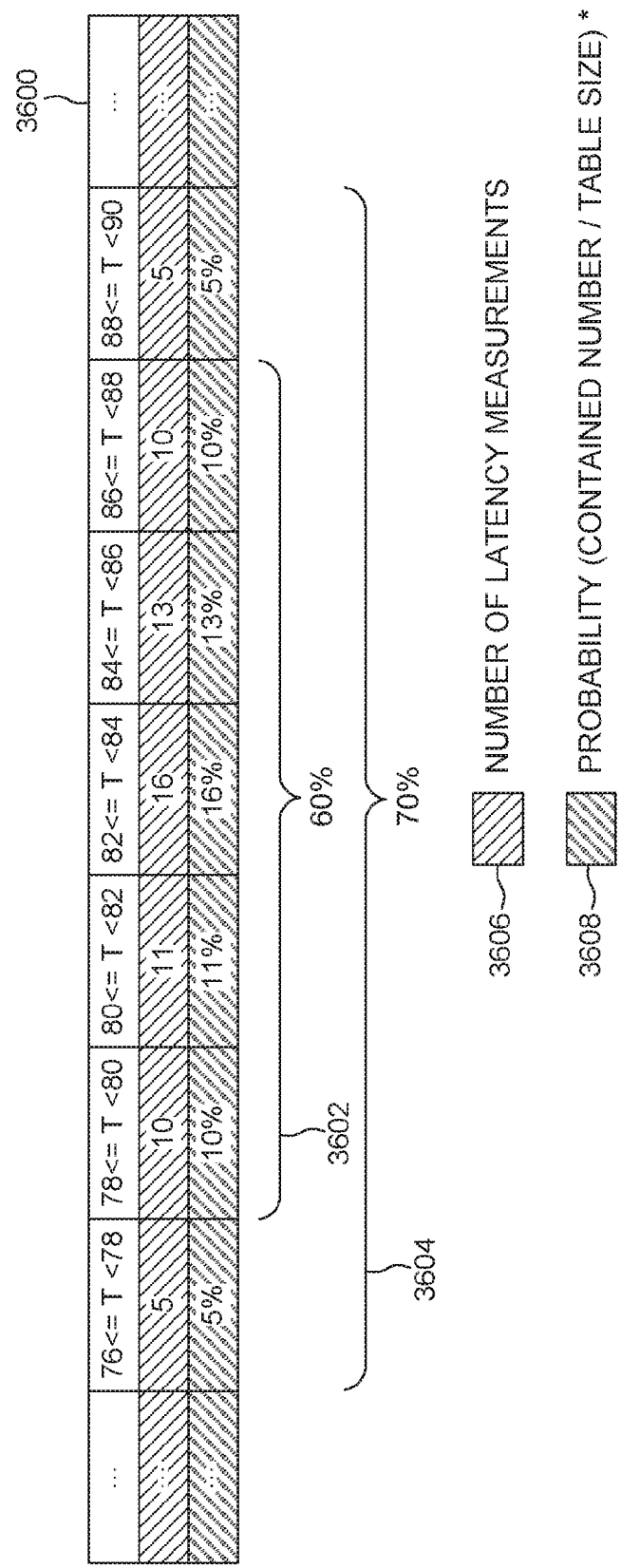
FIG. 36 illustrates an example latency distribution probability, in accordance with some embodiments.

In some embodiments, the server may determine and/or check the latency distribution by using data stored in a latency table. If the data in the latency table has been updated, the probability will also change. FIG. 36 illustrates an example latency distribution probability table 3600, in accordance with some embodiments. As shown by way of example, if the latency distribution is calculated at 2 ms intervals, the probability of each latency interval is determined as shown in FIG. 36. According to the table 3600, if one sets the stability of the predictive overfilling to 60% for the system, a time T1 corresponding to a latency value of 78 ms and a time T2 corresponding to a latency value of 88 ms may be selected.

The fixation points are the user's FOV prediction points corresponding to the previously determined T1 (78 ms) and T2 (88 ms). A method for calculating the two fixation points corresponding to the times T1 and T2 can utilize CAP or CRP as the method to predict user's FOV as is done in an example VR system. The VR server can check the user's current FOV and movement characteristic by using IMU information among feedback data of HMD. The CAP or CRP techniques may be applied to determine the fixation points for predicted scan-out times T1 and T2, for example, as shown in FIG. 36.

Figure 37A:
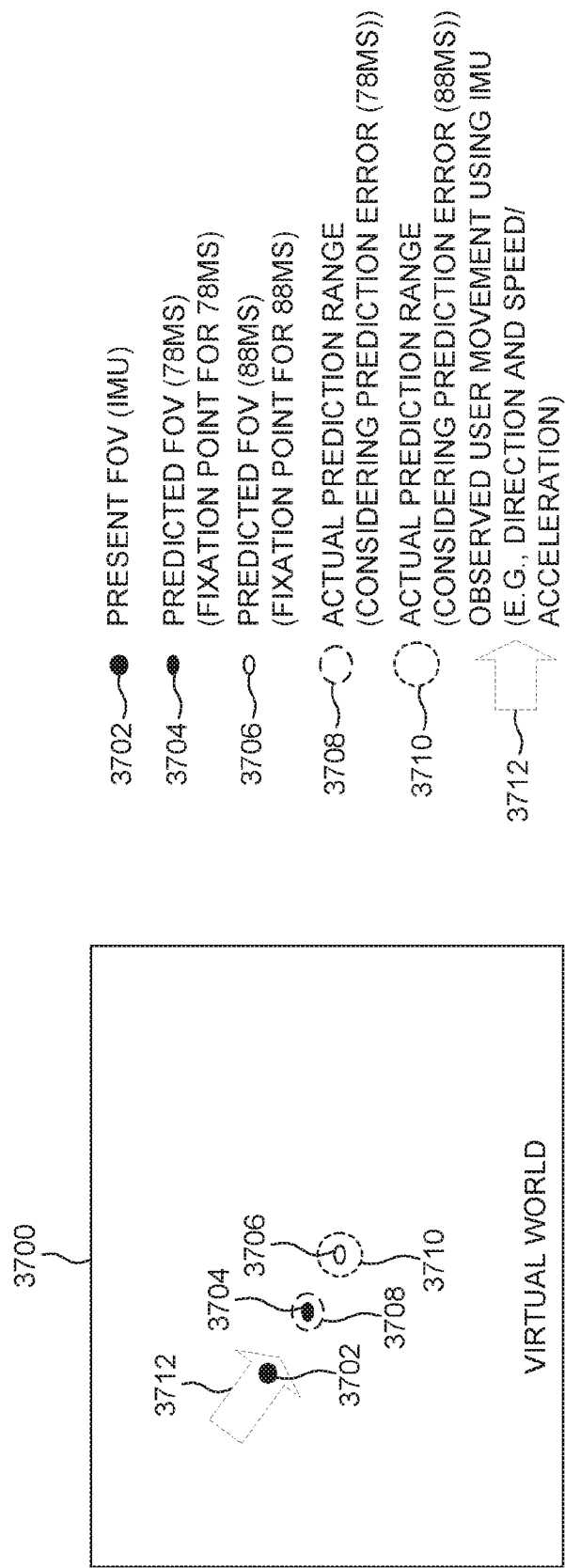
FIG. 37A illustrates the diagram from FIG. 16 with example time values, in accordance with some embodiments.
Figure 37B:
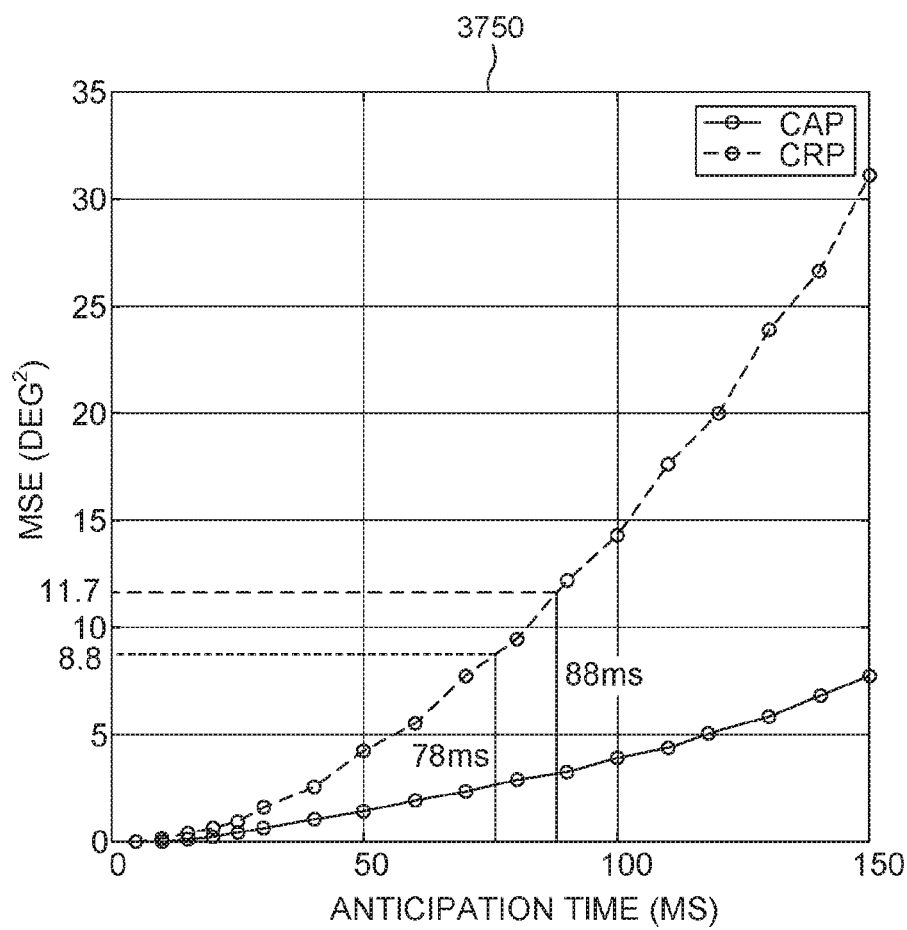
FIG. 37B shows the graph of FIG. 17B with example time values, in accordance with some embodiments.

As described above, T2 represents a predicted time further in the future than T1, and so the prediction for T2 (88 ms)

is more uncertain than the prediction for T1 (78 ms). In some embodiments, the VR contents server performs rendering over a larger range around the fixation point for T2 as compared to the fixation point for T1. If the user's head rotation speed is, for example, 100 deg/sec, the distance between fixation point for T1 and T2 is 1 deg (e.g., using CRP). FIG. 37A shows an example diagram 3700 similar to that of FIG. 16, for two specific time values, in accordance with some embodiments. FIG. 37B illustrates the example MSE of orientation error versus anticipation time graph 3750 from FIG. 17A, with two specific example time values, in accordance with some embodiments, namely with a first time value of T1=78 ms and a second time value of T2=88 ms.

Figure 38:
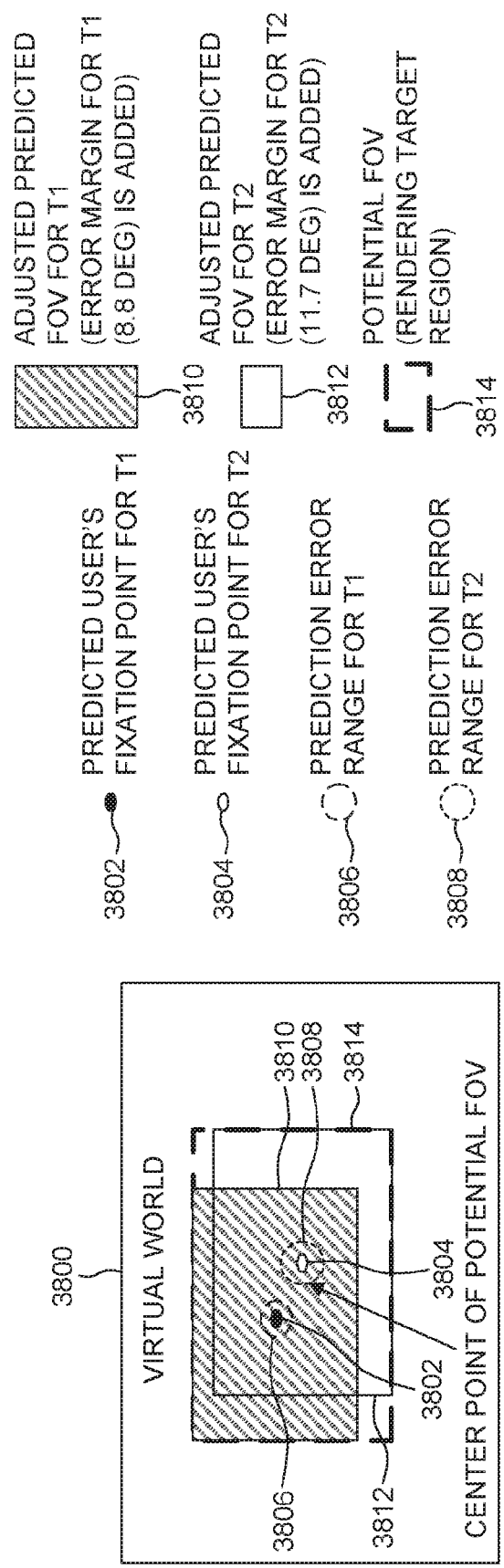
FIG. 38 illustrates a potential FOV, in accordance with some embodiments. In some embodiments

FIG. 38 illustrates a potential FOV, in accordance with some embodiments. FIG. 38 illustrates a portion of a virtual world 3800 that includes a predicted user's fixation point 3802 for T1 and a predicted user's fixation point 3804 for T2. The predicted users fixation point 3802 may have a corresponding prediction error range 3806, and the predicted users fixation point 3804 may have a corresponding prediction error range 3808, as described in more detail earlier. Further, FIG. 38 depicts an adjusted predicted FOV 3810 for T1 (first predicted FOV with an error margin (e.g., 8.8 deg) added thereto) and an adjusted predicted FOV 3812 for T2 (second predicted FOV with an error margin (e.g., 11.7 deg) added thereto). In some embodiments, a potential FOV 3814 (e.g., a combined FOV, e.g., a target rendering region) is determined by merging the adjusted predicted FOVs 3810 and 3812 for T1 and T2. Further, as shown in FIG. 38, position information about the center point (as shown) of the potential FOV 3814 may be used as information for rendering.

Figure 39:
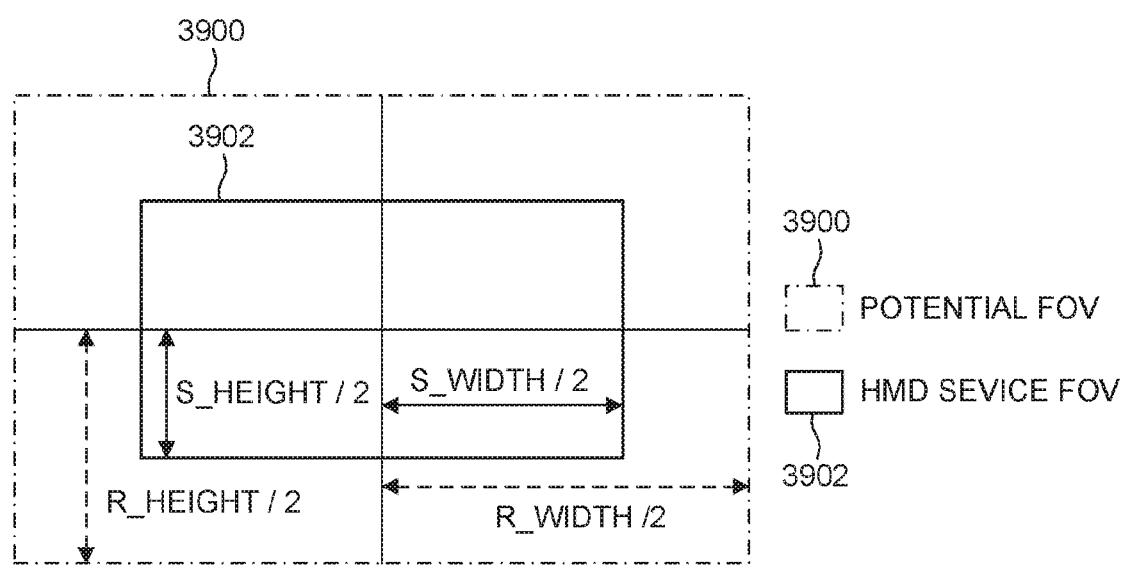
FIG. 39 is a diagram illustrating a relationship between a potential FOV and overfill factors, in accordance with some embodiments.

FIG. 39 is a diagram illustrating a relationship between a potential FOV and overfill factors, in accordance with some embodiments. A potential FOV 3900 (e.g., a target rendering region) includes a service FOV 3902 of an HMD. Overfill factor for each respective axis (i.e., x-axis (horizontal direction) and y-axis (vertical direction)) may be calculated according to the following example Equations 6 and 7:

Overfill Factor(horizontal)=$R\_width/S\_width$   Eq. 6

Overfill Factor(vertical)=$R\_height/S\_height$   Eq. 7

Figure 40:
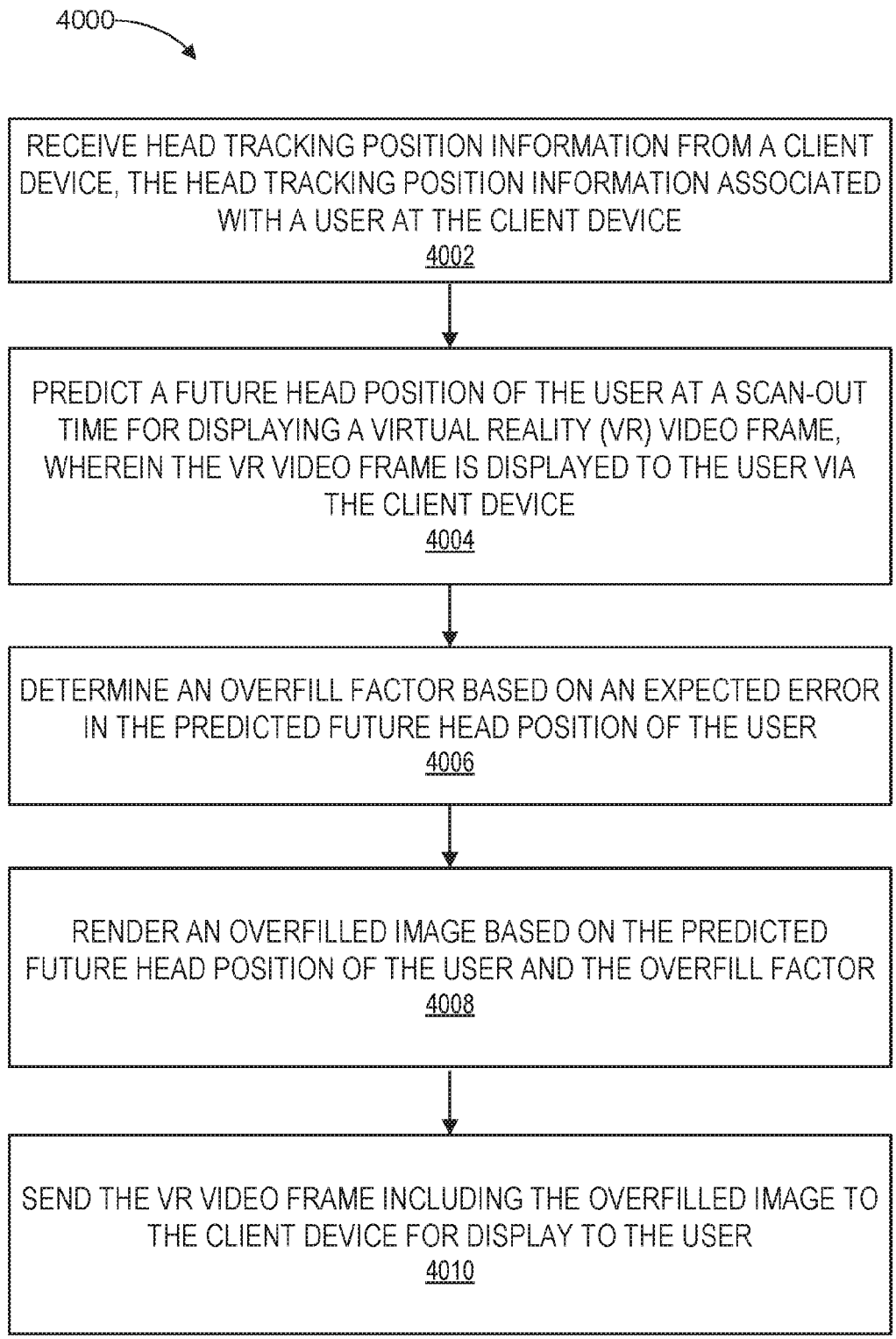
FIG. 40 is a flow chart of an example method, according to some embodiments.

FIG. 40 is a flow chart of an example method 4000, according to some embodiments. In some embodiments, the processing may be carried out by a server. At step 4002, the server receives head tracking position information from a client device, the head tracking position information associated with a user at the client device. At step 4004, the server predicts a future head position of the user at a scan-out time for displaying a virtual reality (VR) video frame, wherein the VR video frame is displayed to the user via the client device. At step 4006, the server determines an overfill factor based on an expected error in the predicted future head position of the user. At step 4008, the server renders an overfilled image based on the predicted future head position of the user and the overfill factor. Then, at step 4010, the server sends the VR video frame including the overfilled image to the client device for display to the user.

Figure 41:
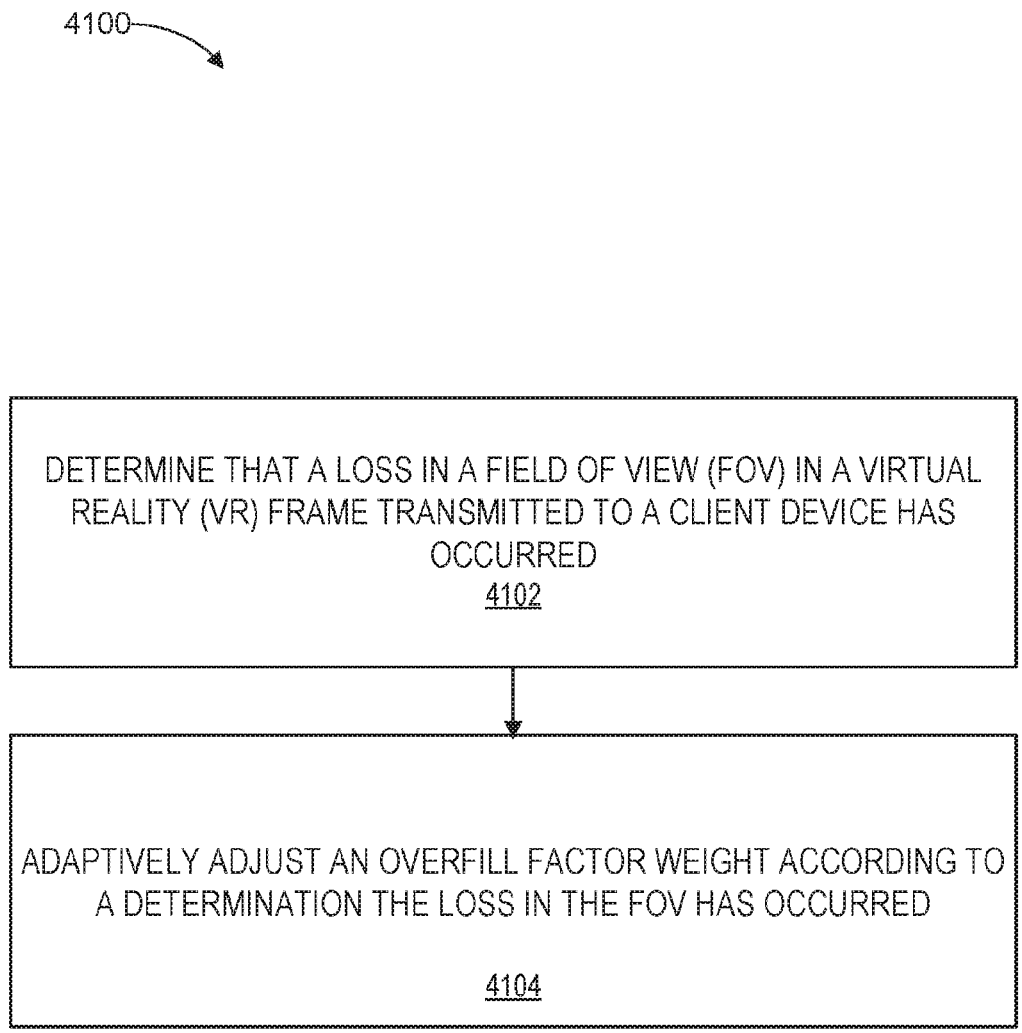
FIG. 41 is a flow chart illustrating another example method, in accordance with some embodiments.

FIG. 41 is a flow chart of another example method 4100, according to some embodiments. In some embodiments, the processing may be carried out by a server. At step 4102, the server determines that a loss in a field of view (FOV) in a virtual reality (VR) frame transmitted to a client device has occurred. Then, at step 4104, the server adaptively adjusts an overfill factor weight according to a determination the loss in the FOV has occurred.

While certain various example features of example methods and systems have been described with respect to a server and with respect to being performed by a server (see, e.g., FIGS. 11, 12, 24, and 31), the description and these example methods are not limited to such implementations and various features may be performed by, e.g., a client device (e.g., an HMD). Further, in any steps or embodiments involving a server, the server may be a cloud-based server that communicates with the client (user) device via a network, or the server may be a local computer that communicates with the client (user) device using a local network, a wireless communication protocol, and/or a wired connection.

Figure 42:
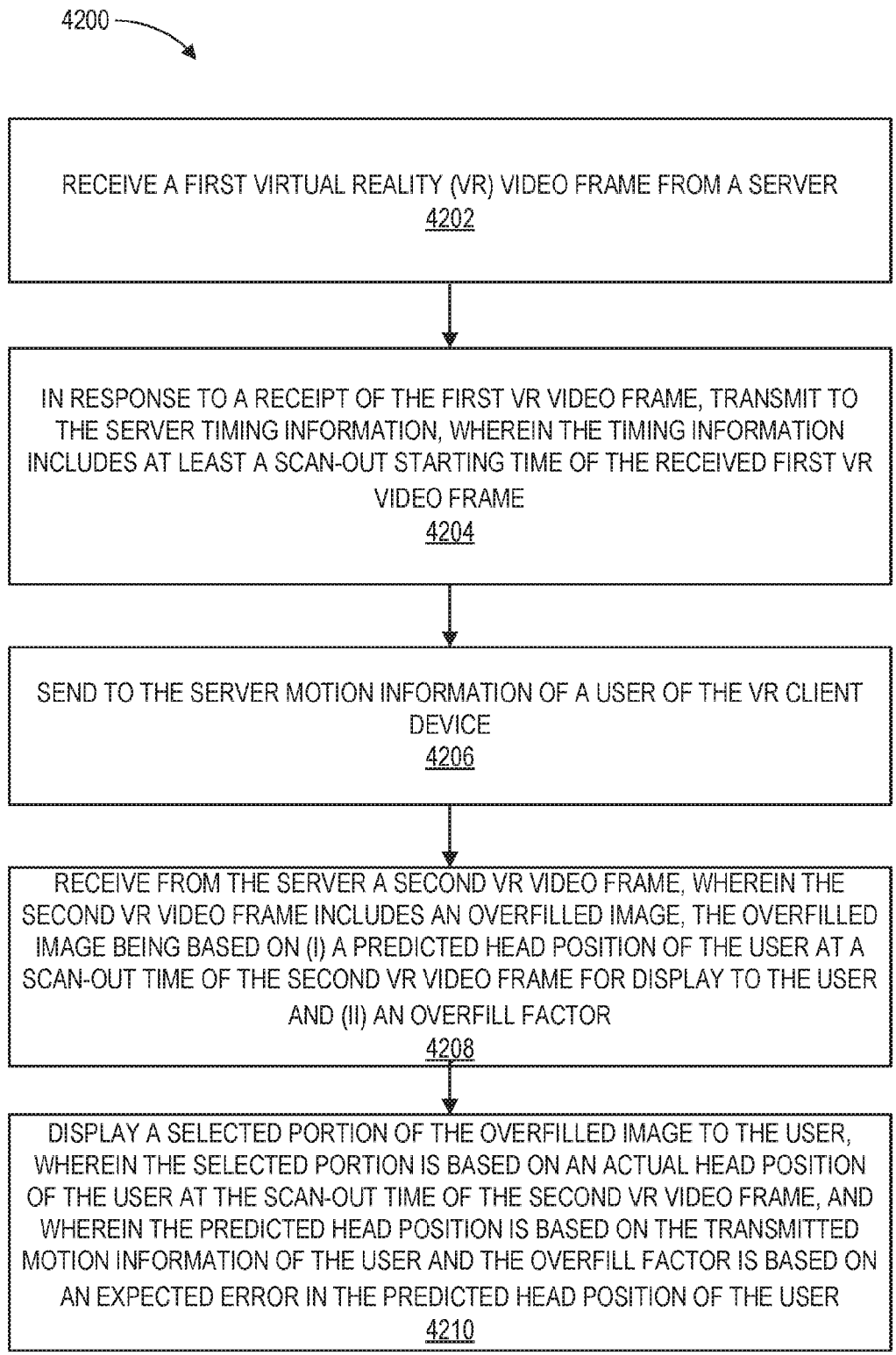
FIG. 42 is a flow chart illustrating yet another example method, in accordance with some embodiments.

For example, FIG. 42 is a flow chart of another example method 4200, according to some embodiments. In some embodiments, the processing may be carried out by a client device. At step 4202, the client device receives a first virtual reality (VR) video frame from a server. In response to a receipt of the first VR video frame, at step 4204, the client device transmits to the server timing information, wherein the timing information includes at least a scan-out starting time of the received first VR video frame. At step 4206, the client device sends to the server motion information of a user of the VR client device. At step 4208, the client device receives from the server a second VR video frame, wherein the second VR video frame includes an overfilled image, the overfilled image being based on (i) a predicted head position of the user at a scan-out time of the second VR video frame for display to the user and (ii) an overfill factor. Then, at step 4210, the client device displays a selected portion of the overfilled image to the user, wherein the selected portion is based on an actual head position of the user at the scan-out time of the second VR video frame, and wherein the predicted head position is based on the transmitted motion information of the user and the overfill factor is based on an expected error in the predicted head position of the user.

Figure 43:
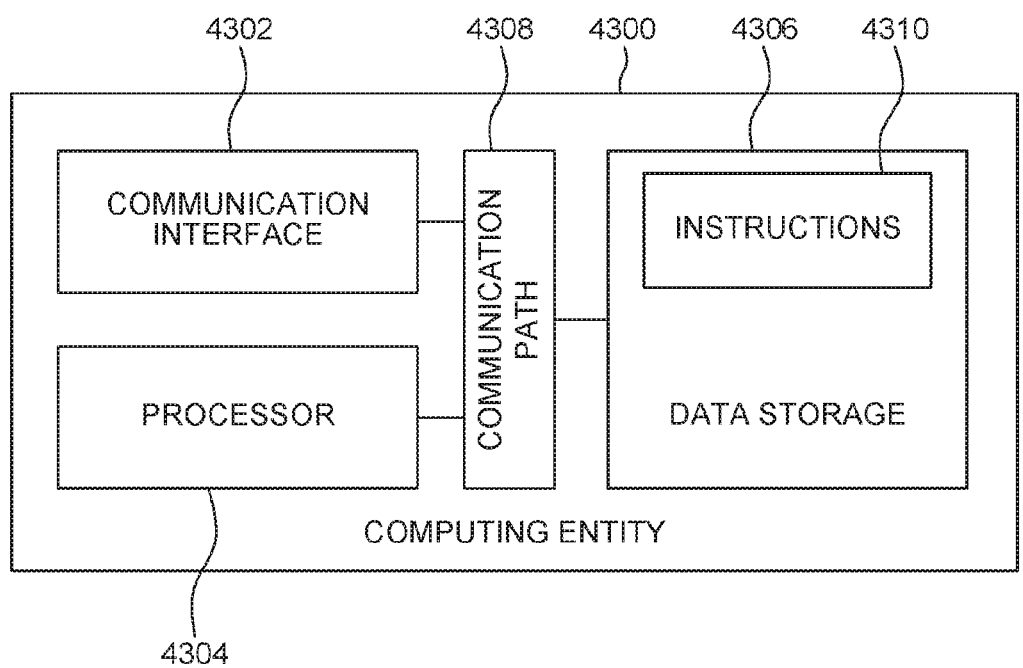
FIG. 43 depicts an example computing entity that may be used in embodiments of the present disclosure.

FIG. 43 depicts an example computing entity 4300 that may be used in embodiments of the present disclosure, for example, as a local or remote VR content server, as part of such a VR content server, or as part of multiple entities which may perform together as a VR service system. As depicted in FIG. 43, the computing entity 4300 includes a communication interface 4302, a processor 4304, and non-transitory data storage 4306, all of which are communicatively linked by a bus, network, or other communication path 4308.

Communication interface 4302 may include one or more wired communication interfaces and/or one or more wireless-communication interfaces. With respect to wired communication, communication interface 4302 may include one or more interfaces such as Ethernet interfaces, as an example. With respect to wireless communication, communication interface 4302 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 4302 may be equipped at a scale and with a configuration appropriate for acting on the network side—as opposed to the client side—of wireless communications (e.g., LTE communications, Wi-Fi communications, and the like). Thus, communication interface 4302 may include the appropriate equipment and circuitry (perhaps including multiple transceivers) for serving multiple mobile stations, UEs, or other access terminals in a coverage area.

Processor 4304 may include one or more processors of any type deemed suitable by those of skill in the relevant art, some examples including a general-purpose microprocessor and a dedicated DSP.

Data storage 4306 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 43, data storage 4306 contains program instructions 4310 executable by the processor 4304 for carrying out various combinations of the various functions described herein, in accordance with some embodiments.

Further, various (e.g., related) embodiments have been described hereinabove.

According to some embodiments, a method of rendering an overfilled image based on a predicted HMD position and predicted scan-out time, where an overfilling factor is calculated adaptively, is disclosed.

According to some embodiments, a method of performing an overfill adaptively based on observed user head movements is disclosed.

According to some embodiments, a method of performing an overfill based on a distribution of observed network latencies is disclosed.

According to some embodiments, a method of rendering an overfilled image based on two predicted scan-out times (e.g., an interval [T1, T2]) is disclosed.

According to some embodiments, a method of adjusting an overfill factor using FOV loss information and connection latency test by ping exchange is disclosed. In some embodiments, with the disclosed method, an actual scan-out time may not be needed.

According to some embodiments, a method of rendering an image to a VR user may include: determining a time T, wherein T is a predicted scan-out time for displaying a current frame at a client device; predicting an HMD position and/or an associated field of view (FOV) at the time T based at least in part on the client device's IMU motion data; determining an overfill factor based on at least one of: an expected error or confidence level of the predicted scan-out time T, an expected error or confidence level of the predicted HMD position, or a recent measurement of the amount of user head motion; rendering an overfilled image based on the predicted HMD position and the overfill factor; and displaying a portion of the overfilled image to the VR user at the client device, the portion determined based on the position of the HMD at the scan-out time.

In some embodiments, the time T is determined based on an amount of network latency observed between a server and the client device. In some embodiments, the time T is determined based on a predicted amount of time needed to render the current frame at the client device. In some embodiments, the method may further include constructing a rendering-to-scan-out latency distribution, wherein the time T is determined based on the latency distribution. Further, in some embodiments, rendering the overfilled image based on the predicted HMD position and the overfill factor may include: rendering a first overfilled image for a first time T1 using a first overfill factor; and rendering a second overfilled image for a second time T2 using a second overfill factor different from the first overfill factor.

According to some embodiments, a method of rendering an image to a VR user may include: constructing a rendering-to-scan-out latency distribution; selecting times T1 and T2 based on the latency distribution, wherein T1 provides a lower bound on an expected scan-out time, and T2 provides an upper bound on the expected scan-out time; predicting an HMD position and/or associated FOV for each of times T1 and T2 based on a client device's IMU motion data; determining an overfill factor for each of the times T1 and T2; and rendering an overfilled image based on the predicted HMD position and the overfill factor for time T1 and the predicted HMD position and the overfill factor for time T2; and displaying a portion of the overfilled image to the VR user at the client device, the portion determined based on a position of the HMD at the scan-out time.

In some embodiments, a first overfilled image generated for a first scan-out time has a different resolution than a second overfilled image generated for a second scan-out time. In some embodiments, a first overfilled image generated for a first scan-out time has a different aspect ratio than a second overfilled image generated for a second scan-out time. The overfill factor for each of times T1 and T2 is determined, in some embodiments, based on an expected HMD position prediction error or an amount of confidence in the HMD position prediction at the times T1 and T2, respectively. Further, in some embodiments, constructing the rendering-to-scan-out latency distribution is based at least in part on a difference between a rendering start time $(T_R)$ of starting to render a frame and a scan-out time $(T_S)$ for displaying the frame at the client device.

According to some embodiments, a method may include: receiving image scan-out time data from a head mounted display (HMD); determining a rendering-to-scan-out latency distribution based at least in part on the image scan-out time data; receiving motion data from the HMD; determining expected image scan-out time data based at least in part on the rendering-to-scan-out latency distribution; estimating, based at least in part of the motion data, a first field of view for a first time and a second field of view for a second time, the first time and the second time corresponding to at least respective portions of the expected scan-out time data; determining an overfill factor for each of the first time and the second time; rendering a first overfilled image based on the first field of view, the second field of view, and the respective overfill factors; and transmitting the first overfilled image to the HMD.

In some embodiments, estimating, based at least in part of the motion data, the first field of view for the first time and the second field of view for the second time may include estimating a first fixation point for the first time and a second fixation point for the second time. In some embodiments, estimating the first fixation point for the first time and the second fixation point for the second time may include performing a constant-rate (velocity)-based prediction (CRP). In some embodiments estimating the first fixation point for the first time and the second fixation point for the second time may include performing a constant-acceleration-based prediction (CAP).

Further, in some embodiments, rendering the overfilled image based on the first field of view, the second field of view, and the respective overfill factors may include: adjusting the first field of view based on the overfill factor for the first time; and adjusting the second field of view based on the overfill factor for the second time. In some embodiments, the method may further include: receiving more-recent image scan-out time data from the HMD; and updating the rendering-to-scan-out latency distribution based on the more-recent image scan-out time data.

Also, in some embodiments, the method may further include rendering a second overfilled image; and transmitting the second overfilled image to the HMD, wherein the image scan-out time data received from the HMD comprises second-overfilled-image scan-out time data. In some embodiments, the method may further include timewarping the first overfilled image. The method may also further include displaying the first overfilled image at the HMD.

Further, in some embodiments, the method may further include recording a starting time for rendering the first overfilled image. The method may also further include, in some embodiments, determining resolution display capabilities of the HMD; determining a prediction error for the first time; determining a prediction error for the second time; and comparing the resolution display capabilities to each of the prediction errors. In some embodiments, the first overfilled image is rendered to have a shape that is substantially rectangular. In some embodiments, the first overfilled image is rendered to have a shape that is substantially hexagonal.

In addition, in some embodiments, the first overfilled image is rendered to have a shape that is substantially rectangular. In some embodiments, the overfill factor for the first time may include different values for horizontal and vertical dimensions, and overfill factor for the second time may include different values for horizontal and vertical dimensions.

According to some embodiments, a method may include rendering a plurality of overfilled images, each overfilled image being overfilled based on user's head movement information and a plurality of rendering-to-scan-out latency measurements and having error margins for at least horizontal and vertical resolutions.

According to some embodiments, a system may include a virtual reality contents server configured to predictively overfill a video frame and transmit the predictively overfilled video frame to a virtual reality (VR) device.

According to some embodiments, a method may include: receiving motion data from a head mounted display (HMD); predicting a first future orientation of the HMD at a first time based at least in part on the motion data; predicting a second future orientation of the HMD at a second time based at least in part on the motion data; estimating a first prediction error corresponding to the first future orientation and a second prediction error corresponding to the second future orientation; determining a first predicted field of view (FOV) corresponding to the first future orientation based at least in part on the first prediction error; determining a second predicted FOV corresponding to the second future orientation based at least in part on the second prediction error; determining a potential FOV dimensioned based at least in part on the first predicted FOV and the second predicted FOV; and rendering an overfilled image based at least in part on the potential FOV.

According to some embodiments, a method may include: adjusting a first overfill factor for a first axis of an image based at least in part on head mounted display (HMD) motion data corresponding to the first axis and rendering-to-scan-out latency data; adjusting a second overfill factor for a second axis of the image based at least in part on HMD motion data corresponding to the second axis and the rendering-to-scan-out latency data; and rendering an overfilled image based on the first overfill factor and the second overfill factor.

According to some embodiments, a system may include: a processor; and a non-transitory computer-readable medium storing instructions operative when executed on the processor to perform any of the methods disclosed herein.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed at a server, comprising:
receiving head tracking position information from a client device, the head tracking position information associated with a user at the client device;
predicting a future head position of the user at a scan-out time for displaying a virtual reality (VR) video frame, wherein the VR video frame is displayed to the user via the client device;
determining an overfill factor based on an expected error in the predicted future head position of the user;
rendering an overfilled image based on the predicted future head position of the user and the overfill factor; and
sending the VR video frame comprising the overfilled image to the client device for display to the user,
wherein the expected error in the predicted future head position of the user is computed based on a latency distribution, the latency distribution comprising latency metrics data for multiple VR video frames previously scanned out for display by the client device.

2. The method of claim 1, wherein the client device comprises a head-mounted display (HMD).

3. The method of claim 1, wherein rendering the overfilled image further comprises:
determining at least two fields of view corresponding to at least two respective predicted future head positions of the user; and rendering the overfilled image to comprise the at least two fields of view and content extended beyond the at least two fields of view based on the overfill factor.

4. The method of claim 1, wherein at least one of pixel dimensions or an aspect ratio is changed dynamically from one VR video frame to another VR video frame according to a change in a head rotation of the user.

5. The method of claim 1, wherein predicting the future head position of the user at the scan-out time comprises:
using at least in part the head tracking position information to predict the future head position of the user at the scan-out time.

6. The method of claim 5, wherein using at least in part the head tracking position information to predict the future head position of the user at the scan-out time comprises:
predicting a first field of view (FOV) at a first time (T1), wherein the first predicted FOV is based on a predicted first fixation point; and
predicting a second FOV at a second time (T2), wherein the second predicted FOV is based on a predicted second fixation point.

7. The method of claim 6, further comprising:
adding a first error margin associated with the predicted first fixation point to the first predicted FOV; and
adding a second error margin associated with the predicted second fixation point to the second predicted FOV.

8. The method of claim 7, further comprising confirming values of the first and second error margins in real-time based on the head tracking position information received from the client device.

9. The method of claim 8, wherein the first prediction error margin and the second prediction error margin are based on errors between the received head tracking position information and predicted motion data.

10. The method of claim 7,
wherein determining the overfill factor based on the expected error in the predicted head position of the user comprises setting the overfill factor based at least in part on the first and second prediction error margins, and
wherein the overfill factor comprises a first overfill factor value for a horizontal axis and a second overfill factor value for a vertical axis, the first and second overfill factor values being different from each other.

11. The method of claim 7,
further comprising determining a combined FOV associated with the overfilled image based on the first predicted FOV and the second predicted FOV,
wherein determining the combined FOV based on the first predicted FOV and the second predicted FOV comprises combining (i) a first adjusted predicted FOV, wherein the first adjusted predicted FOV is determined by adding the first error margin to the first predicted FOV and (ii) a second adjusted predicted FOV, wherein the second adjusted predicted FOV is determined by adding the second error margin to the second predicted FOV.

12. The method of claim 11, wherein the combined FOV is determined by selecting a rectangular area that comprises the first and second adjusted predicted FOVs.

13. The method of claim 11, wherein the combined FOV is determined by selecting a hexagonal shape that comprises the first and second adjusted predicted FOVs.

14. The method of 11, wherein rendering the overfilled image comprises applying the overfill factor with respect to a center point of the combined FOV.

15. The method of claim 5, further comprising:
determining a time T,
wherein the time T represents a predicted scan-out time for the VR video frame comprising the overfilled image; and
predicting a field of view (FOV) of the user for the time T based on the predicted future head position of the user.

16. The method of claim 15, further comprising:
determining an extended FOV of the user for the time T based on a direction and speed of a head rotation of the user; and
aligning a center position of the extended FOV with a center position of the predicted FOV to produce a final extended FOV, and
wherein rendering the overfilled image comprises applying the overfill factor to the final extended FOV, the overfill factor having a first overfill factor value for a horizontal axis and a second overfill factor value for a vertical axis,
wherein the first and second overfill factor values are different from each other.

17. A method performed at a server, comprising:
receiving head tracking position information from a client device, the head tracking position information associated with a user at the client device;
predicting a future head position of the user at a scan-out time for displaying a virtual reality (VR) video frame, wherein the VR video frame is displayed to the user via the client device, and
wherein predicting the future head position of the user at the scan-out time comprises using at least in part the head tracking position information to predict the future head position of the user at the scan-out time;
determining an overfill factor based on an expected error in the predicted future head position of the user;
rendering an overfilled image based on the predicted future head position of the user and the overfill factor;
sending the VR video frame comprising the overfilled image to the client device for display to the user;
in response to a receipt of the VR video frame comprising the overfilled image at the client device, receiving timing information from the client device, the timing information comprising at least a scan-out starting time of the VR video frame comprising the rendered overfilled image; and
determining a rendering-to-scan-out latency distribution, wherein determining the rendering-to-scan-out latency distribution comprises at least in part determining a difference between a rendering start time of the VR video frame and the scan-out starting time of the VR video frame to calculate a rendering-to-scan-out latency value of the VR video frame.

18. A system comprising,
a processor; and
a non-transitory computer-readable medium storing instructions operative, when executed by the processor, to cause the system to:
receive head tracking position information from a client device, the head tracking position information associated with a user at the client device;
predict a future head position of the user at a scan-out time for displaying a virtual reality (VR) video frame, wherein the VR video frame is displayed to the user via the client device;
determine an overfill factor based on an expected error in the predicted future head position of the user;

render an overfilled image based on the predicted future head position of the user and the overfill factor; and
send the VR video frame comprising the overfilled image to the client device for display to the user,
wherein the expected error in the predicted future head position of the user is computed based on a latency distribution, the latency distribution comprising latency metrics data for multiple VR video frames previously scanned out for display by the client device.

* * * * *